(12) United States Patent
Smejkal et al.

(10) Patent No.: US 12,509,417 B2
(45) Date of Patent: Dec. 30, 2025

(54) ENANTIOSELECTIVE PROCESS

(71) Applicant: SYNGENTA CROP PROTECTION AG, Basel (CH)

(72) Inventors: Tomas Smejkal, Stein (CH); Nicolai Cramer, Lausanne (CH); Josep Mas-Rosello, Lausanne (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 1264 days.

(21) Appl. No.: 17/291,353

(22) PCT Filed: Nov. 1, 2019

(86) PCT No.: PCT/EP2019/079995
§ 371 (c)(1),
(2) Date: May 5, 2021

(87) PCT Pub. No.: WO2020/094528
PCT Pub. Date: May 14, 2020

(65) Prior Publication Data
US 2022/0106263 A1    Apr. 7, 2022

(30) Foreign Application Priority Data
Nov. 6, 2018 (GB) ..................... 1818117

(51) Int. Cl.
*C07C 249/12* (2006.01)
*B01J 23/46* (2006.01)

(52) U.S. Cl.
CPC .......... *C07C 249/12* (2013.01); *B01J 23/468* (2013.01); *B01J 2231/643* (2013.01); *B01J 2531/827* (2013.01); *B01J 2540/12* (2013.01)

(58) Field of Classification Search
None
See application file for complete search history.

(56) References Cited

U.S. PATENT DOCUMENTS

| | | | |
|---|---|---|---|
| 9,051,272 B2 | 6/2015 | Stierli et al. | |
| 9,637,457 B2 | 5/2017 | Dumeunier et al. | |
| 2007/0129574 A1 | 6/2007 | Scherhag et al. | |
| 2015/0080592 A1* | 3/2015 | Talwar .................... | C07F 17/02 |
| | | | 556/137 |

FOREIGN PATENT DOCUMENTS

| | | |
|---|---|---|
| EP | 1862446 A2 | 12/2007 |
| JP | S5810575 A | 1/1983 |
| JP | 2015508794 A | 3/2015 |
| JP | 2015074632 A | 4/2015 |
| JP | 2016525084 A | 8/2016 |
| JP | 2018083792 A | 5/2018 |
| WO | 2013153407 A1 | 10/2013 |
| WO | 2013153408 A1 | 10/2013 |

OTHER PUBLICATIONS

Jones (New Chemistry of Hydroxylamines, 2013, Cardiff University Thesis). (Year: 2013).*
English translation of Kadyrov et al. (EP 1862446, pub date Dec. 5, 2007) (Year: 2007).*
Krzeminski, et al., "Asymmetric reduction of ketoxime derivatives and N-alkylketimines with borane-oxazaborolidine adducts", Tetrahedron: Asymmetry, vol. 14, No. 11, pp. 1463-1466, 2003.
Maj, et al., "Asymmetric hydrogenation of 2,3-dihydro-1H-inden-1-one oxime and derivatives", Tetrahedron: Asymmetry, vol. 27, Issue 6, pp. 268-273, Apr. 1, 2016.
Written Opinion of the International Searching Authority and International Search Report for PCT/EP2019/079995 mailed Feb. 3, 2020.

* cited by examiner

*Primary Examiner* — Renee Claytor
*Assistant Examiner* — Jennifer C Sawyer
(74) *Attorney, Agent, or Firm* — BakerHostetler; Toni-Junell Herbert

(57) ABSTRACT

The present invention relates to novel processes for the enantioselective iridium-catalysed hydrogenation of oximes and oxime ethers to provide compounds of formula (II) and salts thereof formula (I) and (II).

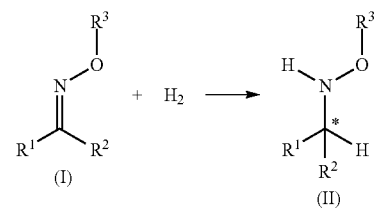

16 Claims, No Drawings

ENANTIOSELECTIVE PROCESS

CROSS-REFERENCE TO RELATED APPLICATIONS

This application is a 371 National Stage application of International Application No. PCT/EP2019/079995 filed Nov. 1, 2019, which claims priority to GB 1818117.2, filed Nov. 6, 2018, the entire contents of these applications are hereby incorporated by reference.

The present invention relates to a novel process for the enantioselective iridium-catalysed hydrogenation of oximes.

More specifically, the present invention relates to novel processes for the hydrogenation of oximes of formula (I) in the presence of an iridium catalyst and an acid to produce hydroxylamines of formula (II) and salts thereof:

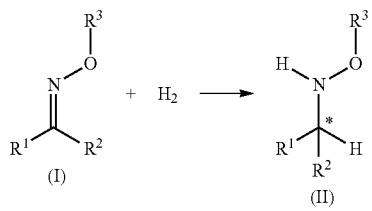

wherein the position labelled with the asterisk is an asymmetric centre and one stereoisomer of hydroxylamine of formula (II) is produced in excess.

Some chiral hydroxylamines of general formula (II) are known to be intermediates of pesticidally active compounds from WO14/206855 and WO15/052076.

In contrast with the numerous existing methods for the production of chiral amines via homogeneous metal-catalyzed imine hydrogenation—*Chem. Rev.* 2011, 111, 1713, the analogous synthesis of chiral hydroxylamines via oxime reduction remains elusive.

Asymmetric reduction of oxime ethers is described in the literature in *J. Org. Chem.* 1997, 5385 and WO14/206855, using borane complexes as reducing agents in the presence of chiral amino alcohols. The main disadvantages of the borane reduction methods compared to hydrogenation are the high cost of the reducing agent, low atom economy of the process resulting in formation of stoichiometric amounts of waste. Further in many cases, such as *J. Chem. Soc. Perkin Trans. I,* 1985, 2039; *Tetrahedron: Asymmetry* 2003, 14, 1463, the borane oxime reduction suffers from over-reduction to the corresponding primary amine.

Reports on homogeneous hydrogenation of oximes and oxime ethers to hydroxylamines are scarce. The transition-metal-catalysed hydrogenation of oximes is commonly plagued by over-reduction to the corresponding primary amine as well as low catalytic efficiency (cobalt catalysis— *Bull. Chem. Soc. Jpn.* 1963, 36, 763; ruthenium catalysis— *Tetrahedron: Asymmetry* 1992, 3, 1283; rhodium catalysis— *J. Chem. Soc. Chem. Commun.* 1995, 1767; *Org. Lett.* 2013, 15, 484; *Tetrahedron: Asymmetry* 2016, 27, 268; iridium catalysis—*Synth. Commun.* 2001, 31, 2767).

EP1862446 discloses the homogeneous enantioselective hydrogenation of 3-methoxyimino esters using a combination of hydrogen, bis(1,5-cyclooctadiene) iridium(I) tetrafluoroborate or bis(1,5-cyclooctadiene) rhodium(I) tetrafluoroborate, and (R)-1-[(S)-2-diphenylphosphinoferrocenyl] ethyl di-tert-butylphosphine. However, in practice this method is limited in scope to oximes of 3-ketoesters. Such substrates may tautomerize to 2,3-unsaturated esters and so the described oxime hydrogenation reaction is in fact a carbon-carbon double bond reduction.

Surprisingly, it has now been found that enantiomerically enriched compounds of formula (II) can be prepared via reaction of an oxime and hydrogen in the presence of a chiral iridium catalyst of formula (IIIa) or formula (IIIb) and an acid:

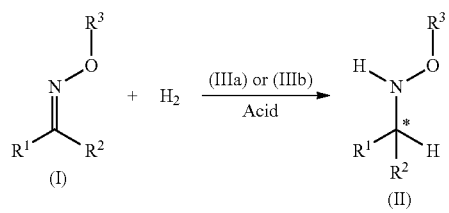

wherein the position labelled with the asterisk is an asymmetric centre and one stereoisomer of hydroxylamine of formula (II) is produced in excess;

$R^1$ and $R^2$ are each independently $C_1$-$C_8$alkyl, $C_1$-$C_8$hydroxyalkyl, $C_1$-$C_8$cyanoalkyl, $C_1$-$C_6$alkoxy$C_1$-$C_8$alkyl, $C_1$-$C_8$haloalkyl, $C_2$-$C_6$alkenyl, $C_3$-$C_8$cycloalkyl, phenyl, phenyl$C_1$-$C_3$alkyl, phenylsulfonyl$C_1$-$C_3$alkyl, $C_1$-$C_6$alkoxycarbonyl, a bridged carbocyclyl, heterocyclyl or heteroaryl, and wherein the cycloalkyl, phenyl, heterocyclyl and heteroaryl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, nitro, azido, and $C_2$-$C_6$alkenyl; or a single group selected from pinacolborane, phenylsulfonyl, phenyl$C_1$-$C_3$alkyl, or phenyl$C_1$-$C_3$alkoxy;

$R^3$ is hydrogen, $C_1$-$C_8$alkyl, $C_1$-$C_8$hydroxyalkyl, $C_1$-$C_8$cyanoalkyl, $C_1$-$C_6$alkoxy$C_1$-$C_8$alkyl, $C_1$-$C_8$haloalkyl, $C_2$-$C_6$alkenyl, $C_3$-$C_8$cycloalkyl, phenyl$C_1$-$C_3$alkyl, heterocyclyl$C_1$-$C_3$alkyl or heterobicyclyl$C_1$-$C_3$alkyl, wherein the cycloalkyl and heterocyclyl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, azido, nitro and $C_2$-$C_6$alkenyl;

and wherein $R^1$ and $R^2$ cannot be the same; or $R^1$ and $R^2$ together with the carbon atom to which they are attached may form a 4- to 9-membered saturated or partially saturated asymmetric cycloalkyl or asymmetric heterocyclyl ring, wherein the heterocyclic moiety is a non-aromatic monocyclic ring which comprises 1, 2 or 3 heteroatoms, wherein the heteroatoms are individually selected from N, O and S; or $R^1$ and $R^3$ together with the carbon and oxygen atoms to which they are respectively attached, may form a 5- to 8-membered non-aromatic heterocyclyl ring, or an 8- to 10-membered partially saturated heterobicyclyl ring.

Wherein the iridium catalysts of formula (IIIa) and (IIIb) are:

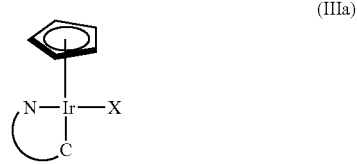

-continued

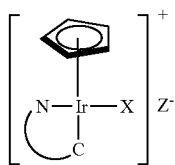
(IIIb)

wherein

represents an optionally substituted cyclopentadienyl ligand;

represents a bidentate chelating ligand comprising at least one carbon atom which coordinates to iridium and at least one nitrogen atom which coordinates to iridium;

X represents an anionic group;
Y represents a neutral ligand; and
Z represents an anionic group.

Where substituents are indicated as being "optionally substituted", this means that they may or may not carry one or more identical or different substituents. For example, $C_1$-$C_8$alkyl substituted by 1, 2 or 3 halogens, may include, but not be limited to, —$CH_2Cl$, —$CHCl_2$, —$CCl_3$, —$CH_2F$, —$CHF_2$, —$CF_3$, —$CH_2CF_3$ or —$CF_2CH_3$ groups. As another example, $C_1$-$C_6$alkoxy substituted by 1, 2 or 3 halogens, may include, but not limited to, $CH_2ClO$—, $CHCl_2O$—, $CCl_3O$—, $CH_2FO$—, $CHF_2O$—, $CF_3O$—, $CF_3CH_2O$— or $CH_3CF_2O$— groups.

As used herein, the term "halogen" or "halo" refers to fluorine (fluoro), chlorine (chloro), bromine (bromo) or iodine (iodo), preferably fluorine, chlorine or bromine. Most preferably halogen is chlorine.

As used herein, cyano means a —CN group.

As used herein, the term "hydroxyl" or "hydroxy" means an —OH group.

As used herein, amino means an —$NH_2$ group.

As used herein, amido means an —(C=O)$NR_aR_a$ group, where $R_a$ is a $C_1$-$C_4$alkyl radical as generally defined below.

As used herein, nitro means an —$NO_2$ group.

As used herein, azido means an —$N_3$ group.

As used herein, the term "$C_1$-$C_8$alkyl" refers to a straight or branched hydrocarbon chain radical consisting solely of carbon and hydrogen atoms, containing no unsaturation, having from one to eight carbon atoms, and which is attached to the rest of the molecule by a single bond. $C_1$-$C_6$alkyl, $C_1$-$C_4$alkyl, $C_1$-$C_3$alkyl and $C_1$-$C_2$alkyl are to be construed accordingly. Examples of $C_{1-8}$alkyl include, but are not limited to, methyl, ethyl, n-propyl, 1-methylethyl (isopropyl), n-butyl, and 1-dimethylethyl (t-butyl). A "$C_1$-$C_2$alkylene" group refers to the corresponding definition of $C_1$-$C_2$alkyl, except that such radical is attached to the rest of the molecule by two single bonds. Examples of $C_1$-$C_2$alkylene, are —$CH_2$— and —$CH_2CH_2$—.

As used herein, the term "$C_2$-$C_6$alkenyl" refers to a straight or branched hydrocarbon chain radical group consisting solely of carbon and hydrogen atoms, containing at least one double bond that can be of either the (E)- or (Z)-configuration, having from two to six carbon atoms, which is attached to the rest of the molecule by a single bond. Examples of $C_2$-$C_6$alkenyl include, but are not limited to, ethenyl (vinyl), prop-1-enyl, prop-2-enyl (allyl), and but-1-enyl.

As used herein, the term "$C_1$-$C_8$alkoxy" refers to a radical of the formula —$OR_a$ where $R_a$ is a $C_{1-8}$alkyl radical as generally defined above. The terms $C_1$-$C_6$alkoxy, $C_1$-$C_4$alkoxy, $C_1$-$C_3$alkoxy and $C_1$-$C_2$alkoxy are to be construed accordingly. Examples of $C_1$-$C_8$alkoxy include, but are not limited to, methoxy, ethoxy, propoxy, isopropoxy, and t-butoxy.

As used herein, the term "$C_1$-$C_8$hydroxyalkyl" refers to a $C_1$-$C_8$alkyl radical as generally defined above substituted by one or more hydroxy groups. Examples of $C_1$-$C_8$hydroxyalkyl include, but are not limited to, hydroxymethyl, hydroxyethyl, and hydroxybutyl.

As used herein, the term "$C_1$-$C_8$cyanoalkyl" refers to a $C_1$-$C_8$alkyl radical as generally defined above substituted by one or more cyano groups. Examples of $C_1$-$C_8$cyanoalkyl include, but are not limited to, cyanomethyl, cyanoethyl, and cyanobutyl.

As used herein, the term "$C_1$-$C_6$alkoxy$C_1$-$C_8$alkyl" refers to a radical of the formula $R_aOR_b$—, wherein $R_a$ is a $C_1$-$C_6$alkyl radical as generally defined above, and $R_b$ is a $C_1$-$C_8$alkylene radical as generally defined above. Examples of $C_1$-$C_6$alkoxy$C_1$-$C_8$alkyl include, but are not limited to, methoxymethyl, methoxyethyl, methoxybutyl, ethoxymethyl, and ethoxyethyl.

As used herein, the term "$C_1$-$C_8$haloalkoxy" refers to a —$OR_a$ radical as defined above substituted by one or more of the same or different halogen atoms. Examples of $C_1$-$C_8$haloalkoxy include, but are not limited to fluoromethoxy, fluoroethoxy, difluoromethoxy, trifluoromethoxy, 2,2,2-trifluoroethoxy, and 3,3,3-trifluoropropoxy.

As used herein, the term "(hydroxy)-$C_1$-$C_8$alkoxy" refers to a —$OR_a$ radical as defined above substituted with one or more hydroxy groups. Examples of (hydroxy)-$C_1$-$C_8$alkoxy include, but are not limited to 2-hydroxyethoxy.

As used herein, the term "($C_1$-$C_8$alkoxy)-$C_1$-$C_8$alkoxy" refers to a —$OR_a$ radical, wherein $R_a$ is a $C_1$-$C_8$alkyl radical substituted as defined above, with a single $C_1$-$C_8$alkoxy group as defined above. Examples of ($C_1$-$C_8$alkoxy)-$C_1$-$C_8$alkoxy include, but are not limited to 2-methoxyethoxy.

As used herein, the term "($C_1$-$C_8$alkoxy$C_1$-$C_8$alkoxy)-$C_1$-$C_8$alkoxy" refers to a radical of the formula ($R_aOR_bO$)$R_cO$— radical, wherein $R_a$, $R_b$, and $R_c$ are each independently a $C_1$-$C_8$alkyl radical as generally defined above. Examples of ($C_1$-$C_8$alkoxy$C_1$-$C_8$alkoxy)-$C_1$-$C_8$alkoxy include, but are not limited to 2-(2-methoxyethoxy)ethoxy.

As used herein, the term "$C_1$-$C_4$alkoxy($C_1$-$C_4$alkoxy$C_1$-$C_4$alkyl)-$C_1$-$C_4$alkoxy" refers to a radical of the formula $R_aO(R_bOR_c)R_dO$— wherein $R_a$, $R_b$, $R_c$, and $R_d$ are each independently a $C_1$-$C_4$alkyl radical as generally defined above. Examples of $C_1$-$C_4$alkoxy($C_1$-$C_4$alkoxy$C_1$-$C_4$alkyl)-$C_1$-$C_4$alkoxy include, but are not limited to [2-methoxy-1-(methoxymethyl)ethoxy].

As used herein, the term "$C_1$-$C_8$haloalkyl" refers to a $C_1$-$C_8$alkyl radical as generally defined above substituted by one or more of the same or different halogen atoms. Examples of $C_1$-$C_8$haloalkyl include, but are not limited to fluoromethyl, fluoroethyl, difluoromethyl, trifluoromethyl, 2,2,2-trifluoroethyl, and 3,3,3-trifluoropropyl.

As used herein, the term "$C_1$-$C_6$alkoxycarbonyl" refers to a radical of the formula $R_aOC(O)$—, where $R_a$ is a $C_1$-$C_6$alkyl radical as generally defined above.

As used herein, the term "($C_1$-$C_3$alkoxycarbonyl)-$C_1$-$C_3$alkoxy" refers to a radical of the formula ($R_aOC(O)$) $R_bO$—, wherein $R_a$ and $R_b$, are each independently a $C_1$-$C_3$alkyl radical as generally defined above. Examples of ($C_1$-$C_3$alkoxycarbonyl)-$C_1$-$C_3$alkoxy include, but are not limited to 2-methoxy-2-oxo-ethoxy.

As used herein, the term "$C_3$-$C_8$cycloalkyl" refers to a monocyclic ring radical which is saturated or partially unsaturated and contains 3 to 8 carbon atoms. $C_3$-$C_6$cycloalkyl and $C_3$-$C_5$cycloalkyl are to be construed accordingly. Examples of $C_3$-$C_8$cycloalkyl include, but are not limited to cyclopropyl, cyclobutyl, cyclopentyl, cyclopenten-1-yl, cyclopenten-3-yl, and cyclohexen-3-yl.

As used herein, the term "carbobicyclyl" refers to a partially unsaturated ring system comprising two rings and containing from 5 to 9 carbon atoms. Examples of carbobicyclyl include, but are not limited to indanyl.

As used herein, the term "bridged carbocyclyl" refers to a saturated system that contains from 7- to 10-carbon atoms, comprising two or more rings, for example, three rings, and further comprising at least one bridge, i.e. a single atom or an unbranched chain of atoms that connect two bridgehead atoms. Examples of bridged carbocyclyl include, but are not limited to norbornyl, bicycle[2.2.2]octanyl, and adamantyl.

As used herein, the term "phenyl$C_1$-$C_3$alkyl" refers to a phenyl ring attached to the rest of the molecule by a $C_1$-$C_3$alkylene radical as defined above. Examples of phenyl$C_1$-$C_3$alkyl include, but are not limited to, benzyl.

As used herein, the term "phenylsulfonyl" refers to a phenyl ring attached to the rest of the molecule by an $S(O)_2$— radical.

As used herein, the term "phenylsulfonyl$C_1$-$C_3$alkyl" refers to a phenylsulfonyl as defined above attached to the rest of the molecule by a $C_1$-$C_3$alkylene radical as defined above. Examples of phenysulfonyl$C_1$-$C_3$alkyl include, but are not limited to, phenylsulfonylmethyl.

As used herein, the term "heterocyclyl" refers to a stable 4-, 5- or 6-membered non-aromatic monocyclic ring which comprises 1, 2 or 3 heteroatoms, wherein the heteroatoms are individually selected from N, O, and S. The heterocyclyl radical may be bonded to the rest of the molecule via a carbon atom or heteroatom. Examples of heterocyclyl include, but are not limited to aziridinyl, azetidinyl, oxetanyl, thietanyl, tetrahydrofuryl, dihydropyranyl, pyrrolidinyl, pyrazolidinyl, imidazolidnyl, piperidinyl, piperazinyl, morpholinyl, dioxolanyl, dithiolanyl and thiazolidinyl.

As used herein, the term "heterocyclyl$C_1$-$C_3$alkyl" refers to a heterocyclyl ring as defined above attached to the rest of the molecule by a $C_1$-$C_3$alkylene linker as defined above.

As used herein, the term "heterobicyclyl" refers to a partially unsaturated ring system comprising two rings and containing from 4 to 10 carbon atoms. Examples of heterobicyclyl include, but are not limited to 3,4-dihydro-1H-2,3-benzoxazine.

As used herein, the term "heterobicyclyl$C_1$-$C_3$alkyl" refers to a heterobicyclic ring system as defined above attached to the rest of the molecule by a $C_1$-$C_3$alkylene linker as defined above.

As used herein, the term "heteroaryl" generally refers to a 5- or 6-membered monocyclic aromatic ring radical which comprises 1 or 2 heteroatoms individually selected from nitrogen, oxygen and sulfur. The heteroaryl radical may be bonded to the rest of the molecule via a carbon atom or heteroatom. Examples of heteroaryl include but are not limited to, furanyl, pyrrolyl, thienyl, pyrazolyl, imidazolyl, thiazolyl, oxazolyl, isoxazolyl, pyrazinyl, pyridazinyl, pyrimidyl and pyridyl.

As used herein, =O means an oxo group, e.g., as found in a carbonyl (—C(=O)—) group.

As used herein, O-mesyl or mesylate refers to a radical of the formula —$OS(O)_2CH_3$.

As used herein, O-tosyl or tosylate refers to a radical of the formula —$OS(O)_2C_6H_4$-p-$CH_3$.

As used herein, O-nosyl or nosylate refers to a radical of the formula —$OS(O)_2C_6H_4$-p-$NO_2$.

As used herein, O-triflyl or triflate refers to a radical of the formula —$OS(O)_2CF_3$.

As used herein, O-trifluoroacetyl or trifluoroacetate refers to a radical of the formula —$OC(O)CF_3$.

As used herein, tetrafluoroborate refers to a radical of the formula $BF_4^-$.

As used herein, tetraphenylborate refers to a radical of the formula $B(C_6H_5)_4^-$.

As used herein, tetrakis(3,5-bis(trifluoromethyl)phenyl) boryl refers to a radical of the formula $B(3,5-(CF_3)_2C_6H_3)_4^-$.

As used herein, hexafluorophosphate refers to a radical of the formula $PF_6^-$.

As used herein, sulfate refers to a radical of the formula $SO_4^{2-}$.

As used herein, hydrogensulfate refers to a radical of the formula $HSO_4^-$.

As used herein, the term "aromatic" or "aryl" refers to an aromatic ring system consisting solely of carbon and hydrogen atoms which may be mono-, bi- or tricyclic. Examples of such ring systems include phenyl, naphthalenyl, anthracenyl, indenyl or phenanthrenyl.

The following list provides definitions, including preferred definitions, for substituents $R^1$, $R^2$, $R^3$, $R^4$, $R^5$, $R^6$, $R^7$, $R^8$, $R^{18}$, $R^{19A}$, $R^{19B}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, X, Y, and Z, with reference to compounds herein disclosed. For any one of these substituents, any of the definitions given below may be combined with any definition of any other substituent given below or elsewhere in this document.

$R^1$ and $R^2$ are each independently $C_1$-$C_8$alkyl, $C_1$-$C_8$hydroxyalkyl, $C_1$-$C_8$cyanoalkyl, $C_1$-$C_6$alkoxy$C_1$-$C_8$alkyl, $C_1$-$C_8$haloalkyl, $C_2$-$C_6$alkenyl, $C_3$-$C_8$cycloalkyl, phenyl, phenyl$C_1$-$C_3$alkyl, phenylsulfonyl$C_1$-$C_3$alkyl, $C_1$-$C_6$alkoxycarbonyl, a bridged carbocyclyl, heterocyclyl or heteroaryl, wherein the cycloalkyl, phenyl, heterocyclyl and heteroaryl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, nitro, azido, and $C_2$-$C_6$alkenyl; or a single group selected from pinacolborane, phenylsulfonyl, phenyl$C_1$-$C_3$alkyl, and phenyl$C_1$-$C_3$alkoxy.

In one embodiment, $R^1$ is $C_1$-$C_6$alkyl, $C_1$-$C_4$hydroxyalkyl, $C_1$-$C_4$cyanoalkyl, $C_1$-$C_4$alkoxy$C_1$-$C_4$alkyl, $C_1$-$C_4$haloalkyl, $C_2$-$C_6$alkenyl, $C_5$-$C_8$cycloalkyl, phenyl, phenyl$C_1$-$C_3$alkyl, phenylsulfonyl$C_1$-$C_3$alkyl, $C_1$-$C_2$alkoxycarbonyl, a bridged $C_7$-$C_{10}$carbocyclyl I, heterocyclyl or heteroaryl, wherein the cycloalkyl, phenyl, heterocyclyl and heteroaryl moieties are each optionally substituted with 1 to 3 groups selected from hydroxyl, halogen, $C_1$-$C_3$alkyl, $C_1$-$C_3$haloalkyl, $C_1$-$C_3$alkoxy, phenyl, heteroaryl, $C_1$-$C_3$alkoxycarbonyl, acylamino, amido, cyano, nitro, azido, and $C_2$-$C_6$alkenyl; or a single group selected from pinacolborane, phenylsulfonyl, phenyl$C_1$-$C_2$alkyl, and phenyl$C_1$-$C_2$alkoxy.

Preferably, $R^1$ is $C_1$-$C_6$alkyl, $C_1$-$C_3$hydroxyalkyl, $C_1$-$C_3$alkoxy$C_1$-$C_3$alkyl, $C_2$-$C_4$alkenyl, $C_5$-$C_6$cycloalkyl, phenyl, phenyl$C_1$-$C_3$alkyl, $C_1$-$C_2$alkoxycarbonyl, a bridged $C_8$-$C_{10}$carbocyclyl, heterocyclyl or heteroaryl, wherein the cycloalkyl, phenyl, heterocyclyl and heteroaryl moieties are each optionally substituted with 1 to 3 groups selected from hydroxyl, halogen, $C_1$-$C_3$alkyl, $C_1$-$C_3$haloalkyl, $C_1$-$C_3$alkoxy, acylamino, amido, cyano, nitro, azido, and $C_2$-$C_6$alkenyl; or a single group selected from pinacolborane, phenylsulfonyl, phenyl$C_1$-$C_2$alkyl, and phenyl$C_1$-$C_2$alkoxy.

More preferably, $R^1$ is $C_1$-$C_6$alkyl, cyclohexyl, phenyl, phenyl$C_1$-$C_2$alkyl, adamantyl, or heteroaryl, wherein the phenyl, and heteroaryl moieties are each optionally substituted with 1 to 3 groups selected from halogen, hydroxyl, $C_1$-$C_3$alkyl, $C_1$-$C_3$haloalkyl, $C_1$-$C_3$alkoxy, nitro, azido, and $C_2$-$C_6$alkenyl; or a single group selected from pinacolborane, phenylsulfonyl, and phenyl$C_1$-$C_3$alkoxy.

Even more preferably, $R^1$ is $C_1$-$C_4$alkyl, cyclohexyl, phenyl, benzyl, adamantyl, or heteroaryl, wherein the phenyl, and heteroaryl moieties are each optionally substituted with 1 to 3 groups selected from halogen, hydroxyl, $C_1$-$C_3$alkyl, $C_1$-$C_3$haloalkyl, $C_1$-$C_3$alkoxy, nitro, azido, and $C_2$-$C_6$alkenyl; or a single group selected from pinacolborane, and phenylsulfonyl.

More preferably still, $R^1$ is isopropyl, t-butyl, cyclohexyl, adamantyl, phenyl, 2-methoxyphenyl, 2-nitrophenyl, 4-methoxyphenyl, 4-trifluorophenyl, 4-azidophenyl, 4-vinylphenyl, 2-naphthylmethoxyphenyl, [4-(4,4,5,5-tetramethyl-1,2,3-dioxaborolan-2-yl)phenyl], 1-hydroxybenzyl, 2-bromobenzyl, 4-methoxybenzyl, 1,1-diphenylmethyl, 1,1-dimethylbenzyl, 2,4,6-trimethylbenzyl, 2,4,6-trichlorobenzyl, 2-thienyl, or 1-(benzenesulfonyl)pyrrol-3-yl.

In one embodiment, $R^2$ is $C_1$-$C_6$alkyl, hydroxy$C_1$-$C_4$alkyl, $C_1$-$C_4$cyanoalkyl, $C_1$-$C_4$alkoxy$C_1$-$C_6$alkyl, $C_1$-$C_4$haloalkyl, $C_2$-$C_4$alkenyl, $C_1$-$C_4$alkoxycarbonyl, $C_3$-$C_8$cycloalkyl, phenyl, phenyl$C_1$-$C_3$alkyl, phenylsulfonyl$C_1$-$C_3$alkyl, heterocyclyl or heteroaryl, wherein the cycloalkyl, phenyl, heterocyclyl and heteroaryl moieties are each optionally substituted with 1 to 3 groups selected from hydroxyl, halogen, $C_1$-$C_4$alkyl, $C_3$-$C_6$cycloalkyl, $C_1$-$C_4$haloalkyl, $C_1$-$C_4$alkoxy, phenyl, heteroaryl, $C_1$-$C_3$alkoxycarbonyl, acylamino, amido, cyano, nitro, azido, and $C_2$-$C_4$alkenyl.

Preferably, $R^2$ is $C_1$-$C_4$alkyl, hydroxy$C_1$-$C_3$alkyl, $C_1$-$C_3$cyanoalkyl, $C_1$-$C_3$alkoxy$C_1$-$C_4$alkyl, $C_1$-$C_3$haloalkyl, $C_2$-$C_3$alkenyl, $C_1$-$C_3$alkoxycarbonyl, $C_3$-$C_6$cycloalkyl, phenylsulfonyl$C_1$-$C_3$alkyl, heterocyclyl or heteroaryl, wherein the cycloalkyl, phenyl, heterocyclyl and heteroaryl moieties are each optionally substituted with 1 to 3 groups selected from hydroxyl, halogen, $C_1$-$C_3$alkyl, $C_1$-$C_3$haloalkyl, $C_1$-$C_3$alkoxy, and $C_1$-$C_2$alkoxycarbonyl.

More preferably, $R^2$ is $C_1$-$C_4$alkyl, hydroxy$C_1$-$C_3$alkyl, $C_1$-$C_3$alkoxy$C_1$-$C_4$alkyl, $C_1$-$C_3$alkoxycarbonyl, $C_3$-$C_6$cycloalkyl, phenylsulfonyl$C_1$-$C_3$alkyl, or heterocyclyl, wherein the phenyl moiety is optionally substituted with 1 or 2 groups selected from hydroxyl, halogen, methyl, ethyl, trifluoromethyl, methoxy, ethoxy, methoxycarbonyl and ethoxycarbonyl.

Even more preferably $R^2$ is $C_1$-$C_4$alkyl, hydroxymethyl, hydroxyethyl, methoxybutyl, methoxycarbonyl, ethoxycarbonyl, $C_5$-$C_6$cycloalkyl, phenylsulfonyl$C_1$-$C_2$alkyl, or heterocyclyl, wherein the phenyl moiety is optionally substituted with a single group selected from halogen, methyl, trifluoromethyl, and methoxy.

More preferably still, $R^2$ is methyl, isopropyl, t-butyl, hydroxymethyl, methoxybutyl, ethoxycarbonyl, cyclopentyl, cyclohexyl, tetrahydropyranyl, or p-toluenesulfonylmethyl.

In one embodiment, $R^1$ and $R^2$ together with the carbon atom to which they are attached may form a 4- to 9-membered saturated or partially saturated asymmetric cycloalkyl, asymmetric bicyclyl, or asymmetric heterocyclyl ring, wherein the heterocyclic moiety is a non-aromatic monocyclic ring which comprises 1, 2 or 3 heteroatoms, wherein the heteroatoms are individually selected from N, O and S, and wherein the cycloalkyl, bicyclyl and heterocyclyl ring systems may each be optionally substituted with 1 to 3 groups selected from hydroxyl, halogen, $C_1$-$C_3$alkyl, $C_3$-$C_4$cycloalkyl, $C_1$-$C_3$haloalkyl, $C_1$-$C_3$alkoxy, $C_1$-$C_3$alkoxycarbonyl, cyano, and nitro.

Preferably, $R^1$ and $R^2$ together with the carbon atom to which they are attached may form a 4- to 9-membered saturated or partially saturated asymmetric cycloalkyl, asymmetric bicyclyl, or asymmetric heterocyclyl ring, wherein the heterocyclic moiety is a non-aromatic monocyclic ring which comprises 1 or 2 heteroatoms, wherein the heteroatoms are individually selected from N and O, and wherein the cycloalkyl, bicyclyl and heterocyclyl ring systems may each be optionally substituted with 1 to 3 groups selected from hydroxyl, halogen, $C_1$-$C_3$alkyl, $C_3$-$C_4$cycloalkyl, $C_1$-$C_3$haloalkyl, $C_1$-$C_3$alkoxy, $C_1$-$C_3$alkoxycarbonyl, cyano, and nitro.

More preferably, $R^1$ and $R^2$ together with the carbon atom to which they are attached may form a 4- to 9-membered saturated or partially saturated asymmetric cycloalkyl or asymmetric carbobicyclyl, and wherein the cycloalkyl and bicyclyl ring systems may each be optionally substituted with 1 to 3 groups selected from hydroxyl, halogen, $C_1$-$C_3$alkyl, $C_3$-$C_4$cycloalkyl, $C_1$-$C_3$haloalkyl, $C_1$-$C_3$alkoxy, $C_1$-$C_3$alkoxycarbonyl, cyano, and nitro.

Even more preferably, $R^1$ and $R^2$ together with the carbon atom to which they are attached may form an 8- to 9-membered saturated or partially saturated asymmetric carbobicyclyl, optionally substituted with 1 to 3 groups selected from hydroxyl, halogen, $C_1$-$C_3$alkyl, $C_3$-$C_4$cycloalkyl, $C_1$-$C_3$haloalkyl, $C_1$-$C_3$alkoxy, $C_1$-$C_3$alkoxycarbonyl, cyano, and nitro.

More preferably still, $R^1$ and $R^2$ together with the carbon atom to which they are attached may form an asymmetric indanyl moiety, optionally substituted with 1 to 3 groups selected from hydroxyl, halogen, $C_1$-$C_3$alkyl, $C_3$-$C_4$cycloalkyl, $C_1$-$C_3$haloalkyl, $C_1$-$C_3$alkoxy, $C_1$-$C_3$alkoxycarbonyl, cyano, and nitro. In a particularly preferable set of embodiments, $R^1$ and $R^2$ together with the carbon atom to which they are attached may form an asymmetric indanyl moiety, optionally substituted with a single group selected from hydroxyl, halogen, methyl, ethyl, cyclopropyl, trifluoromethyl, methoxy, ethoxy and methoxycarbonyl. In a further particularly preferable set of embodiments, $R^1$ and $R^2$ together with the carbon atom to which they are attached may form an asymmetric 2-methylindan-1-yl or an asymmetric 2-methoxycarbonylindan-1-yl.

In one set of embodiments, $R^3$ is hydrogen, $C_1$-$C_8$alkyl, $C_1$-$C_8$hydroxyalkyl, $C_1$-$C_8$cyanoalkyl, $C_1$-$C_6$alkoxy$C_1$-$C_8$alkyl, $C_1$-$C_8$haloalkyl, $C_2$-$C_6$alkenyl, $C_3$-$C_8$cycloalkyl, phenyl$C_1$-$C_3$alkyl, heterocyclyl$C_1$-$C_3$alkyl or heterobicyclyl$C_1$-$C_3$alkyl, wherein the cycloalkyl, and heterocyclyl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, azido, nitro, oxo, and $C_2$-$C_6$alkenyl.

Preferably, $R^3$ is hydrogen, $C_1$-$C_6$alkyl, $C_1$-$C_4$hydroxyalkyl, $C_1$-$C_4$cyanoalkyl, $C_1$-$C_2$alkoxy$C_1$-$C_4$alkyl, $C_1$-$C_4$haloalkyl, $C_2$-$C_4$alkenyl, $C_3$-$C_6$cycloalkyl, phenyl$C_1$-$C_3$alkyl, heterocyclyl$C_1$-$C_3$alkyl or heterobicyclyl$C_1$-$C_3$alkyl, wherein the cycloalkyl, and heterocyclyl moieties are each optionally substituted with 1 to 3 groups selected from hydroxyl, halogen, $C_1$-$C_3$alkyl, $C_3$-$C_6$cycloalkyl, $C_1$-$C_3$haloalkyl, $C_1$-$C_3$alkoxy, $C_1$-$C_3$alkoxycarbonyl, cyano, nitro, oxo, and $C_2$-$C_4$alkenyl.

More preferably, $R^3$ is hydrogen, $C_1$-$C_4$alkyl, phenyl$C_1$-$C_2$alkyl, heterocyclyl$C_1$-$C_2$alkyl or heterobicyclyl$C_1$-$C_2$alkyl, wherein the heterocyclyl moieties are each optionally substituted with 1 or 2 groups selected from halogen, methyl, ethyl, trifluoromethyl, methoxy, ethoxy, cyano, nitro, oxo, and $C_2$-$C_4$alkenyl.

Even more preferably, $R^3$ is hydrogen, $C_1$-$C_4$alkyl, benzyl, 2-methyl-1,3,-dioxolanyl, or isoindoline-1,3-dione-N-ethyl. More preferably, $R^3$ is hydrogen, methyl, t-butyl, benzyl, 2-methyl-1,3,-dioxolanyl, or isoindoline-1,3-dione-N-ethyl.

In one set of embodiments, $R^1$ and $R^3$ together with the carbon and oxygen atoms to which they are respectively attached, may form a partially saturated 10-membered heterobicyclic group, comprising 2 to 3 heteroatoms selected from oxygen and nitrogen. Preferably, $R^1$ and $R^3$ together with the carbon and oxygen atoms to which they are respectively attached, may form a 3,4-dihydro-1H-2,3-benzoxazine ring.

In a further set of embodiments, $R^1$ and $R^2$ are each independently $C_1$-$C_8$alkyl, $C_1$-$C_8$hydroxyalkyl, $C_1$-$C_8$cyanoalkyl, $C_1$-$C_6$alkoxy$C_1$-$C_8$alkyl, $C_1$-$C_8$haloalkyl, $C_2$-$C_6$alkenyl, $C_3$-$C_8$cycloalkyl, phenyl, phenyl$C_1$-$C_3$alkyl or heteroaryl, and wherein the cycloalkyl and phenyl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, nitro and $C_2$-$C_6$alkenyl;

$R^3$ is hydrogen, $C_1$-$C_8$alkyl, $C_1$-$C_8$hydroxyalkyl, $C_1$-$C_8$cyanoalkyl, $C_1$-$C_6$alkoxy$C_1$-$C_8$alkyl, $C_1$-$C_8$haloalkyl, $C_2$-$C_6$alkenyl, $C_3$-$C_8$cycloalkyl, phenyl, phenyl$C_1$-$C_3$alkyl and heteroaryl, and wherein the cycloalkyl and phenyl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, nitro and $C_2$-$C_6$alkenyl;

and wherein $R^1$ and $R^2$ cannot be the same; or $R^1$ and $R^2$ together with the carbon atom to which they are attached may form a 4- to 8-membered asymmetric saturated cycloalkyl or asymmetric heterocyclyl ring, wherein the heterocyclic moiety is a non-aromatic monocyclic ring which comprises 1, 2 or 3 heteroatoms, wherein the heteroatoms are individually selected from N, O and S.

In another set of embodiments $R^1$ is phenyl or benzyl, wherein the aromatic ring of each phenyl or benzyl moiety is optionally substituted with 1, 2, or 3 groups independently selected from chloro, methyl, methoxy, methoxycarbonyl and nitro;

$R^2$ represents methyl or isopropyl; and $R^3$ represents hydrogen, methyl, ethyl, isopropyl, t-butyl, allyl or benzyl, preferably, hydrogen, methyl, ethyl, isopropyl, t-butyl or benzyl.

Preferably, the oxime of formula (I) is N-methoxy-1-(2,4,6-trichlorophenyl)propan-2-imine (i.e. a compound of formula I-1);

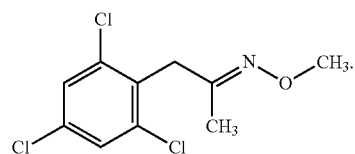

(I-1)

Preferably, the hydroxylamine of formula (II) is (2R)-N-methoxy-1-(2,4,6-trichlorophenyl) propan-2-amine (i.e. a compound of formula II-1) or (2S)-N-methoxy-1-(2,4,6-trichlorophenyl) propan-2-amine (i.e. a compound of formula II-1-ent), most preferably, (2S)-N-methoxy-1-(2,4,6-trichlorophenyl) propan-2-amine (i.e. a compound of formula II-1-ent):

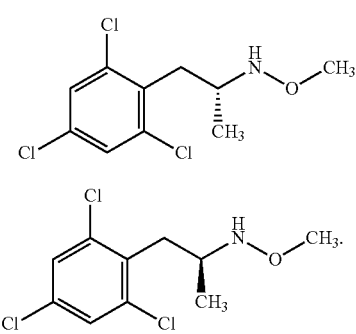

(II-1)

(II-1-ent)

In the chiral iridium catalyst of formula (IIIa) or formula (IIIb), the cyclopentadienyl ligand

is a chiral cyclopentadienyl ligand; or the bidentate chelating ligand

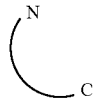

is a chiral bidentate chelating ligand; or both the cyclopentadienyl ligand and the bidentate chelating ligand are chiral.

In one embodiment, the cyclopentadienyl ligand is a chiral cyclopentadienyl ligand, such ligands are described for example in *Angew. Chem. Int. Ed.* 2018, 57, 5459; *J. Am. Chem. Soc.* 2016, 138, 5242; *J. Am. Chem. Soc.* 2016, 138, 3935; *Acc. Chem. Res.* 2015, 48, 1308; *J. Am. Chem. Soc.* 2015, 137, 12478; *Angew. Chem. Int. Ed.* 2015, 54, 12149; *Organometallics* 2019, 38, 3939; and Synlett 2015, 26, 1490. A person skilled in the art would recognize that both enantiomers of the chiral cyclopentadienyl ligands may be prepared using essentially the same preparative methods, but starting from the opposite enantiomers of the starting materials.

Preferably, the iridium catalyst is of the formula (IIIa-1) (IIIb-1) or the corresponding enantiomeric formula (IIIa-1-ent) or (IIIb-1-ent):

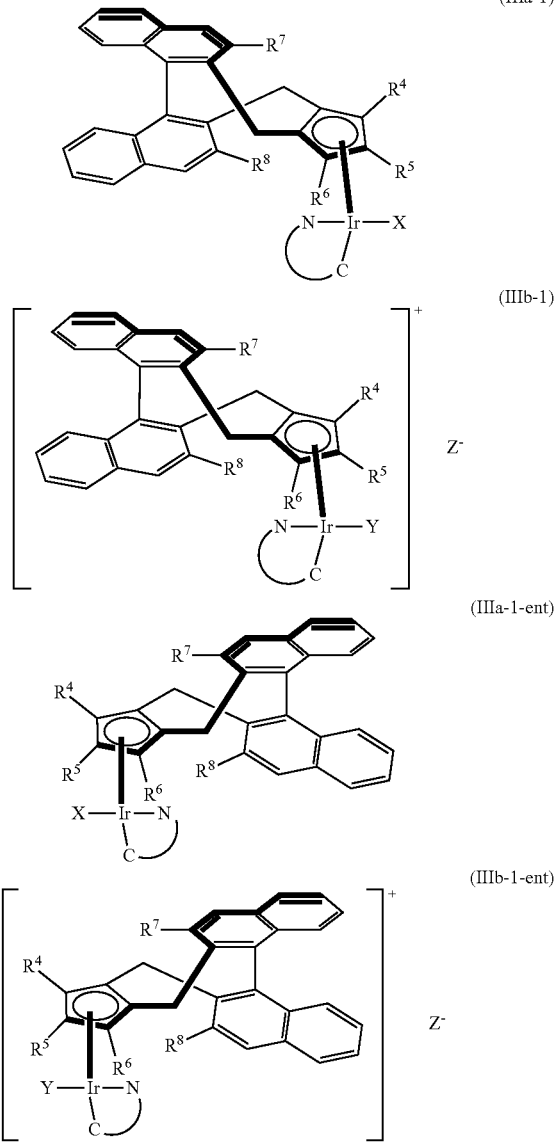

wherein $R^4$, $R^5$, and $R^6$ are each independently hydrogen or $C_1$-$C_3$alkyl. Preferably, $R^4$, $R^5$, and $R^6$ are each independently hydrogen, methyl or isopropyl, more preferably, $R^4$, $R^5$, and $R^6$ each represent hydrogen.

$R^7$ and $R^8$ are each independently hydrogen, hydroxyl, $C_1$-$C_8$alkyl, $C_1$-$C_8$alkoxy, $C_3$-$C_8$cycloalkyl, phenyl, phenoxy, naphthyl, benzyl, or tert-butyldiphenylsilyloxy, wherein the aromatic ring of each phenyl, naphthyl or benzyl moiety is optionally substituted with 1 to 5 groups selected from $C_1$-$C_6$alkyl, $C_1$-$C_6$haloalkyl and $C_1$-$C_6$alkoxy.

Preferably, $R^7$ and $R^8$ are each independently $C_1$-$C_6$alkoxy, phenyl, naphthyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. More preferably, $R^7$ and $R^8$ are each independently $C_1$-$C_6$alkoxy, phenyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. Even more preferably, $C_1$-$C_3$alkoxy and phenyl, wherein the phenyl moieties are each optionally substituted with 1 to 3 groups selected from $C_1$-$C_3$alkyl and $C_1$-$C_3$alkoxy. More preferably still, $R^7$ and $R^8$ are each independently methoxy, iso-propoxy, phenyl, phenoxy or tert-butyldiphenylsilyloxy. Even more preferably still, $R^7$ and $R^8$ are each independently methoxy, iso-propoxy or phenyl.

In one set of embodiments, $R^7$ and $R^8$ are each independently methoxy, iso-propoxy, phenyl, 4-methoxyphenyl or naphthyl.

Wherein

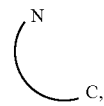

X, Y and Z are as defined above.

Particularly preferred examples of the cyclopentadienyl ligand are $C_2$-symmetrical chiral cyclopentadienyl ligands of formulas (IX-1), (IX-2), (IX-3), (IX-4), (IX-5), (X-1), or (X-2), as shown below:

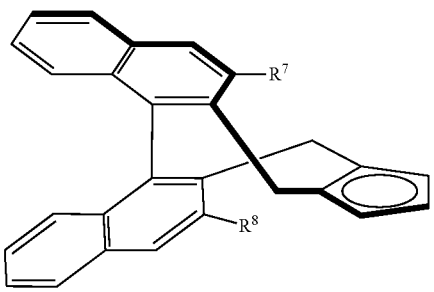

(IX-1) $R^7$, $R^8$ = Ph
(IX-2) $R^7$, $R^8$, = 4-OMe—Ph
(IX-3) $R^7$, $R^8$, = 3,5-bisCF$_3$—Ph
(IX-4) $R^7$, $R^8$, = 3,5-bisCH$_3$—Ph
(IX-5) $R^7$, $R^8$, = 2-naphthyl

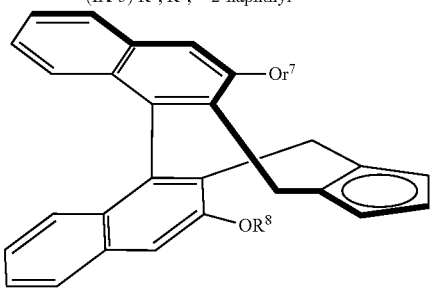

(X-1) $R^7$, $R^8$ = Me
(X-2) $R^7$, $R^8$ = iPr and the opposite enantiomers thereof (IX-1-ent), (IX-2-ent), (IX-3-ent), (IX-4-ent), (IX-5-ent), (X-1-ent), or (X-2-ent):

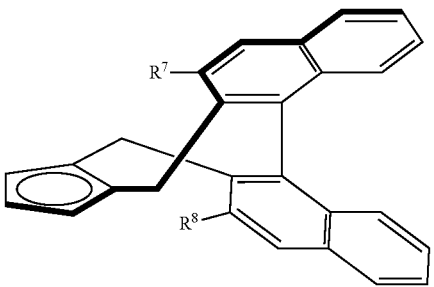

(IX-1-ent) R⁷, R⁸ = Ph
(IX-2-ent) R⁷, R⁸, = 4-OMe—Ph
(IX-3-ent) R⁷, R⁸ = 3,5-bisCF₃—Ph
(IX-4-ent) R⁷, R⁸ = 3,5-bisCH₃—Ph
(IX-5-ent) R⁷, R⁸ = 2-naphthyl

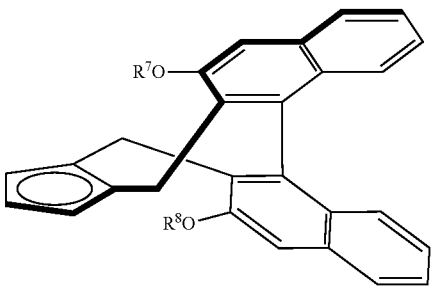

(X-1-ent) R⁷, R⁸ = Me
(X-2-ent) R⁷, R⁸ = iPr

In a further embodiment of the invention, there is also provided iridium catalysts of formula (IIIa-2) and (IIIb-2) and the corresponding enantiomeric formula (IIIa-2-ent) or (IIIb-2-ent):

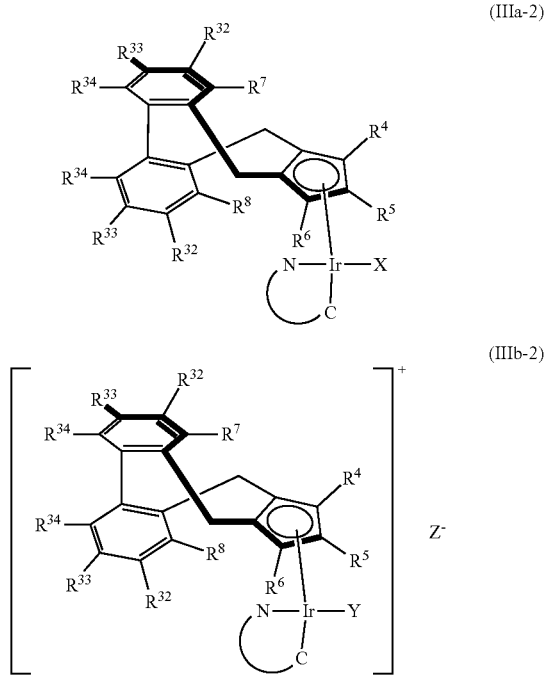

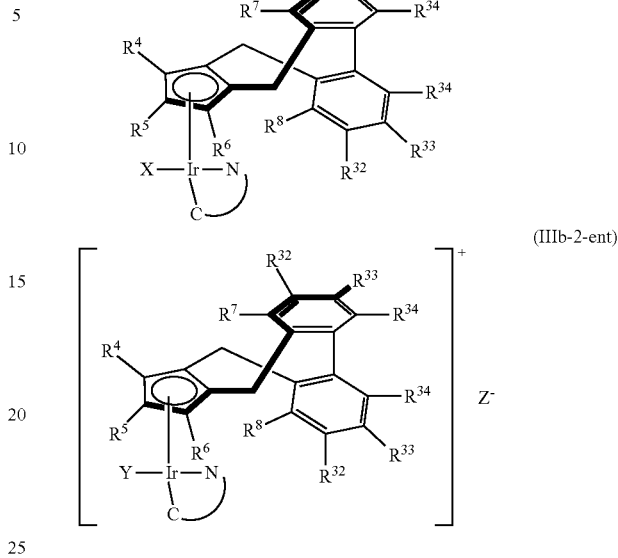

wherein $R^4$, $R^5$, and $R^6$ are each independently hydrogen or $C_1$-$C_3$alkyl. Preferably, $R^4$, $R^5$, and $R^6$ are each independently hydrogen, methyl or isopropyl, more preferably, $R^4$, $R^5$, and $R^6$ each represent hydrogen.

$R^7$ and $R^8$ are each independently hydrogen, hydroxyl, $C_1$-$C_8$alkyl, $C_1$-$C_8$alkoxy, $C_3$-$C_8$cycloalkyl, phenyl, phenoxy, naphthyl, benzyl, or tert-butyldiphenylsilyloxy, wherein the aromatic ring of each phenyl, naphthyl or benzyl moiety is optionally substituted with 1 to 5 groups selected from $C_1$-$C_6$alkyl, $C_1$-$C_6$haloalkyl and $C_1$-$C_6$alkoxy.

Preferably, $R^7$ and $R^8$ are each independently $C_1$-$C_6$alkoxy, phenyl, naphthyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. More preferably, $R^7$ and $R^8$ are each independently $C_1$-$C_6$alkoxy, phenyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. Even more preferably, $C_1$-$C_3$alkoxy and phenyl, wherein the phenyl moieties are each optionally substituted with 1 to 3 groups selected from $C_1$-$C_3$alkyl and $C_1$-$C_3$alkoxy. Even more preferably, $R^7$ and $R^8$ are each independently methoxy, iso-propoxy, phenyl, phenoxy or tert-butyldiphenylsilyloxy. More preferably still, methoxy, iso-propoxy or phenyl.

In one set of embodiments, $R^7$ and $R^8$ are each independently methoxy, iso-propoxy, phenyl, 4-methoxyphenyl or naphthyl.

$R^{32}$ and $R^{33}$ are each independently hydrogen, halogen, $C_1$-$C_3$alkyl, $C_1$-$C_3$alkoxy, $C_3$-$C_8$cycloalkyl, $C_1$-$C_3$haloalkyl, $C_1$-$C_3$haloalkoxy, or phenyl. Preferably, $R^{32}$ and $R^{33}$ are each independently hydrogen, halogen, $C_1$-$C_3$alkyl, or $C_1$-$C_3$alkoxy, more preferably, $R^{32}$ and $R^{33}$ are each independently hydrogen, methyl or methoxy. Most preferably, $R^{32}$ and $R^{33}$ are both hydrogen.

$R^{34}$ is halogen, $C_1$-$C_3$alkyl, $C_1$-$C_3$alkoxy, $C_3$-$C_8$cycloalkyl, $C_1$-$C_3$haloalkyl, $C_1$-$C_3$haloalkoxy, or phenyl. Preferably, $R^{34}$ is halogen, $C_1$-$C_3$alkyl, or $C_1$-$C_3$alkoxy, more preferably $R^{34}$ is methyl or methoxy, most preferably methoxy.

Or, $R^{32}$ and $R^{33}$, or $R^{33}$ and $R^{34}$, or $R^{32}$ and $R^{34}$ together with the carbon atoms to which they are attached may form a 5- to 10-membered carbocyclyl or heterocyclyl ring, wherein the heterocyclic moiety is a monocyclic ring which comprises 1, 2 or 3 heteroatoms, wherein the heteroatoms are individually selected from N, O and S.

Particularly preferred examples of the cyclopentadienyl ligand are $C_2$-symmetrical chiral cyclopentadienyl ligands of formulas (IX-6), (IX-7), (X-3), or (X-4):

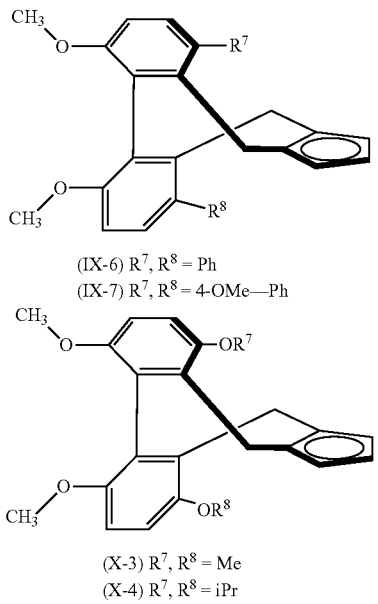

(IX-6) $R^7$, $R^8$ = Ph
(IX-7) $R^7$, $R^8$ = 4-OMe—Ph (X-3) $R^7$, $R^8$ = Me
(X-4) $R^7$, $R^8$ = iPr and the opposite enantiomers thereof (IX-6-ent), (IX-7-ent), (X-3-ent), or (X-4-ent):

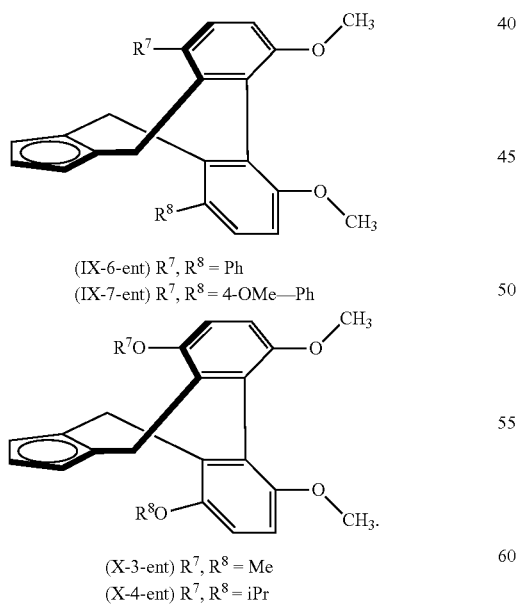

(IX-6-ent) $R^7$, $R^8$ = Ph
(IX-7-ent) $R^7$, $R^8$ = 4-OMe—Ph (X-3-ent) $R^7$, $R^8$ = Me
(X-4-ent) $R^7$, $R^8$ = iPr It is common in the field of enantioselective catalysis and known to the skilled person that if a compound of formula (II) enriched in a particular enantiomer (II or II-ent) is obtained using a particular enantiomer of catalyst (III), then the opposite enantiomer of the compound of formula (II) is obtained using the opposite enantiomer of the catalyst (III-ent). The present invention relates to a process for the enantioselective preparation of compounds of formula (II) and salts thereof enriched in any one of the chiral isomers. The ratio of the corresponding chiral isomers (II):(II-ent) may be for example from 1:100 to 100:1, more particularly, 60:40, 70:30, 80:20, 90:10, 95:5, 99:1 or the ratio of the corresponding chiral isomers (II):(II-ent) may be for example 40:60, 30:70, 20:80, 10:90, 5:95, 1:99.

Represents a bidentate chelating ligand comprising at least one carbon atom which coordinates to iridium and at least one nitrogen atom which coordinates to iridium. Many metal-chelating ligands are known to those skilled in the art, and will be suitable for use in the present invention. Particularly suitable bidentate chelating ligands are those with a 1,4-relationship between the coordinating nitrogen and carbon atoms, preferably, those where the coordinating carbon atom forms part of an aromatic ring, wherein said aromatic ring is substituted in the ortho position.

Examples of suitable bidentate chelating ligand are derivatives of structure (IV), (IVa) or (IVb):

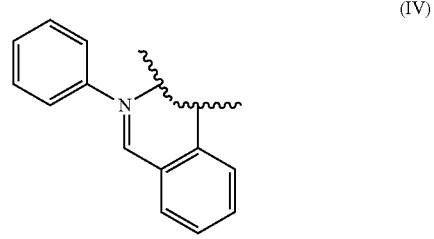

(IV)

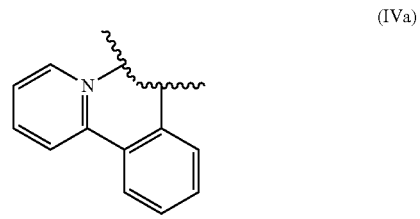

(IVa)

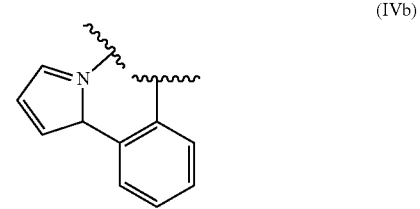

(IVb)

Preferred bidentate chelating C,N ligands are ligands of structure (IVc):

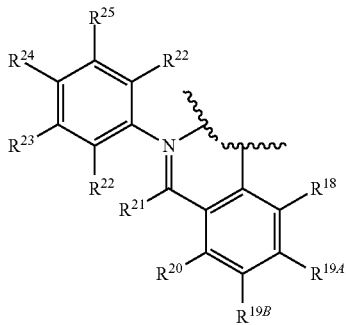

(IVc)

wherein $R^{18}$, $R^{19A}$, $R^{19B}$, $R^{20}$, $R^{22}$, $R^{23}$, $R^{24}$ and $R^{25}$ are each independently hydrogen, halogen, $C_1$-$C_8$alkyl, $C_1$-$C_8$alkoxy, $C_1$-$C_8$haloalkyl, $C_1$-$C_8$haloalkoxy, or $C_1$-$C_8$alkoxycarbonyl, wherein each $C_1$-$C_8$alkoxy moiety is optionally substituted by 1 or 2 groups selected from hydroxy, $C_1$-$C_8$alkoxy, $C_1$-$C_8$alkyl, $C_1$-$C_8$alkoxycarbonyl and phenyl, preferably each $C_1$-$C_8$alkoxy moiety is optionally substituted by 1 or 2 groups selected from hydroxy, $C_1$-$C_8$alkoxy, $C_1$-$C_8$alkyl, and phenyl.

Preferably, $R^{18}$, $R^{19A}$, $R^{19B}$, $R^{20}$, $R^{22}$, $R^{23}$, $R^{24}$ and $R^{25}$ are each independently hydrogen, halogen, $C_1$-$C_6$alkyl, $C_1$-$C_6$alkoxy, $C_1$-$C_6$haloalkyl, $C_1$-$C_6$haloalkoxy, or $C_1$-$C_6$alkoxycarbonyl, wherein each $C_1$-$C_6$alkoxy moiety is optionally substituted by 1 or 2 groups selected from hydroxy, $C_1$-$C_6$alkoxy, $C_1$-$C_6$alkyl, $C_1$-$C_6$alkoxycarbonyl and phenyl, preferably each $C_1$-$C_6$alkoxy moiety is optionally substituted by 1 or 2 groups selected from hydroxy, $C_1$-$C_6$alkoxy, $C_1$-$C_6$alkyl, and phenyl.

Preferably, $R^{18}$ is hydrogen, $C_1$-$C_3$alkoxy, (hydroxy)-$C_1$-$C_3$alkoxy, ($C_1$-$C_3$alkoxy)-$C_1$-$C_3$alkoxy, ($C_1$-$C_8$alkoxyC$_1$-$C_8$alkoxy)-$C_1$-$C_8$alkoxy, $C_1$-$C_4$alkoxy($C_1$-$C_4$alkoxyC$_1$-$C_4$alkyl)-$C_1$-$C_4$alkoxy, or ($C_1$-$C_3$alkoxycarbonyl)-$C_1$-$C_3$alkoxy, more preferably, hydrogen, $C_1$-$C_3$alkoxy, (hydroxy)-$C_1$-$C_3$alkoxy or ($C_1$-$C_3$alkoxy)-$C_1$-$C_3$alkoxy. Even more preferably, $R^{18}$ is hydrogen, methoxy, ethoxy, 2-hydroxyethoxy, 2-methoxyethoxy, [2-methoxy-1-(methoxymethyl)ethoxy], 2-(2-methoxyethoxy)ethoxy, 2-methoxy-2-oxo-ethoxy, or (2-iso-propoxy-2-oxo-methoxy). More preferably still, $R^{18}$ is hydrogen, methoxy, ethoxy, 2-hydroxyethoxy, 2-methoxyethoxy, [2-methoxy-1-(methoxymethyl)ethoxy] or 2-(2-methoxyethoxy)ethoxy.

Preferably, $R^{19A}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19A}$ is hydrogen or $C_1$-$C_3$alkoxy, and more preferably still, hydrogen or methoxy.

Preferably, $R^{19B}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19B}$ is hydrogen or $C_1$-$C_3$alkoxy, and more preferably still, hydrogen or methoxy.

Preferably, $R^{20}$ is hydrogen, $C_1$-$C_3$alkyl, or $C_1$-$C_3$alkoxy. More preferably, $R^{20}$ is hydrogen, methyl, ethyl, methoxy or ethoxy. Even more preferably, $R^{20}$ is hydrogen or methoxy. More preferably still $R^{20}$ is hydrogen.

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy. Preferably, $R^{21}$ is hydrogen, $C_1$-$C_6$alkyl or phenyl, wherein each phenyl moiety is optionally substituted by 1 to 3 groups selected from $C_1$-$C_3$alkyl and $C_1$-$C_3$alkoxy. More preferably, $R^{21}$ is hydrogen, $C_1$-$C_3$alkyl or phenyl, and even more preferably, $C_1$-$C_3$alkyl. More preferably still, $R^{21}$ is methyl.

Preferably, $R^{22}$ is hydrogen or $C_1$-$C_3$alkyl, more preferably, $R^{22}$ is hydrogen.

Preferably, $R^{23}$ is hydrogen, $C_1$-$C_3$alkyl, or $C_1$-$C_3$alkoxy, more preferably, hydrogen, methyl, ethyl, methoxy or ethoxy. Even more preferably, $R^{23}$ is hydrogen or methyl. More preferably still $R^{23}$ is methyl.

Preferably, $R^{24}$ is $C_1$-$C_3$alkoxy, more preferably, methoxy.

Preferably, $R^{25}$ is hydrogen, $C_1$-$C_3$alkyl, or $C_1$-$C_3$alkoxy. More preferably, $R^{25}$ is hydrogen, methyl, ethyl, methoxy or ethoxy. Even more preferably, $R^{25}$ is hydrogen or methyl, and more preferably still, methyl.

In one embodiment, $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S. Preferably, $R^{20}$ and $R^{21}$ together with the carbon atoms to which they are attached may form a 6- or 7-membered partially saturated cycloalkyl or heterocyclyl ring, wherein the heterocyclic moiety is a non-aromatic ring which comprises 1 heteroatom, wherein the heteroatom is selected from O and S. Even more preferably, $R^{20}$ and $R^{21}$ together with the carbon atoms to which they are attached may form a 6- or 7-membered partially saturated cycloalkyl ring, or a 6-membered partially saturated dihydropyranyl ring;

In one embodiment, $R^{24}$ and $R^{25}$ together with the carbon atoms to which they are attached may form a 6-membered unsaturated ring.

In a bidentate chelating ligand according to structure (IVc), preferably:

$R^{18}$ is hydrogen, methoxy, 2-methoxyethoxy, [2-methoxy-1-(methoxymethyl)ethoxy], 2-(2-methoxyethoxy)ethoxy, 2-hydroxyethoxy, 2-methoxy-2-oxo-ethoxy, or (2-iso-propoxy-2-oxo-methoxy); $R^{19A}$ and $R^{19B}$ are each independently selected from hydrogen and methoxy;

$R^{20}$ is hydrogen, methyl or methoxy;

$R^{21}$ is methyl; or $R^{20}$ and $R^{21}$ together with the together with the carbon atoms to which they are attached may form a 6- or 7-membered partially saturated cycloalkyl ring or a non-aromatic heterocyclyl ring which comprises 1 oxygen;

$R^{22}$ is hydrogen;

$R^{23}$ is hydrogen or methyl;

$R^{24}$ is methoxy; and $R^{25}$ is hydrogen or methyl.

More preferably, $R^{18}$ is hydrogen, methoxy, 2-methoxyethoxy, [2-methoxy-1-(methoxymethyl)ethoxy] or 2-(2-methoxyethoxy)ethoxy;

$R^{19A}$ and $R^{19B}$ are each independently selected from hydrogen and methoxy;

$R^{20}$ is hydrogen, methyl or methoxy;

$R^{20}$ is hydrogen;

$R^{21}$ is methyl; or $R^{20}$ and $R^{21}$ together with the together with the carbon atoms to which they are attached may form a 6- or 7-membered partially saturated cycloalkyl ring;

$R^{22}$ is hydrogen;

$R^{23}$ is hydrogen or methyl;

$R^{24}$ is methoxy; and $R^{25}$ is hydrogen or methyl.

In one set of embodiments, $R^{18}$ is hydrogen, methoxy, methoxyethoxy, 2(2-methoxyethoxy)ethoxy, [2-methoxy-1-(methoxymethyl)ethoxy], 2-hydroxyethoxy, or 2-methoxy-2-oxo-ethoxy;

$R^{19A}$ and $R^{19B}$ are each independently selected from hydrogen and methoxy;

$R^{20}$ is hydrogen;

$R^{21}$ is methyl; or $R^{20}$ and $R^{21}$ together with the carbon atoms to which they are attached from a 6- or 7-membered partially saturated cycloalkyl, or a 6-membered partially saturated dihydropyranyl ring;

$R^{22}$ is hydrogen;

$R^{23}$ and $R^{25}$ are each independently selected from hydrogen and methyl; and $R^{24}$ is methoxy; or $R^{24}$ and $R^{25}$ together with the carbon atoms to which they are attached from a 6-membered unsaturated ring.

Preferred examples of bidentate chelating ligands are compounds of formulas (IV-1), (IV-2), (IV-3), (IV-4), (IV-5), (IV-6), (IV-7), (IV-8), (IV-9), (IV-10), (IV-13), (IV-14), (IV-15), (IV-16), (IV-17) or (IV-18), particularly, compounds of formulas (IV-1), (IV-2), (IV-3), (IV-4), (IV-5), (IV-6), (IV-7), (IV-8), (IV-9), (IV-10), (IV-13) and (IV-14), as shown below:

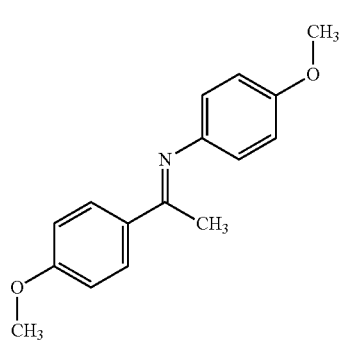
(IV-1)

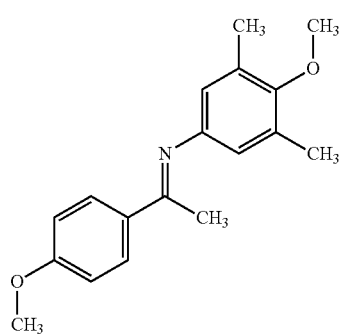
(IV-2)

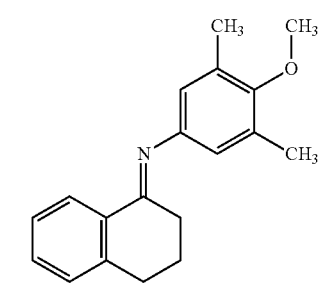
(IV-3)

-continued

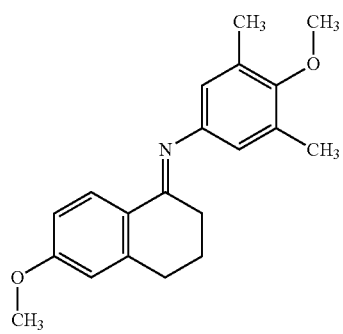
(IV-4)

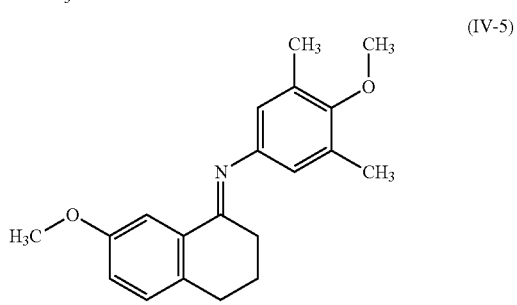
(IV-5)

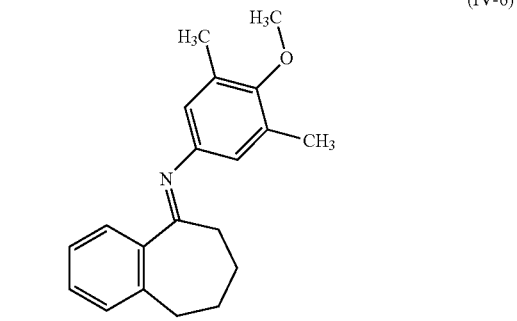
(IV-6)

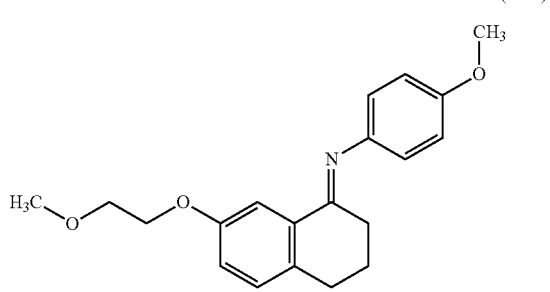
(IV-7)

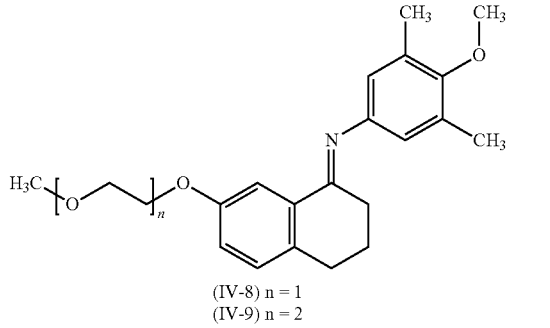
(IV-8) n = 1
(IV-9) n = 2

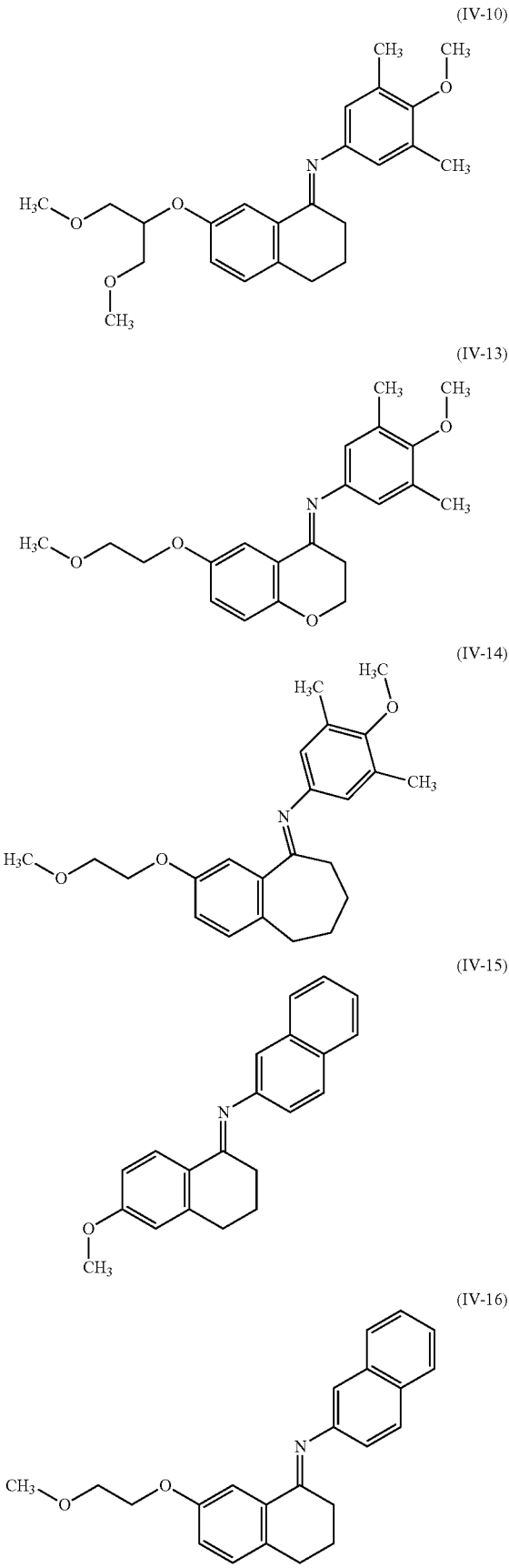
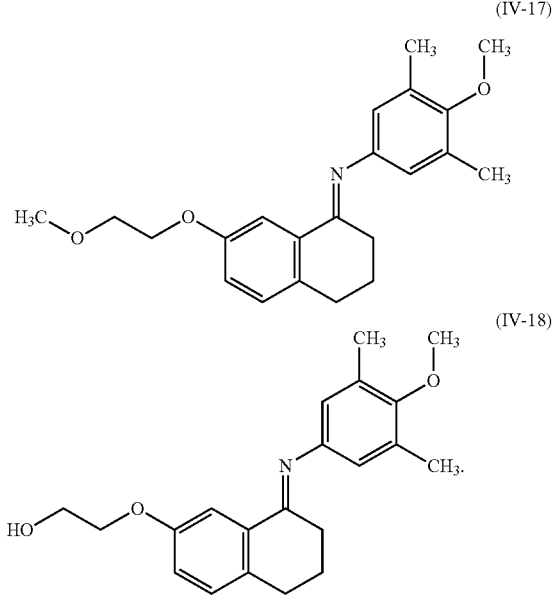

According to the present invention, X represents an anionic group, that is, a group with a net negative charge, and wherein X is not a halogen. In complexes of (IIIa) wherein X is a halogen, we have found that the anionic group is too tightly bound to the metal and such complex doesn't give sufficient amount of the catalytically active hydride intermediate under acidic hydrogenation conditions. Examples of suitable anionic groups X include the anionic ligands of the formula $R^{14}$—$SO_2O^-$ or $R^{15}$—$C(O)O^-$.

$R^{14}$ is halogen, hydroxy, $C_1$-$C_6$alkyl, $C_1$-$C_6$alkoxy, $C_1$-$C_6$haloalkyl, or phenyl, wherein the phenyl moieties are optionally substituted by 1, 2, 3 or 4 substituents, which may be the same or different, selected from $R^{16}$.

$R^{16}$ is $C_1$-$C_4$alkyl, $C_1$-$C_4$haloalkyl, nitro, or halogen, preferably methyl, ethyl, trifluoromethyl, nitro or halogen, more preferably methyl or halogen, even more preferably methyl, chloro or fluoro.

Preferably, $R^{14}$ is hydroxy, methyl, trifluoromethyl, phenyl or tolyl.

$R^{15}$ is $C_1$-$C_6$haloalkyl or phenyl, wherein the phenyl moieties are optionally substituted by 1, 2, 3 or 4 substituents, which may be the same or different, selected from $R^{17}$.

$R^{17}$ is $C_1$-$C_4$alkyl, $C_1$-$C_4$haloalkyl, nitro or halogen.

Preferably, $R^{15}$ is trifluoromethyl.

In one embodiment, X is mesylate, tosylate, nosylate, sulfate, hydrogensulfate, triflate or trifluoroacetate.

Y represents a neutral ligand, that is, a ligand without an overall charge. Examples of neutral ligands include $H_2O$, alcohols, ethers, ketones, esters, amides and nitriles. Preferably, Y is $H_2O$, PhCN or MeCN, more preferably, $H_2O$ or MeCN, and most preferably Y is $H_2O$.

Z represents an anionic group, that is, a group with a net negative charge, and wherein Z is not a halogen or acetate. Examples of anionic groups include ligands of the formula $R^{14}$—$SO_2O^-$ (wherein $R^{14}$ is described above), tetrafluoroborate, hexafluorophosphate, perchlorate, tetraphenylborate, tetrakis(3,5-bis(trifluoromethyl)phenyl)borate, tetrakis(pentafluorophenyl) borate, fluorinated alkoxyaluminates, mesylate, triflate, tosylate, nitrate, hydrogensulfate or sulfate, and other weakly coordinating anionic groups. Preferably, Z is of the formula $R^{14}$—$SO_2O^-$ (wherein $R^{14}$ is described above), mesylate, sulfate, hydrogensulfate, tetrafluoroborate, hexafluorophosphate, tetraphenylborate, or tetrakis(3,5-bis(trifluoromethyl)phenyl)borate, more preferably, mesylate or tetrafluoroborate.

In another embodiment wherein the chiral iridium catalyst is a compound of formula (IIIa) or formula (IIIb), the bidentate chelating ligand is a chiral bidentate chelating ligand. The cyclopentadienyl ligand is a chiral cyclopentadienyl ligand (as described above) or an achiral cyclopentadienyl ligand, such achiral cyclopentadienyl ligands are described for example in Hartwig, *J. Organotransition Metal Chemistry: From Bonding to Catalysis*; University Science Books: Sausalito, C A, 2010; *Chem. Soc. Rev.* 2012, 41, 4484-4510; *Coord. Chem. Rev.* 2015, 296, 45-90. Examples of suitable achiral cyclopentadienyl ligands are cyclopentadiene (Cp) and 1,2,3,4,5-pentamethylcyclopentadiene (Cp*) and derivatives thereof.

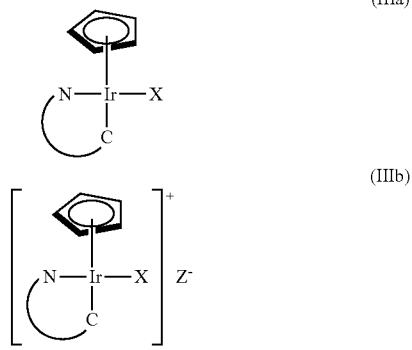

Examples of suitable chiral bidentate chelating ligands

are derivatives of structure (Ive):

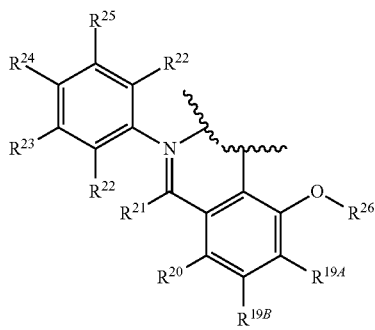

wherein $R^{19A}$, $R^{19B}$, $R^{20}$, $R^{22}$, $R^{23}$, $R^{24}$ and $R^{25}$ are each independently hydrogen, halogen, $C_1$-$C_8$alkyl, $C_1$-$C_8$alkoxy, $C_1$-$C_8$haloalkyl, $C_1$-$C_8$haloalkoxy, or $C_1$-$C_8$alkoxycarbonyl, wherein each $C_1$-$C_8$alkoxy moiety is optionally substituted by 1 or 2 groups selected from hydroxy, $C_1$-$C_8$alkoxy, $C_1$-$C_8$alkyl, $C_1$-$C_8$alkoxycarbonyl and phenyl, preferably each $C_1$-$C_8$alkoxy moiety is optionally substituted by 1 or 2 groups selected from hydroxy, $C_1$-$C_8$alkoxy, $C_1$-$C_8$alkyl, and phenyl.

Preferably, $R^{19A}$, $R^{19B}$, $R^{20}$, $R^{22}$, $R^{23}$, $R^{24}$ and $R^{25}$ are each independently hydrogen, halogen, $C_1$-$C_6$alkyl, $C_1$-$C_6$alkoxy, $C_1$-$C_6$haloalkyl, $C_1$-$C_6$haloalkoxy, or $C_1$-$C_6$alkoxycarbonyl, wherein each $C_1$-$C_6$alkoxy moiety is optionally substituted by 1 or 2 groups selected from hydroxy, $C_1$-$C_6$alkoxy, $C_1$-$C_6$alkyl, $C_1$-$C_6$alkoxycarbonyl and phenyl, preferably each $C_1$-$C_6$alkoxy moiety is optionally substituted by 1 or 2 groups selected from hydroxy, $C_1$-$C_6$alkoxy, $C_1$-$C_6$alkyl, and phenyl.

In one set of embodiments, $R^{19A}$, $R^{19B}$, $R^{20}$, $R^{23}$, $R^{24}$ and $R^{25}$ are each independently hydrogen, $C_1$-$C_8$alkyl, or $C_1$-$C_8$alkoxy.

Preferably, $R^{19A}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19A}$ is hydrogen or $C_1$-$C_3$alkoxy, and more preferably still, hydrogen or methoxy.

Preferably, $R^{19B}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19B}$ is hydrogen or $C_1$-$C_3$alkoxy, and more preferably still, hydrogen or methoxy.

Preferably, $R^{20}$ is hydrogen, $C_1$-$C_3$alkyl, or $C_1$-$C_3$alkoxy. More preferably, $R^{20}$ is hydrogen, methyl, ethyl, methoxy or ethoxy. Even more preferably, $R^{20}$ is hydrogen, methyl or methoxy. More preferably still $R^{20}$ is hydrogen.

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy. Preferably, $R^{21}$ is hydrogen, $C_1$-$C_6$alkyl or phenyl, wherein each phenyl moiety is optionally substituted by 1 to 3 groups selected from $C_1$-$C_3$alkyl and $C_1$-$C_3$alkoxy. More preferably, $R^{21}$ is hydrogen, $C_1$-$C_3$alkyl or phenyl, and even more preferably, $C_1$-$C_3$alkyl. More preferably still, $R^{21}$ is methyl.

Preferably, $R^{22}$ is hydrogen or $C_1$-$C_3$alkyl, more preferably, $R^{22}$ is hydrogen.

Preferably, $R^{23}$ is hydrogen, $C_1$-$C_3$alkyl, or $C_1$-$C_3$alkoxy, more preferably, hydrogen, methyl, ethyl, methoxy or ethoxy. Even more preferably, $R^{23}$ is hydrogen or methyl. More preferably still $R^{23}$ is methyl.

Preferably, $R^{24}$ is $C_1$-$C_3$alkoxy, more preferably, methoxy.

Preferably, $R^{25}$ is hydrogen, $C_1$-$C_3$alkyl, or $C_1$-$C_3$alkoxy. More preferably, $R^{25}$ is hydrogen, methyl, ethyl, methoxy or ethoxy. Even more preferably, $R^{25}$ is hydrogen or methyl, and more preferably still, methyl.

In one embodiment, $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S. Preferably, $R^{20}$ and $R^{21}$ together with the carbon atoms to which they are attached may form a 6- or 7-membered partially saturated cycloalkyl or heterocyclyl ring, wherein the heterocyclic moiety is a non-aromatic ring which comprises 1 heteroatom, wherein the heteroatom is selected from O and S. Even more preferably, $R^{20}$ and $R^{21}$ together with the carbon atoms to which they are attached may form a 6- or 7-membered partially saturated cycloalkyl ring, or a 6-membered partially saturated dihydropyranyl ring.

In one embodiment, $R^{24}$ and $R^{25}$ together with the carbon atoms to which they are attached may form a 6-membered unsaturated ring.

$R^{26}$ is a chiral $C_1$-$C_{20}$alkyl substituent. In particular, $R^{26}$ is a derivative of the following structure:

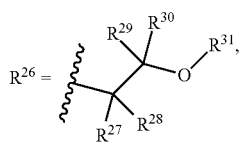

wherein $R^{27}$, $R^{28}$, $R^{29}$, $R^{30}$, and $R^{31}$ are each independently selected from hydrogen, $C_1$-$C_8$alkyl, $C_3$-$C_6$cycloalkyl, and phenyl, wherein each phenyl moiety is optionally substituted by 1 to 5 groups selected from $C_1$-$C_3$alkyl, halogen and $C_1$-$C_3$alkoxy, and wherein either, $R^{27}$ and $R^{28}$ may not be the same, or $R^{29}$ and $R^{30}$ may not be the same. Preferably, $R^{27}$, $R^{28}$, $R^{29}$, $R^{30}$, and $R^{31}$ are each independently selected from hydrogen, $C_1$-$C_3$alkyl, $C_3$-$C_6$cycloalkyl, and phenyl, wherein each phenyl moiety is optionally substituted by 1 to 5 groups selected from $C_1$-$C_3$alkyl, halogen and $C_1$-$C_3$alkoxy.

More preferably, $R^{27}$ is phenyl optionally substituted by 1 to 5 groups selected from methyl, chloro, fluoro and methoxy. $R^{28}$, $R^{29}$ and $R^{30}$ are each independently selected from hydrogen and methyl, and are preferably hydrogen. $R^{31}$ is preferably $C_1$-$C_3$alkyl, more preferably methyl.

Or, $R^{27}$ and $R^{29}$ together with the carbon atoms to which they are attached may form a 3- to 8-membered saturated cycloalkyl or heterocyclyl ring, wherein the heterocyclic moiety is a non-aromatic ring which comprises 1 or 2 heteroatoms, wherein the heteroatoms are individually selected from N, O and S. Preferably, $R^{27}$ and $R^{29}$ together with the carbon atoms to which they are attached may form a 3- to 6-membered saturated cycloalkyl or heterocyclyl ring, wherein the heterocyclic moiety is a non-aromatic ring which comprises 1 heteroatom selected from N and O. Even more preferably, $R^{27}$ and $R^{29}$ together with the carbon atoms to which they are attached may form a 5- or 6-membered carbon ring.

Or, $R^{29}$ and $R^{30}$ together with the carbon to which they are attached form and oxo (=O) group.

In a chiral bidentate chelating ligand of structure (Ive) according to the present invention, preferably:
$R^{19A}$ and $R^{19B}$ are hydrogen;
$R^{20}$ and $R^{21}$ together with the carbon atoms to which they are attached may form a 6- to 8-membered partially saturated cycloalkyl ring;
$R^{22}$, $R^{23}$ and $R^{25}$ are each independently hydrogen or methyl;
$R^{24}$ is methoxy;
$R^{26}$ is

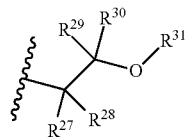

wherein $R^{27}$ is phenyl;
$R^{28}$, $R^{29}$ and $R^{30}$ are each independently hydrogen; and
$R^{31}$ is methyl or hydrogen, in particular $R^{31}$ is methyl.

Particularly preferred examples of bidentate chelating ligands are compounds of formulas (IV-11), (IV-11-ent), (IV-12), or (IV-12-ent), as shown below:

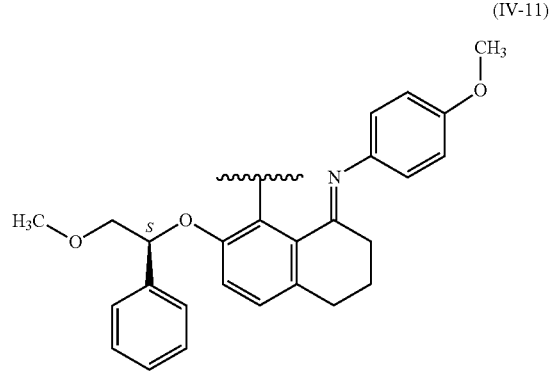

(IV-11)

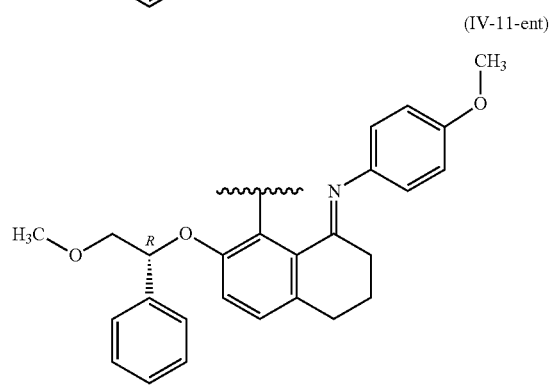

(IV-11-ent)

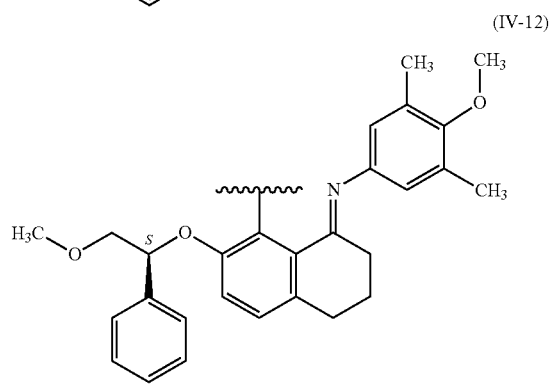

(IV-12)

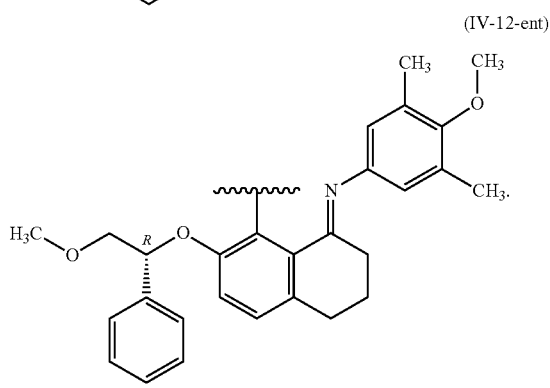

(IV-12-ent)

There is further provided a process in which the (2S)-N-methoxy-1-(2,4,6-trichlorophenyl)propan-2-amine (II-1-ent) produced by the above process is further reacted with 3-(difluoromethyl)-1-methyl-pyrazole-4-carbonyl chloride (XII) to provide 3-(difluoromethyl)-N-methoxy-1-methyl-N-[(1R)-1-methyl-2-(2,4,6-trichlorophenyl)ethyl]pyrazole-4-carboxamide (XIII-1-ent):

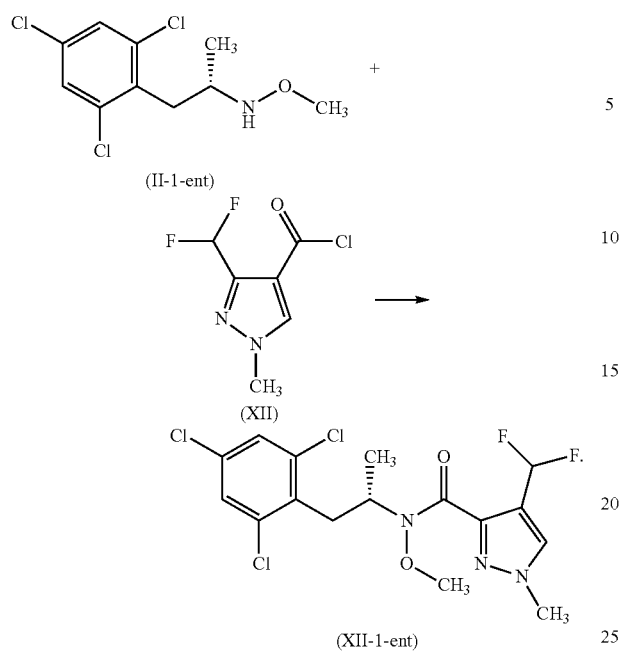

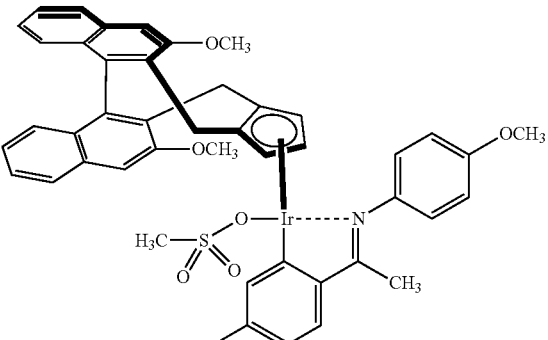

(III-4), (III-15), (III-16) or (III-24), particularly, a compound of formula (III-1), (III-2), (III-3), or (III-15);

There is also provided a process in which the (2R)-N-methoxy-1-(2,4,6-trichlorophenyl)propan-2-amine (II-1) produced by the above process is further reacted with 3-(difluoromethyl)-1-methyl-pyrazole-4-carbonyl chloride (XII) to provide 3-(difluoromethyl)-N-methoxy-1-methyl-N-[(1S)-1-methyl-2-(2,4,6-trichlorophenyl)ethyl]pyrazole-4-carboxamide (XIII-1):

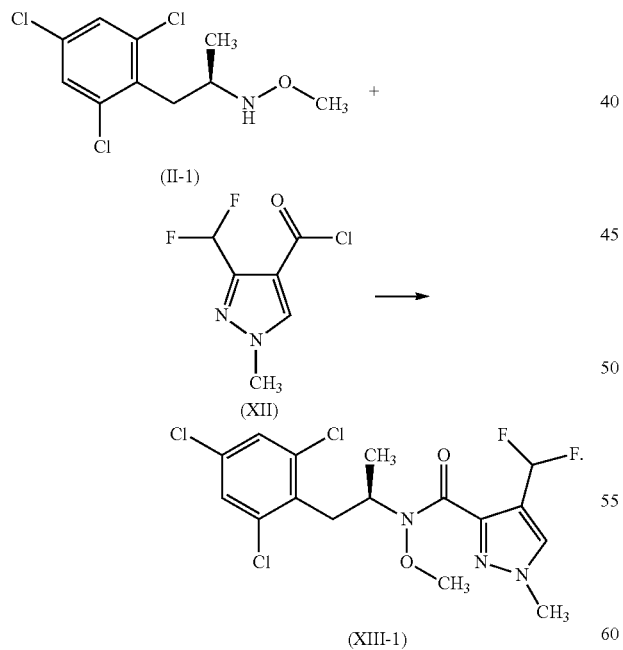

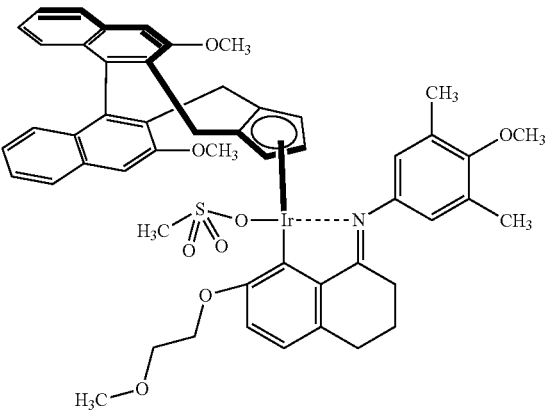

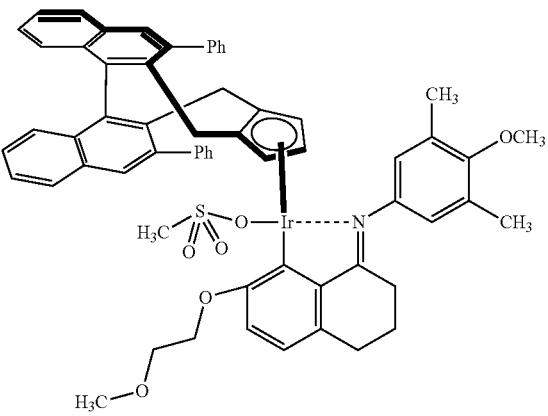

In one embodiment of the invention, the iridium catalyst is a compound of formula (III-1), (III-2), (III-3), (III-4), (III-15), (III-16) or (III-24), particularly, a compound of formula (III-1), (III-2), (III-3), or (III-15); there is also provided a compound of formula (III-1), (III-2), (III-3), (III-4)

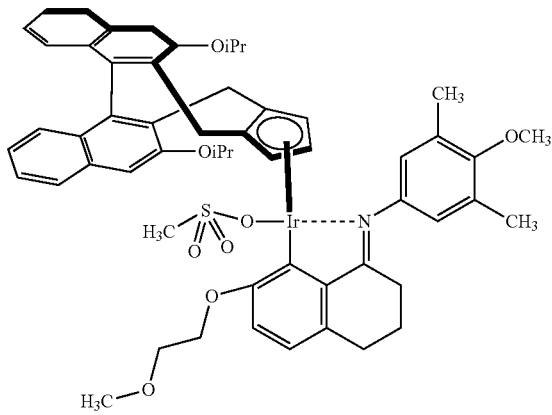

(III-15)

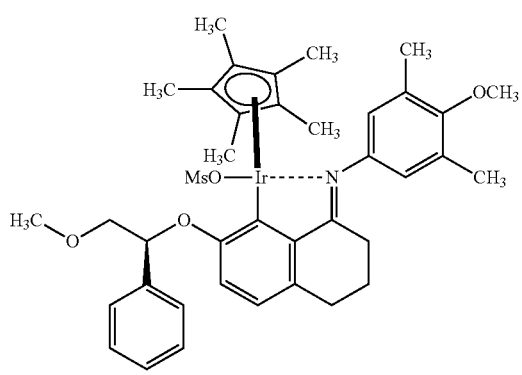

(III-16)

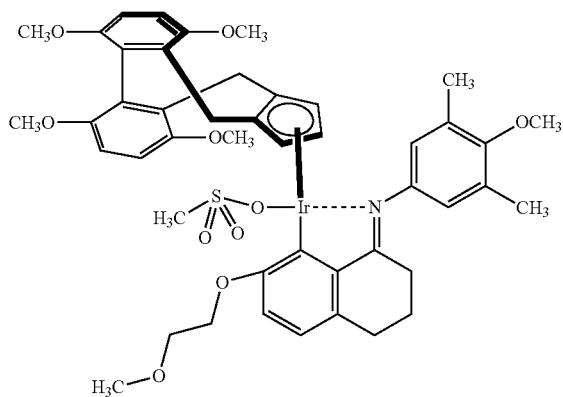

(III-24)

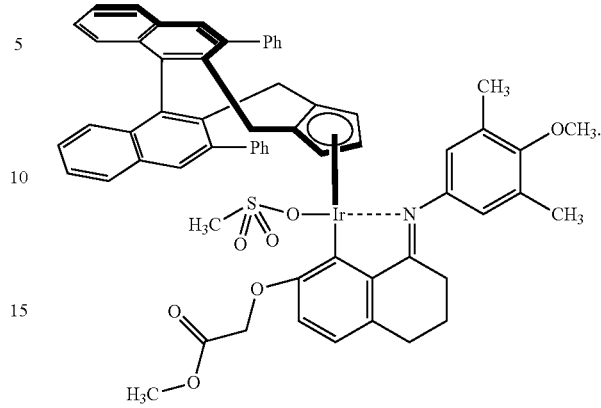

In another embodiment of the invention, the iridium catalyst is a compound of formula (III-1-ent), (III-2-ent), (III-3-ent), (III-4-ent), (III-15-ent), (III-16-ent) or (III-24-ent), particularly, a compound of formula (III-1-ent), (III-2-ent), (III-3-ent) or (III-15-ent); there is also provided a compound of formula (III-1-ent), (III-2-ent), (III-3-ent), (III-4-ent), (III-15-ent), (III-16-ent) or (III-24-ent), particularly, a compound of formula (III-1-ent), (III-2-ent), (III-3-ent) or (III-15-ent):

(III-1-ent)

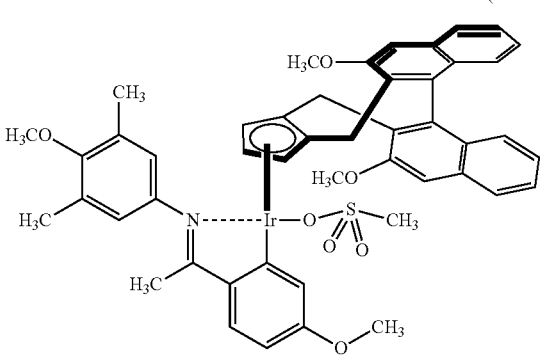

(III-2-ent)

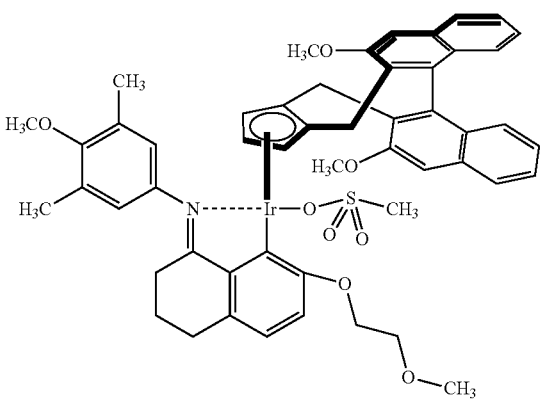

-continued
(III-3-ent)
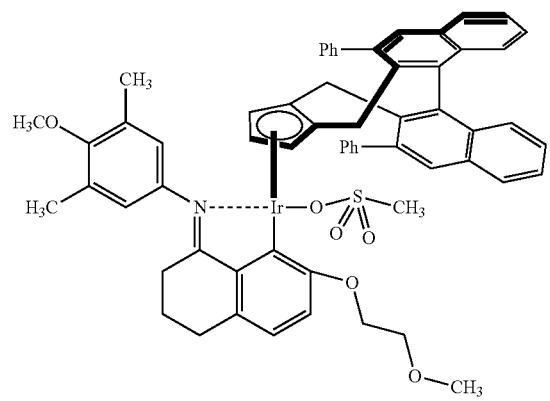
(III-4-ent)
(III-15-ent)
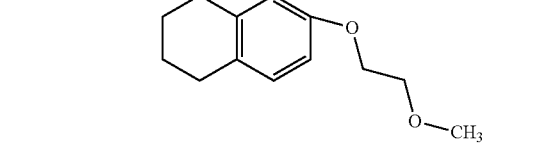
(III-16-ent)
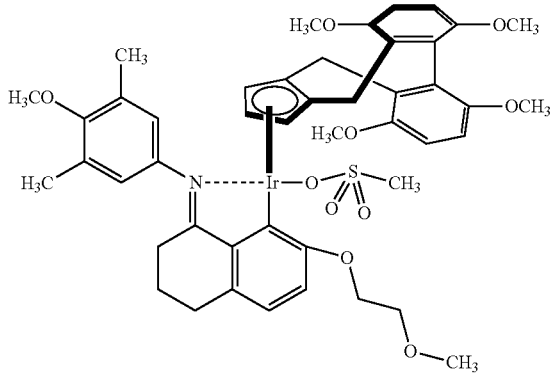
-continued
(III-24-ent)
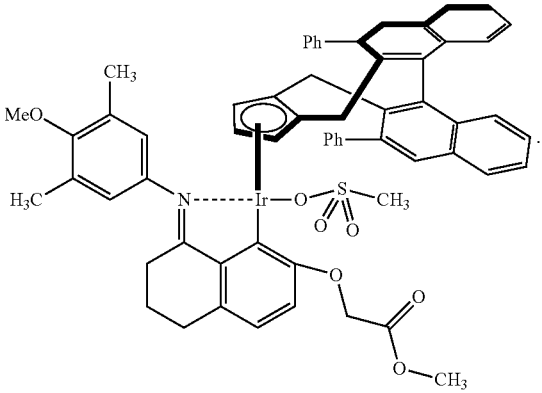
In another embodiment of the invention, there is provided a compound of formula (IIIc) or (IIId):
(IIIc)
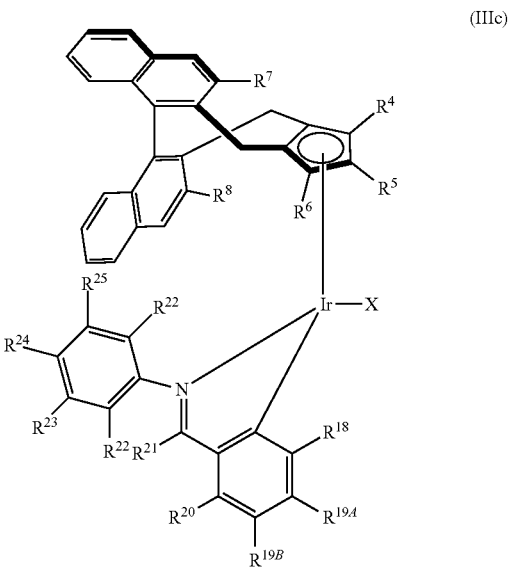

-continued

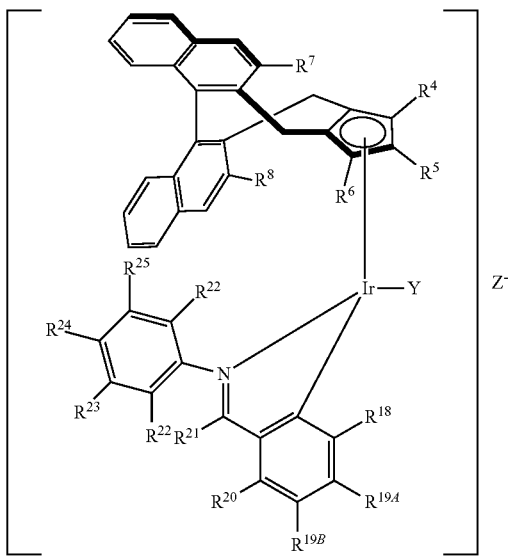

(IIId)

wherein $R^4$, $R^5$, and $R^6$ are each independently hydrogen or $C_1$-$C_3$alkyl. Preferably, $R^4$, $R^5$, and $R^6$ are each independently hydrogen, methyl or isopropyl, more preferably, $R^4$, $R^5$, and $R^6$ each represent hydrogen.

$R^7$ and $R^8$ are each independently hydrogen, hydroxyl, $C_1$-$C_8$alkyl, $C_1$-$C_8$alkoxy, $C_3$-$C_8$cycloalkyl, phenyl, phenoxy, naphthyl, benzyl, or tert-butyldiphenylsilyloxy, wherein the aromatic ring of each phenyl, naphthyl or benzyl moiety is optionally substituted with 1 to 5 groups selected from $C_1$-$C_6$alkyl, $C_1$-$C_6$haloalkyl and $C_1$-$C_6$alkoxy.

Preferably, $R^7$ and $R^8$ are each independently $C_1$-$C_6$alkoxy, phenyl, naphthyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. More preferably, $R^7$ and $R^8$ are each independently $C_1$-$C_6$alkoxy, phenyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. Even more preferably, $C_1$-$C_3$alkoxy and phenyl, wherein the phenyl moieties are each optionally substituted with 1 to 3 groups selected from $C_1$-$C_3$alkyl and $C_1$-$C_3$alkoxy. Even more preferably, $R^7$ and $R^8$ are each independently methoxy, iso-propoxy, phenyl, phenoxy or tert-butyldiphenylsilyloxy. More preferably still, methoxy, iso-propoxy or phenyl.

In one set of embodiments, $R^7$ and $R^8$ are each independently methoxy, iso-propoxy, phenyl, 4-methoxyphenyl or naphthyl.

$R^{18}$, $R^{19A}$, $R^{19B}$, $R^{20}$, $R^{22}$, $R^{23}$, $R^{24}$ and $R^{25}$ are each independently hydrogen, halogen, $C_1$-$C_8$alkyl, $C_1$-$C_8$alkoxy, $C_1$-$C_8$haloalkyl, $C_1$-$C_8$haloalkoxy, or $C_1$-$C_8$alkoxycarbonyl, wherein each $C_1$-$C_8$alkoxy moiety is optionally substituted by 1 or 2 groups selected from hydroxy, $C_1$-$C_8$alkoxy, $C_1$-$C_8$alkyl, $C_1$-$C_8$alkoxycarbonyl and phenyl, preferably each $C_1$-$C_8$alkoxy moiety is optionally substituted by 1 or 2 groups selected from hydroxy, $C_1$-$C_8$alkoxy, $C_1$-$C_8$alkyl, and phenyl.

Preferably, $R^{18}$, $R^{19A}$, $R^{19B}$, $R^{20}$, $R^{22}$, $R^{23}$, $R^{24}$ and $R^{25}$ are each independently hydrogen, halogen, $C_1$-$C_6$alkyl, $C_1$-$C_6$alkoxy, $C_1$-$C_6$haloalkyl, $C_1$-$C_6$haloalkoxy, or $C_1$-$C_6$alkoxycarbonyl, wherein each $C_1$-$C_6$alkoxy moiety is optionally substituted by 1 or 2 groups selected from hydroxy, $C_1$-$C_6$alkoxy, $C_1$-$C_6$alkyl, $C_1$-$C_6$alkoxycarbonyl and phenyl, preferably each $C_1$-$C_6$alkoxy moiety is optionally substituted by 1 or 2 groups selected from hydroxy, $C_1$-$C_6$alkoxy, $C_1$-$C_6$alkyl, and phenyl.

Preferably, $R^{18}$ is hydrogen, $C_1$-$C_3$alkoxy, (hydroxy)-$C_1$-$C_3$alkoxy, ($C_1$-$C_3$alkoxy)-$C_1$-$C_3$alkoxy, ($C_1$-$C_8$alkoxy$C_1$-$C_8$alkoxy)-$C_1$-$C_8$alkoxy, $C_1$-$C_4$alkoxy($C_1$-$C_4$alkoxy$C_1$-$C_4$alkyl)-$C_1$-$C_4$alkoxy, or ($C_1$-$C_3$alkoxycarbonyl)-$C_1$-$C_3$alkoxy, more preferably, hydrogen, $C_1$-$C_3$alkoxy, (hydroxy)-$C_1$-$C_3$alkoxy or ($C_1$-$C_3$alkoxy)-$C_1$-$C_3$alkoxy. Even more preferably, $R^{18}$ is hydrogen, methoxy, ethoxy, 2-hydroxyethoxy, 2-methoxyethoxy, [2-methoxy-1-(methoxymethyl)ethoxy], 2-(2-methoxyethoxy)ethoxy, 2-methoxy-2-oxo-ethoxy, or (2-iso-propoxy-2-oxo-methoxy). More preferably still, $R^{18}$ is hydrogen, methoxy, ethoxy, 2-hydroxyethoxy, 2-methoxyethoxy, [2-methoxy-1-(methoxymethyl)ethoxy] or 2-(2-methoxyethoxy)ethoxy.

Preferably, $R^{19A}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19A}$ is hydrogen or $C_1$-$C_3$alkoxy, and more preferably still, hydrogen or methoxy.

Preferably, $R^{19B}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19B}$ is hydrogen or $C_1$-$C_3$alkoxy, and more preferably still, hydrogen or methoxy.

Preferably, $R^{20}$ is hydrogen, $C_1$-$C_3$alkyl, or $C_1$-$C_3$alkoxy. More preferably, $R^{20}$ is hydrogen, methyl, ethyl, methoxy or ethoxy. Even more preferably, $R^{20}$ is hydrogen, methyl or methoxy. More preferably still $R^{20}$ is hydrogen.

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy. Preferably, $R^{21}$ is hydrogen, $C_1$-$C_6$alkyl or phenyl, wherein each phenyl moiety is optionally substituted by 1 to 3 groups selected from $C_1$-$C_3$alkyl and $C_1$-$C_3$alkoxy. More preferably, $R^{21}$ is hydrogen, $C_1$-$C_3$alkyl or phenyl, and even more preferably, $C_1$-$C_3$alkyl. More preferably still, $R^{21}$ is methyl.

Preferably, $R^{22}$ is hydrogen or $C_1$-$C_3$alkyl, more preferably, $R^{22}$ is hydrogen.

Preferably, $R^{23}$ is hydrogen, $C_1$-$C_3$alkyl, or $C_1$-$C_3$alkoxy, more preferably, hydrogen, methyl, ethyl, methoxy or ethoxy. Even more preferably, $R^{23}$ is hydrogen or methyl. More preferably still $R^{23}$ is methyl.

Preferably, $R^{24}$ is $C_1$-$C_3$alkoxy, more preferably, methoxy.

Preferably, $R^{25}$ is hydrogen, $C_1$-$C_3$alkyl, or $C_1$-$C_3$alkoxy. More preferably, $R^{25}$ is hydrogen, methyl, ethyl, methoxy or ethoxy. Even more preferably, $R^{25}$ is hydrogen or methyl, and more preferably still, methyl.

In one embodiment, $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S. Preferably, $R^{20}$ and $R^{21}$ together with the carbon atoms to which they are attached may form a 6- or 7-membered partially saturated cycloalkyl or heterocyclyl ring, wherein the heterocyclic moiety is a non-aromatic ring which comprises 1 heteroatom, wherein the heteroatom is selected from O and S. Even more preferably, $R^{20}$ and $R^{21}$ together with the carbon atoms to which they are attached may form a 6- or 7-membered partially saturated cycloalkyl ring, or a 6-membered partially saturated dihydropyranyl ring.

In one embodiment, $R^{24}$ and $R^{25}$ together with the carbon atoms to which they are attached may form a 6-membered unsaturated ring.

X is mesylate, tosylate, nosylate, sulfate, hydrogensulfate, triflate or trifluoroacetate;

Y is $H_2O$, PhCN or MeCN; and

Z is mesylate, tosylate, nosylate, sulfate, hydrogensulfate, triflate tetrafluoroborate, hexafluorophosphate, tetraphenylborate or tetrakis(3,5-bis(trifluoromethyl)phenyl)borate.

In a further embodiment of the invention, there is provided a compound of formula (IIIc-ent), or (IIId-ent):

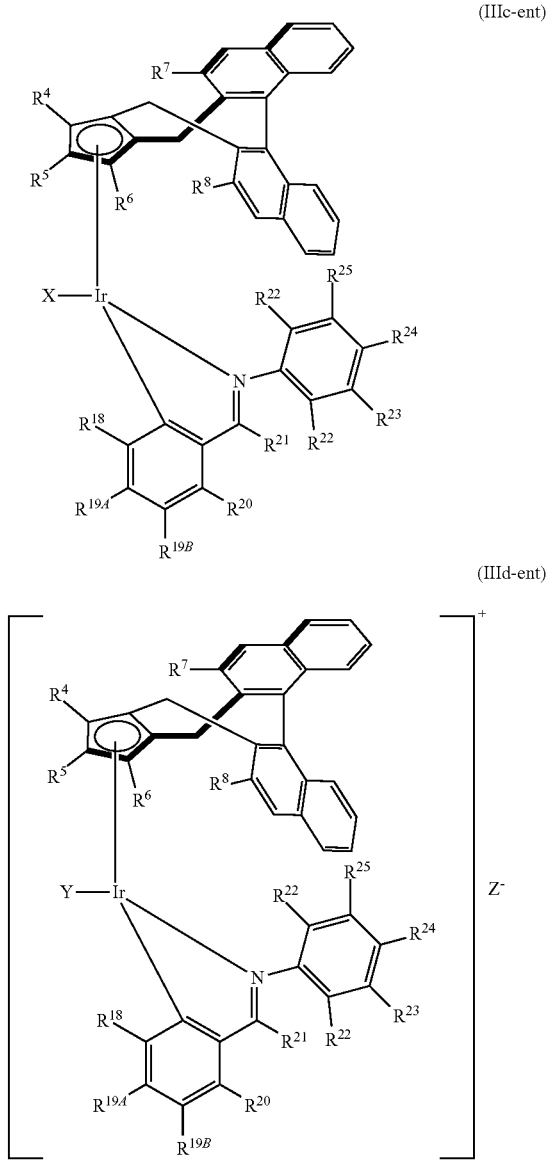

wherein $R^4$, $R^5$, and $R^6$ are each independently hydrogen or $C_1$-$C_3$alkyl. Preferably, $R^4$, $R^5$, and $R^6$ are each independently hydrogen, methyl or isopropyl, more preferably, $R^4$, $R^5$, and $R^6$ each represent hydrogen.

$R^7$ and $R^8$ are each independently hydrogen, hydroxyl, $C_1$-$C_8$alkyl, $C_1$-$C_8$alkoxy, $C_3$-$C_8$cycloalkyl, phenyl, phenoxy, naphthyl, benzyl, or tert-butyldiphenylsilyloxy, wherein the aromatic ring of each phenyl, naphthyl or benzyl moiety is optionally substituted with 1 to 5 groups selected from $C_1$-$C_6$alkyl, $C_1$-$C_6$haloalkyl and $C_1$-$C_6$alkoxy.

Preferably, $R^7$ and $R^8$ are each independently $C_1$-$C_6$alkoxy, phenyl, naphthyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. More preferably, $R^7$ and $R^8$ are each independently $C_1$-$C_6$alkoxy, phenyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. Even more preferably, $C_1$-$C_3$alkoxy and phenyl, wherein the phenyl moieties are each optionally substituted with 1 to 3 groups selected from $C_1$-$C_3$alkyl and $C_1$-$C_3$alkoxy. Even more preferably, $R^7$ and $R^8$ are each independently methoxy, iso-propoxy, phenyl, phenoxy or tert-butyldiphenylsilyloxy. More preferably still, methoxy, iso-propoxy or phenyl.

In one set of embodiments, $R^7$ and $R^8$ are each independently methoxy, iso-propoxy, phenyl, 4-methoxyphenyl or naphthyl.

$R^{18}$, $R^{19A}$, $R^{19B}$, $R^{20}$, $R^{22}$, $R^{23}$, $R^{24}$ and $R^{25}$ are each independently hydrogen, halogen, $C_1$-$C_8$alkyl, $C_1$-$C_8$alkoxy, $C_1$-$C_8$haloalkyl, $C_1$-$C_8$haloalkoxy, or $C_1$-$C_8$alkoxycarbonyl, wherein each $C_1$-$C_8$alkoxy moiety is optionally substituted by 1 or 2 groups selected from hydroxy, $C_1$-$C_8$alkoxy, $C_1$-$C_8$alkyl, $C_1$-$C_8$alkoxycarbonyl and phenyl, preferably each $C_1$-$C_8$alkoxy moiety is optionally substituted by 1 or 2 groups selected from hydroxy, $C_1$-$C_8$alkoxy, $C_1$-$C_8$alkyl, and phenyl.

Preferably, $R^{18}$, $R^{19A}$, $R^{19B}$, $R^{20}$, $R^{22}$, $R^{23}$, $R^{24}$ and $R^{25}$ are each independently hydrogen, halogen, $C_1$-$C_6$alkyl, $C_1$-$C_6$alkoxy, $C_1$-$C_6$haloalkyl, $C_1$-$C_6$haloalkoxy, or $C_1$-$C_6$alkoxycarbonyl, wherein each $C_1$-$C_6$alkoxy moiety is optionally substituted by 1 or 2 groups selected from hydroxy, $C_1$-$C_6$alkoxy, $C_1$-$C_6$alkyl, $C_1$-$C_6$alkoxycarbonyl and phenyl, preferably each $C_1$-$C_6$alkoxy moiety is optionally substituted by 1 or 2 groups selected from hydroxy, $C_1$-$C_6$alkoxy, $C_1$-$C_6$alkyl, and phenyl.

Preferably, $R^{18}$ is hydrogen, $C_1$-$C_3$alkoxy, (hydroxy)-$C_1$-$C_3$alkoxy, ($C_1$-$C_3$alkoxy)-$C_1$-$C_3$alkoxy, ($C_1$-$C_8$alkoxy$C_1$-$C_8$alkoxy)-$C_1$-$C_8$alkoxy, $C_1$-$C_4$alkoxy($C_1$-$C_4$alkoxy$C_1$-$C_4$alkyl)-$C_1$-$C_4$alkoxy, or ($C_1$-$C_3$alkoxycarbonyl)-$C_1$-$C_3$alkoxy, more preferably, hydrogen, $C_1$-$C_3$alkoxy, (hydroxy)-$C_1$-$C_3$alkoxy or ($C_1$-$C_3$alkoxy)-$C_1$-$C_3$alkoxy. Even more preferably, $R^{18}$ is hydrogen, methoxy, ethoxy, 2-hydroxyethoxy, 2-methoxyethoxy, [2-methoxy-1-(methoxymethyl)ethoxy], 2-(2-methoxyethoxy)ethoxy, 2-methoxy-2-oxo-ethoxy, or (2-iso-propoxy-2-oxo-methoxy). More preferably still, $R^{18}$ is hydrogen, methoxy, ethoxy, 2-hydroxyethoxy, 2-methoxyethoxy, [2-methoxy-1-(methoxymethyl)ethoxy] or 2-(2-methoxyethoxy)ethoxy.

Preferably, $R^{19A}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19A}$ is hydrogen or $C_1$-$C_3$alkoxy, and more preferably still, hydrogen or methoxy.

Preferably, $R^{19B}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19B}$ is hydrogen or $C_1$-$C_3$alkoxy, and more preferably still, hydrogen or methoxy.

Preferably, $R^{20}$ is hydrogen, $C_1$-$C_3$alkyl, or $C_1$-$C_3$alkoxy. More preferably, $R^{20}$ is hydrogen, methyl, ethyl, methoxy or ethoxy. Even more preferably, $R^{20}$ is hydrogen, methyl or methoxy. More preferably still $R^{20}$ is hydrogen.

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy. Preferably, $R^{21}$ is hydrogen, $C_1$-$C_6$alkyl or phenyl, wherein each phenyl moiety is optionally substituted by 1 to 5 groups selected from $C_1$-$C_3$alkyl and $C_1$-$C_3$alkoxy. More preferably, $R^{21}$ is hydrogen, $C_1$-$C_3$alkyl or phenyl, and even more preferably, $C_1$-$C_3$alkyl. More preferably still, $R^{21}$ is methyl.

Preferably, $R^{22}$ is hydrogen or $C_1$-$C_3$alkyl, more preferably, $R^{22}$ is hydrogen.

Preferably, $R^{23}$ is hydrogen, $C_1$-$C_3$alkyl, or $C_1$-$C_3$alkoxy, more preferably, hydrogen, methyl, ethyl, methoxy or ethoxy. Even more preferably, $R^{23}$ is hydrogen or methyl. More preferably still $R^{23}$ is methyl.

Preferably, $R^{24}$ is $C_1$-$C_3$alkoxy, more preferably, methoxy.

Preferably, $R^{25}$ is hydrogen, $C_1$-$C_3$alkyl, or $C_1$-$C_3$alkoxy. More preferably, $R^{25}$ is hydrogen, methyl, ethyl, methoxy or ethoxy. Even more preferably, $R^{25}$ is hydrogen or methyl, and more preferably still, methyl.

In one embodiment, $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S. Preferably, $R^{20}$ and $R^{21}$ together with the carbon atoms to which they are attached may form a 6- or 7-membered partially saturated cycloalkyl or heterocyclyl ring, wherein the heterocyclic moiety is a non-aromatic ring which comprises 1 heteroatom, wherein the heteroatom is selected from O and S. Even more preferably, $R^{20}$ and $R^{21}$ together with the carbon atoms to which they are attached may form a 6- or 7-membered partially saturated cycloalkyl ring, or a 6-membered partially saturated dihydropyranyl ring.

In one embodiment, $R^{24}$ and $R^{25}$ together with the carbon atoms to which they are attached may form a 6-membered unsaturated ring.

X is mesylate, tosylate, nosylate, sulfate, hydrogensulfate, triflate or trifluoroacetate;

Y is $H_2O$, PhCN or MeCN; and

Z is mesylate, tosylate, nosylate, sulfate, hydrogensulfate, triflate tetrafluoroborate, hexafluorophosphate, tetraphenylborate or tetrakis(3,5-bis(trifluoromethyl)phenyl)borate.

In another embodiment of the invention, there is provided a compound of formula (IIIe), or (IIIf):

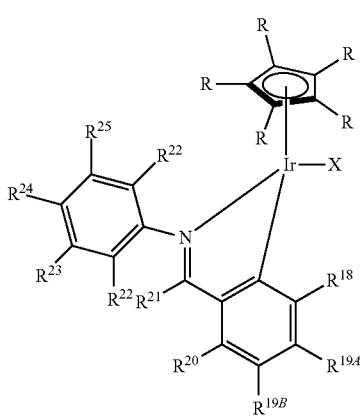

(IIIe)

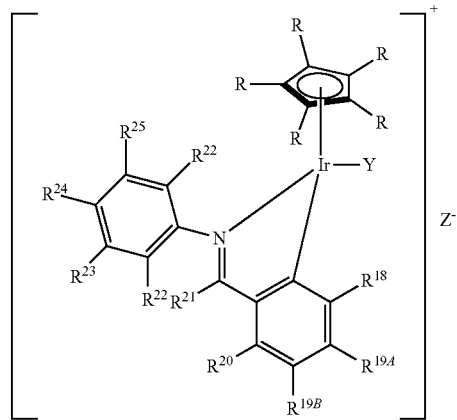

(IIIf)

wherein each R is independently hydrogen or $C_1$-$C_8$alkyl, preferably hydrogen or $C_1$-$C_3$alkyl, and more preferably hydrogen or methyl.

$R^{19A}$, $R^{19B}$, $R^{20}$, $R^{22}$, $R^{23}$, $R^{24}$ and $R^{25}$ are each independently hydrogen, halogen, $C_1$-$C_8$alkyl, $C_1$-$C_8$alkoxy, $C_1$-$C_8$haloalkyl, $C_1$-$C_8$haloalkoxy, or $C_1$-$C_8$alkoxycarbonyl, wherein each $C_1$-$C_8$alkoxy moiety is optionally substituted by 1 or 2 groups selected from hydroxy, $C_1$-$C_8$alkoxy, $C_1$-$C_8$alkyl, $C_1$-$C_8$alkoxycarbonyl and phenyl, preferably each $C_1$-$C_8$alkoxy moiety is optionally substituted by 1 or 2 groups selected from hydroxy, $C_1$-$C_8$alkoxy, $C_1$-$C_8$alkyl, and phenyl.

Preferably, $R^{19A}$, $R^{19B}$, $R^{20}$, $R^{22}$, $R^{23}$, $R^{24}$ and $R^{25}$ are each independently hydrogen, halogen, $C_1$-$C_6$alkyl, $C_1$-$C_6$alkoxy, $C_1$-$C_6$haloalkyl, $C_1$-$C_6$haloalkoxy, or $C_1$-$C_6$alkoxycarbonyl, wherein each $C_1$-$C_6$alkoxy moiety is optionally substituted by 1 or 2 groups selected from hydroxy, $C_1$-$C_6$alkoxy, $C_1$-$C_6$alkyl, $C_1$-$C_6$alkoxycarbonyl and phenyl, preferably each $C_1$-$C_6$alkoxy moiety is optionally substituted by 1 or 2 groups selected from hydroxy, $C_1$-$C_6$alkoxy, $C_1$-$C_6$alkyl, and phenyl.

Preferably, $R^{19A}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19A}$ is hydrogen or $C_1$-$C_3$alkoxy, and more preferably still, hydrogen or methoxy.

Preferably, $R^{19B}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19B}$ is hydrogen or $C_1$-$C_3$alkoxy, and more preferably still, hydrogen or methoxy.

Preferably, $R^{20}$ is hydrogen, $C_1$-$C_3$alkyl, or $C_1$-$C_3$alkoxy. More preferably, $R^{20}$ is hydrogen, methyl, ethyl, methoxy or ethoxy. Even more preferably, $R^{20}$ is hydrogen, methyl or methoxy. More preferably still $R^{20}$ is hydrogen.

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy. Preferably, $R^{21}$ is hydrogen, $C_1$-$C_6$alkyl or phenyl, wherein each phenyl moiety is optionally substituted by 1 to 5 groups selected from $C_1$-$C_3$alkyl and $C_1$-$C_3$alkoxy. More preferably, $R^{21}$ is hydrogen, $C_1$-$C_3$alkyl or phenyl, and even more preferably, $C_1$-$C_3$alkyl. More preferably still, $R^{21}$ is methyl.

Preferably, $R^{22}$ is hydrogen or $C_1$-$C_3$alkyl, more preferably, $R^{22}$ is hydrogen.

Preferably, $R^{23}$ is hydrogen, $C_1$-$C_3$alkyl, or $C_1$-$C_3$alkoxy, more preferably, hydrogen, methyl, ethyl, methoxy or ethoxy. Even more preferably, $R^{23}$ is hydrogen or methyl. More preferably still $R^{23}$ is methyl.

Preferably, $R^{24}$ is $C_1$-$C_3$alkoxy, more preferably, methoxy.

Preferably, $R^{25}$ is hydrogen, $C_1$-$C_3$alkyl, or $C_1$-$C_3$alkoxy. More preferably, $R^{25}$ is hydrogen, methyl, ethyl, methoxy or ethoxy. Even more preferably, $R^{25}$ is hydrogen or methyl, and more preferably still, methyl.

In one embodiment, $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S. Preferably, $R^{20}$ and $R^{21}$ together with the carbon atoms to which they are attached may form a 6- or 7-membered partially saturated cycloalkyl or heterocyclyl ring, wherein the heterocyclic moiety is a non-aromatic ring which comprises 1 heteroatom, wherein the heteroatom is selected from O and S. Even more preferably, $R^{20}$ and $R^{21}$ together with the carbon atoms to which they are attached may form a 6- or 7-membered partially saturated cycloalkyl ring, or a 6-membered partially saturated dihydropyranyl ring.

In one embodiment, $R^{24}$ and $R^{25}$ together with the carbon atoms to which they are attached may form a 6-membered unsaturated ring.

$R^{26}$ is a chiral $C_1$-$C_{20}$alkyl substituent. In particular, $R^{26}$ is a derivative of the following structure:

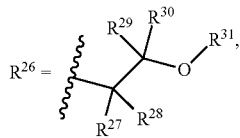

wherein $R^{27}$, $R^{28}$, $R^{29}$, $R^{30}$, and $R^{31}$ are each independently selected from hydrogen, $C_1$-$C_8$alkyl, $C_3$-$C_6$cycloalkyl, and phenyl, wherein each phenyl moiety is optionally substituted by 1 to 5 groups selected from $C_1$-$C_3$alkyl, halogen and $C_1$-$C_3$alkoxy, and wherein either, $R^{27}$ and $R^{28}$ may not be the same, or $R^{29}$ and $R^{30}$ may not be the same. Preferably, $R^{27}$, $R^{28}$, $R^{29}$, $R^{30}$, and $R^{31}$ are each independently selected from hydrogen, $C_1$-$C_3$alkyl, $C_3$-$C_6$cycloalkyl, and phenyl, wherein each phenyl moiety is optionally substituted by 1 to 5 groups selected from $C_1$-$C_3$alkyl, halogen and $C_1$-$C_3$alkoxy.

More preferably, $R^{27}$ is phenyl optionally substituted by 1 to 5 groups selected from methyl, chloro, fluoro and methoxy. $R^{28}$, $R^{29}$ and $R^{30}$ are each independently selected from hydrogen and methyl, and are preferably hydrogen. $R^{31}$ is preferably $C_1$-$C_3$alkyl, more preferably methyl.

Or $R^{27}$ and $R^{29}$ together with the carbon atoms to which they are attached may form a 3- to 8-membered saturated cycloalkyl or heterocyclyl ring, wherein the heterocyclic moiety is a non-aromatic ring which comprises 1 or 2 heteroatoms, wherein the heteroatoms are individually selected from N, O and S. Preferably, $R^{27}$ and $R^{29}$ together with the carbon atoms to which they are attached may form a 3- to 6-membered saturated cycloalkyl or heterocyclyl ring, wherein the heterocyclic moiety is a non-aromatic ring which comprises 1 heteroatom selected from N and O. Even more preferably, $R^{27}$ and $R^{29}$ together with the carbon atoms to which they are attached may form a 5- or 6-membered carbon ring.

In one embodiment of the invention, there is provided a compound of formula (IIIg), or (IIIh):

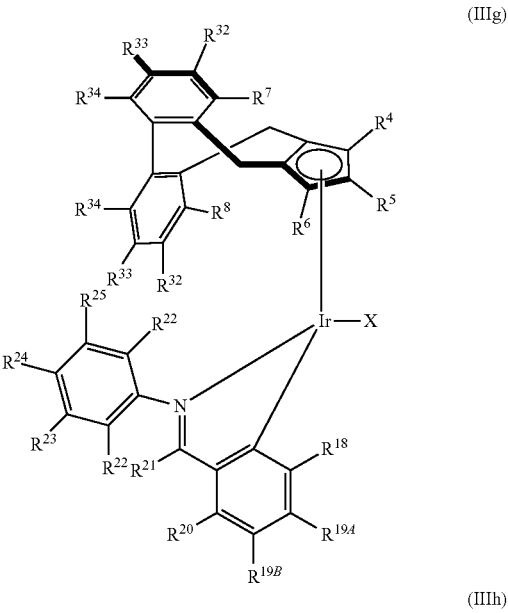

(IIIg)

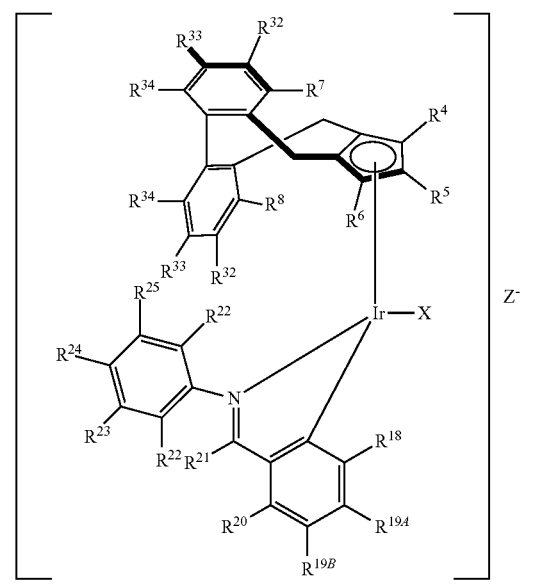

(IIIh)

wherein $R^4$, $R^5$, and $R^6$ are each independently hydrogen or $C_1$-$C_3$alkyl. Preferably, $R^4$, $R^5$, and $R^6$ are each independently hydrogen, methyl or isopropyl, more preferably, $R^4$, $R^5$, and $R^6$ each represent hydrogen.

$R^7$ and $R^8$ are each independently hydrogen, hydroxyl, $C_1$-$C_8$alkyl, $C_1$-$C_8$alkoxy, $C_3$-$C_8$cycloalkyl, phenyl, phenoxy, naphthyl, benzyl, or tert-butyldiphenylsilyloxy, wherein the aromatic ring of each phenyl, naphthyl or benzyl moiety is optionally substituted with 1 to 5 groups selected from $C_1$-$C_6$alkyl, $C_1$-$C_6$haloalkyl and $C_1$-$C_6$alkoxy.

Preferably, $R^7$ and $R^8$ are each independently $C_1$-$C_6$alkoxy, phenyl, naphthyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. More preferably, $R^7$ and $R^8$ are each independently $C_1$-$C_6$alkoxy, phenyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. Even more preferably, $C_1$-$C_3$alkoxy and phenyl, wherein the phenyl moieties are each optionally substituted with 1 to 3 groups selected from $C_1$-$C_3$alkyl and $C_1$-$C_3$alkoxy. Even more preferably, $R^7$ and $R^8$ are each independently methoxy, iso-propoxy, phenyl, phenoxy or tert-butyldiphenylsilyloxy. More preferably still, methoxy, iso-propoxy or phenyl.

In one set of embodiments, $R^7$ and $R^8$ are each independently methoxy, iso-propoxy, phenyl, 4-methoxyphenyl or naphthyl.

$R^{18}$, $R^{19A}$, $R^{19B}$, $R^{20}$, $R^{22}$, $R^{23}$, $R^{24}$ and $R^{25}$ are each independently hydrogen, halogen, $C_1$-$C_8$alkyl, $C_1$-$C_8$alkoxy, $C_1$-$C_8$haloalkyl, $C_1$-$C_8$haloalkoxy, or $C_1$-$C_8$alkoxycarbonyl, wherein each $C_1$-$C_8$alkoxy moiety is optionally substituted by 1 or 2 groups selected from hydroxy, $C_1$-$C_8$alkoxy, $C_1$-$C_8$alkyl, $C_1$-$C_8$alkoxycarbonyl and phenyl, preferably each $C_1$-$C_8$alkoxy moiety is optionally substituted by 1 or 2 groups selected from hydroxy, $C_1$-$C_8$alkoxy, $C_1$-$C_8$alkyl, and phenyl.

Preferably, $R^{18}$, $R^{19A}$, $R^{19B}$, $R^{20}$, $R^{22}$, $R^{23}$, $R^{24}$ and $R^{25}$ are each independently hydrogen, halogen, $C_1$-$C_6$alkyl, $C_1$-$C_6$alkoxy, $C_1$-$C_6$haloalkyl, $C_1$-$C_6$haloalkoxy, or $C_1$-$C_6$alkoxycarbonyl, wherein each $C_1$-$C_6$alkoxy moiety is optionally substituted by 1 or 2 groups selected from hydroxy, $C_1$-$C_6$alkoxy, $C_1$-$C_6$alkyl, $C_1$-$C_6$alkoxycarbonyl and phenyl, preferably each $C_1$-$C_6$alkoxy moiety is optionally substituted by 1 or 2 groups selected from hydroxy, $C_1$-$C_6$alkoxy, $C_1$-$C_6$alkyl, and phenyl.

Preferably, $R^{18}$ is hydrogen, $C_1$-$C_3$alkoxy, (hydroxy)-$C_1$-$C_3$alkoxy, ($C_1$-$C_3$alkoxy)-$C_1$-$C_3$alkoxy, ($C_1$-$C_8$alkoxy$C_1$-$C_8$alkoxy)-$C_1$-$C_8$alkoxy, $C_1$-$C_4$alkoxy($C_1$-$C_4$alkoxy$C_1$-$C_4$alkyl)-$C_1$-$C_4$alkoxy, or ($C_1$-$C_3$alkoxycarbonyl)-$C_1$-$C_3$alkoxy, more preferably, hydrogen, $C_1$-$C_3$alkoxy, (hydroxy)-$C_1$-$C_3$alkoxy or ($C_1$-$C_3$alkoxy)-$C_1$-$C_3$alkoxy. Even more preferably, $R^{18}$ is hydrogen, methoxy, ethoxy, 2-hydroxyethoxy, 2-methoxyethoxy, [2-methoxy-1-(methoxymethyl)ethoxy], 2-(2-methoxyethoxy)ethoxy, 2-methoxy-2-oxo-ethoxy, or (2-iso-propoxy-2-oxo-methoxy). More preferably still, $R^{18}$ is hydrogen, methoxy, ethoxy, 2-hydroxyethoxy, 2-methoxyethoxy, [2-methoxy-1-(methoxymethyl)ethoxy] or 2-(2-methoxyethoxy)ethoxy.

Preferably, $R^{19A}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19A}$ is hydrogen or $C_1$-$C_3$alkoxy, and more preferably still, hydrogen or methoxy.

Preferably, $R^{19B}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19B}$ is hydrogen or $C_1$-$C_3$alkoxy, and more preferably still, hydrogen or methoxy.

Preferably, $R^{20}$ is hydrogen, $C_1$-$C_3$alkyl, or $C_1$-$C_3$alkoxy. More preferably, $R^{20}$ is hydrogen, methyl, ethyl, methoxy or ethoxy. Even more preferably, $R^{20}$ is hydrogen, methyl or methoxy. More preferably still $R^{20}$ is hydrogen.

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy. Preferably, $R^{21}$ is hydrogen, $C_1$-$C_6$alkyl or phenyl, wherein each phenyl moiety is optionally substituted by 1 to 5 groups selected from $C_1$-$C_3$alkyl and $C_1$-$C_3$alkoxy. More preferably, $R^{21}$ is hydrogen, $C_1$-$C_3$alkyl or phenyl, and even more preferably, $C_1$-$C_3$alkyl. More preferably still, $R^{21}$ is methyl.

Preferably, $R^{22}$ is hydrogen or $C_1$-$C_3$alkyl, more preferably, $R^{22}$ is hydrogen.

Preferably, $R^{23}$ is hydrogen, $C_1$-$C_3$alkyl, or $C_1$-$C_3$alkoxy, more preferably, hydrogen, methyl, ethyl, methoxy or ethoxy. Even more preferably, $R^{23}$ is hydrogen or methyl. More preferably still $R^{23}$ is methyl.

Preferably, $R^{24}$ is $C_1$-$C_3$alkoxy, more preferably, methoxy.

Preferably, $R^{25}$ is hydrogen, $C_1$-$C_3$alkyl, or $C_1$-$C_3$alkoxy. More preferably, $R^{25}$ is hydrogen, methyl, ethyl, methoxy or ethoxy. Even more preferably, $R^{25}$ is hydrogen or methyl, and more preferably still, methyl.

In one embodiment, $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S. Preferably, $R^{20}$ and $R^{21}$ together with the carbon atoms to which they are attached may form a 6- or 7-membered partially saturated cycloalkyl or heterocyclyl ring, wherein the heterocyclic moiety is a non-aromatic ring which comprises 1 heteroatom, wherein the heteroatom is selected from O and S. Even more preferably, $R^{20}$ and $R^{21}$ together with the carbon atoms to which they are attached may form a 6- or 7-membered partially saturated cycloalkyl ring, or a 6-membered partially saturated dihydropyranyl ring.

In one embodiment, $R^{24}$ and $R^{25}$ together with the carbon atoms to which they are attached may form a 6-membered unsaturated ring.

$R^{32}$ and $R^{33}$ are each independently hydrogen, halogen, $C_1$-$C_3$alkyl, $C_1$-$C_3$alkoxy, $C_3$-$C_8$cycloalkyl, $C_1$-$C_3$haloalkyl, $C_1$-$C_3$haloalkoxy, or phenyl. Preferably, $R^{32}$ and $R^{33}$ are each independently hydrogen, halogen, $C_1$-$C_3$alkyl, or $C_1$-$C_3$alkoxy, more preferably, $R^{32}$ and $R^{33}$ each represent hydrogen, methyl or methoxy.

$R^{34}$ is halogen, $C_1$-$C_3$alkyl, $C_1$-$C_3$alkoxy, $C_3$-$C_8$cycloalkyl, $C_1$-$C_3$haloalkyl, $C_1$-$C_3$haloalkoxy, or phenyl. Preferably, $R^{34}$ is halogen, $C_1$-$C_3$alkyl, or $C_1$-$C_3$alkoxy, more preferably $R^{34}$ each represent methyl or methoxy; or $R^{32}$ and $R^{33}$, or $R^{33}$ and $R^{34}$, or $R^{34}$ and $R^{34}$ together with the carbon atom to which they are attached may form a 5- to 10-membered carbocyclyl or heterocyclyl ring, wherein the heterocyclic moiety is a monocyclic ring which comprises 1, 2 or 3 heteroatoms, wherein the heteroatoms are individually selected from N, O and S.

X is mesylate, tosylate, nosylate, sulfate, hydrogensulfate, triflate or trifluoroacetate;

Y is $H_2O$, PhCN or MeCN; and

Z is mesylate, tosylate, nosylate, sulfate, hydrogensulfate, triflate tetrafluoroborate, hexafluorophosphate, tetraphenylborate or tetrakis(3,5-bis(trifluoromethyl)phenyl)borate.

In another embodiment of the invention, there is provided a compound of formula (IIIg-ent), or (IIIh-ent):

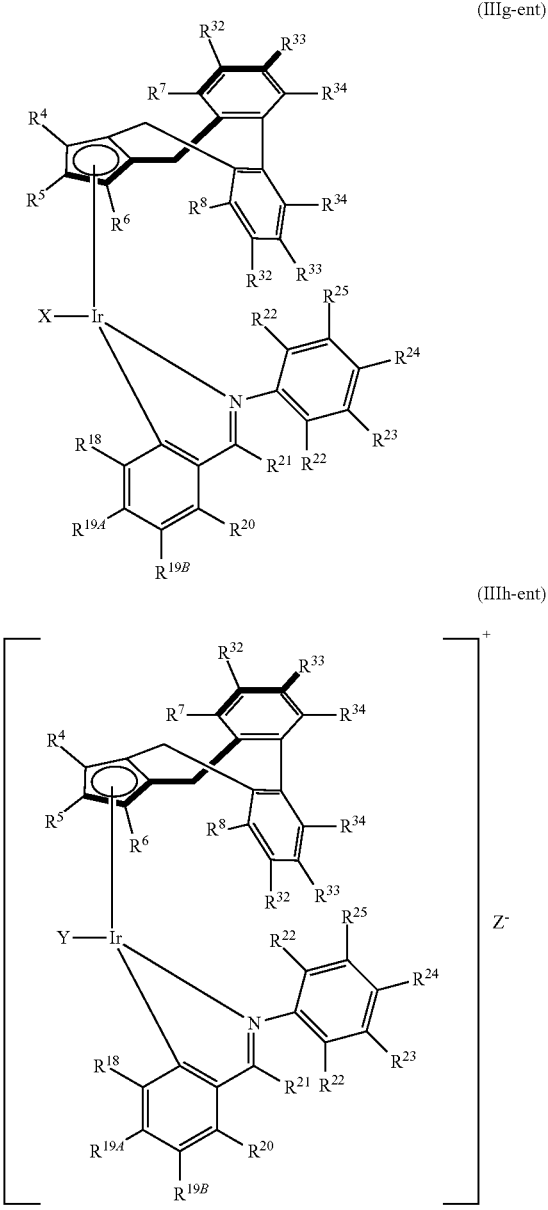

(IIIg-ent)

(IIIh-ent)

wherein $R^4$, $R^5$, and $R^6$ are each independently hydrogen or $C_1$-$C_3$alkyl. Preferably, $R^4$, $R^5$, and $R^6$ are each independently hydrogen, methyl or isopropyl, more preferably, $R^4$, $R^5$, and $R^6$ each represent hydrogen.

$R^7$ and $R^8$ are each independently hydrogen, hydroxyl, $C_1$-$C_8$alkyl, $C_1$-$C_8$alkoxy, $C_3$-$C_8$cycloalkyl, phenyl, phenoxy, naphthyl, benzyl, or tert-butyldiphenylsilyloxy, wherein the aromatic ring of each phenyl, naphthyl or benzyl moiety is optionally substituted with 1 to 5 groups selected from $C_1$-$C_6$alkyl, $C_1$-$C_6$haloalkyl and $C_1$-$C_6$alkoxy.

Preferably, $R^7$ and $R^8$ are each independently $C_1$-$C_6$alkoxy, phenyl, naphthyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. More preferably, $R^7$ and $R^8$ are each independently $C_1$-$C_6$alkoxy, phenyl, phenoxy, or tert-butyldiphenylsilyloxy, wherein the phenyl moieties are each optionally substituted with 1 to 3 groups selected from $C_1$-$C_3$alkyl, $C_1$-$C_6$haloalkyl and $C_1$-$C_3$alkoxy. Even more preferably, $C_1$-$C_3$alkoxy and phenyl, wherein the phenyl moieties are each optionally substituted with 1 to 3 groups selected from $C_1$-$C_3$alkyl and $C_1$-$C_3$alkoxy. Even more preferably, $R^7$ and $R^8$ are each independently methoxy, iso-propoxy, phenyl, phenoxy or tert-butyldiphenylsilyloxy. More preferably still, methoxy, iso-propoxy or phenyl.

In one set of embodiments, $R^7$ and $R^8$ are each independently methoxy, iso-propoxy, phenyl, 4-methoxyphenyl or naphthyl.

$R^{18}$, $R^{19A}$, $R^{19B}$, $R^{20}$, $R^{22}$, $R^{23}$, $R^{24}$ and $R^{25}$ are each independently hydrogen, halogen, $C_1$-$C_8$alkyl, $C_1$-$C_8$alkoxy, $C_1$-$C_8$haloalkyl, $C_1$-$C_8$haloalkoxy, or $C_1$-$C_8$alkoxycarbonyl, wherein each $C_1$-$C_8$alkoxy moiety is optionally substituted by 1 or 2 groups selected from hydroxy, $C_1$-$C_8$alkoxy, $C_1$-$C_8$alkyl, $C_1$-$C_8$alkoxycarbonyl and phenyl, preferably each $C_1$-$C_8$alkoxy moiety is optionally substituted by 1 or 2 groups selected from hydroxy, $C_1$-$C_8$alkoxy, $C_1$-$C_8$alkyl, and phenyl.

Preferably, $R^{18}$, $R^{19A}$, $R^{19B}$, $R^{20}$, $R^{22}$, $R^{23}$, $R^{24}$ and $R^{25}$ are each independently hydrogen, halogen, $C_1$-$C_6$alkyl, $C_1$-$C_6$alkoxy, $C_1$-$C_6$haloalkyl, $C_1$-$C_6$haloalkoxy, or $C_1$-$C_6$alkoxycarbonyl, wherein each $C_1$-$C_6$alkoxy moiety is optionally substituted by 1 or 2 groups selected from hydroxy, $C_1$-$C_6$alkoxy, $C_1$-$C_6$alkyl, $C_1$-$C_6$alkoxycarbonyl and phenyl, preferably each $C_1$-$C_6$alkoxy moiety is optionally substituted by 1 or 2 groups selected from hydroxy, $C_1$-$C_6$alkoxy, $C_1$-$C_6$alkyl, and phenyl.

Preferably, $R^{18}$ is hydrogen, $C_1$-$C_3$alkoxy, (hydroxy)-$C_1$-$C_3$alkoxy, ($C_1$-$C_3$alkoxy)-$C_1$-$C_3$alkoxy, ($C_1$-$C_8$alkoxy$C_1$-$C_8$alkoxy)-$C_1$-$C_8$alkoxy, $C_1$-$C_4$alkoxy($C_1$-$C_4$alkoxy$C_1$-$C_4$alkyl)-$C_1$-$C_4$alkoxy, or ($C_1$-$C_3$alkoxycarbonyl)-$C_1$-$C_3$alkoxy, more preferably, hydrogen, $C_1$-$C_3$alkoxy, (hydroxy)-$C_1$-$C_3$alkoxy or ($C_1$-$C_3$alkoxy)-$C_1$-$C_3$alkoxy. Even more preferably, $R^{18}$ is hydrogen, methoxy, ethoxy, 2-hydroxyethoxy, 2-methoxyethoxy, [2-methoxy-1-(methoxymethyl)ethoxy], 2-(2-methoxyethoxy)ethoxy, 2-methoxy-2-oxo-ethoxy, or (2-iso-propoxy-2-oxo-methoxy). More preferably still, $R^{18}$ is hydrogen, methoxy, ethoxy, 2-hydroxyethoxy, 2-methoxyethoxy, [2-methoxy-1-(methoxymethyl)ethoxy] or 2-(2-methoxyethoxy)ethoxy.

Preferably, $R^{19A}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19A}$ is hydrogen or $C_1$-$C_3$alkoxy, and more preferably still, hydrogen or methoxy.

Preferably, $R^{19B}$ is hydrogen, $C_1$-$C_3$alkoxy, (hydroxy)-$C_1$-$C_3$alkoxy, or ($C_1$-$C_3$alkoxy)-$C_1$-$C_3$alkoxy. More preferably, $R^{19B}$ is hydrogen or $C_1$-$C_3$alkoxy, and more preferably still, hydrogen or methoxy.

Preferably, $R^{20}$ is hydrogen, $C_1$-$C_3$alkyl, or $C_1$-$C_3$alkoxy. More preferably, $R^{20}$ is hydrogen, methyl, ethyl, methoxy or ethoxy. Even more preferably, $R^{20}$ is hydrogen, methyl or methoxy. More preferably still $R^{20}$ is hydrogen.

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy. Preferably, $R^{21}$ is hydrogen, $C_1$-$C_6$alkyl or phenyl, wherein each phenyl moiety is optionally substituted by 1 to 5 groups selected from $C_1$-$C_3$alkyl and $C_1$-$C_3$alkoxy. More preferably, $R^{21}$ is hydrogen, $C_1$-$C_3$alkyl or phenyl, and even more preferably, $C_1$-$C_3$alkyl. More preferably still, $R^{21}$ is methyl.

Preferably, $R^{22}$ is hydrogen or $C_1$-$C_3$alkyl, more preferably, $R^{22}$ is hydrogen.

Preferably, $R^{23}$ is hydrogen, $C_1$-$C_3$alkyl, or $C_1$-$C_3$alkoxy, more preferably, hydrogen, methyl, ethyl, methoxy or ethoxy. Even more preferably, $R^{23}$ is hydrogen or methyl. More preferably still $R^{23}$ is methyl.

Preferably, $R^{24}$ is $C_1$-$C_3$alkoxy, more preferably, methoxy.

Preferably, $R^{25}$ is hydrogen, $C_1$-$C_3$alkyl, or $C_1$-$C_3$alkoxy. More preferably, $R^{25}$ is hydrogen, methyl, ethyl, methoxy or ethoxy. Even more preferably, $R^{25}$ is hydrogen or methyl, and more preferably still, methyl.

In one embodiment, $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S. Preferably, $R^{20}$ and $R^{21}$ together with the carbon atoms to which they are attached may form a 6- or 7-membered partially saturated cycloalkyl or heterocyclyl ring, wherein the heterocyclic moiety is a non-aromatic ring which comprises 1 heteroatom, wherein the heteroatom is selected from O and S. Even more preferably, $R^{20}$ and $R^{21}$ together with the carbon atoms to which they are attached may form a 6- or 7-membered partially saturated cycloalkyl ring, or a 6-membered partially saturated dihydropyranyl ring.

In one embodiment, $R^{24}$ and $R^{25}$ together with the carbon atoms to which they are attached may form a 6-membered unsaturated ring.

$R^{32}$ and $R^{33}$ are each independently hydrogen, halogen, $C_1$-$C_3$alkyl, $C_1$-$C_3$alkoxy, $C_3$-$C_8$cycloalkyl, $C_1$-$C_3$haloalkyl, $C_1$-$C_3$haloalkoxy, or phenyl. Preferably, $R^{32}$ and $R^{33}$ are each independently hydrogen, halogen, $C_1$-$C_3$alkyl, or $C_1$-$C_3$alkoxy, more preferably, $R^{32}$ and $R^{33}$ are each independently hydrogen, methyl or methoxy. Most preferably, $R^{32}$ and $R^{33}$ are both hydrogen.

$R^{34}$ is halogen, $C_1$-$C_3$alkyl, $C_1$-$C_3$alkoxy, $C_3$-$C_8$cycloalkyl, $C_1$-$C_3$haloalkyl, $C_1$-$C_3$haloalkoxy, or phenyl. Preferably, $R^{34}$ is halogen, $C_1$-$C_3$alkyl, or $C_1$-$C_3$alkoxy, more preferably $R^{34}$ is methyl or methoxy, most preferably methoxy.

Or, $R^{32}$ and $R^{33}$, or $R^{33}$ and $R^{34}$, or $R^{32}$ and $R^{34}$ together with the carbon atoms to which they are attached may form a 5- to 10-membered carbocyclyl or heterocyclyl ring, wherein the heterocyclic moiety is a monocyclic ring which comprises 1, 2 or 3 heteroatoms, wherein the heteroatoms are individually selected from N, O and S.

X is mesylate, tosylate, nosylate, sulfate, hydrogensulfate, triflate or trifluoroacetate;

Y is $H_2O$, PhCN or MeCN; and

Z is mesylate, tosylate, nosylate, sulfate, hydrogensulfate, triflate tetrafluoroborate, hexafluorophosphate, tetraphenylborate or tetrakis(3,5-bis(trifluoromethyl)phenyl)borate.

In one embodiment, the hydroxylamine of formula (II) is (2S)-N-methoxy-1-(2,4,6-trichlorophenyl)propan-2-amine (II-1-ent), and is provided by a process wherein the iridium catalyst is a compound of formula (III-1-ent), (III-2-ent), (III-3-ent), (III-4-ent), (III-16-ent), (III-18-ent), (III-19-ent), (III-22-ent), (III-23-ent), (III-24-ent) or (III-15-ent), in particular the iridium catalyst is a compound of formula (III-1-ent), (III-2-ent), (III-3-ent), or (III-15-ent).

In another embodiment, the hydroxylamine of formula (II) is (2R)-N-methoxy-1-(2,4,6-trichlorophenyl)propan-2-amine (II-1), and is provided by a process wherein the iridium catalyst is a compound of formula (III-1), (III-2), (III-3), (III-4), (III-16), (III-18), (III-19), (III-22), (III-23), (III-24) or (III-15), in particular the iridium catalyst is a compound of formula (III-1), (III-2), (III-3), or (III-15).

Some chiral hydroxylamines and chiral hydroxylamine salts of general formula (II) are known to be intermediates of pesticidally active compounds as described in WO14/206855 and WO15/052076.

Suitable C,N ligands, wherein C,N ligands are defined in compounds of formula (IV), (IVc) and (IVe), may be prepared from the corresponding ketone or aldehyde (IV-keto) and aniline (IV-aniline) via condensation reactions. The condensation reaction may be conducted thermally by heating of the starting materials or by using a dehydrating agent. The reaction temperature is usually between −80° C. and 200° C. and may be optionally conducted in the presence of a solvent and in the presence of a catalyst. Suitable dehydrating agents include magnesium sulfate, sodium sulfate, titanium tetrachloride and molecular sieves. Suitable catalysts include sulfuric acid and para-toluene sulfonic acid. Suitable solvents are toluene and dichloromethane. Further reagents and reaction conditions for condensation reaction are reported for example in WO 2013/153407.

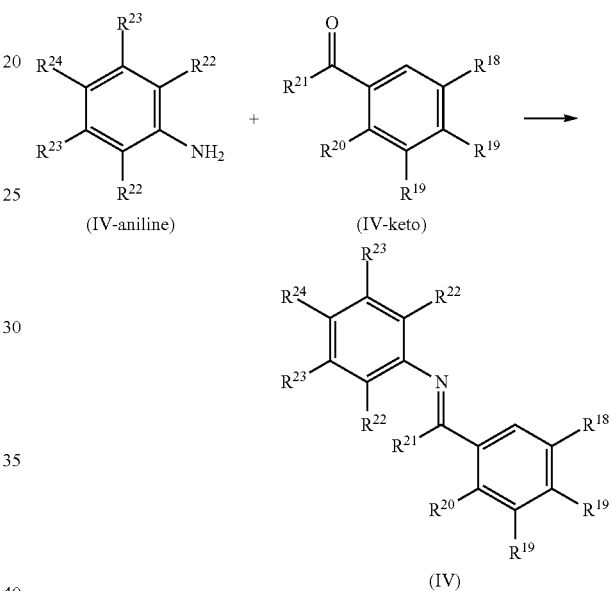

Iridium catalysts of formula (IIIa), (IIIc), (IIIe) and (IIIg), may be prepared starting from known iridium complexes (VI) wherein Hal is a halogen (iodide, bromide, chloride or fluoride), preferably iodide, bromide or chloride. Such complexes are described for example in *Angew. Chem. Int. Ed.* 2015, 54, 12149. In step (a) iridium complex (VI) is reacted via a cyclometallation reaction with a suitable C,N ligand, wherein C,N ligands are defined in compounds of formula (IIIa), (IIIc), (IIIe) and (IIIg). The cyclometallation reaction is preferably conducted in the presence of a base, for example sodium acetate or silver acetate and a solvent, for example dichloromethane. The reaction temperature is usually between −20° C. and 150° C., preferably between 0° C. and 120° C., more preferably between 20° C. and 100° C. Further suitable bases, solvents and reaction conditions for the cyclometallation reactions are reported for example in *Dalton Trans.* 2003, 4132; *Org. Biomol. Chem.* 2013, 11, 6934; WO 2013/153407; and *Chem. Soc. Rev.* 2014, 43, 2799. In step (b) iridium complex (VII) is reacted in a halogen abstraction (ligand exchange) reaction using a suitable metal salt (X-M, wherein X is as defined in (IIIa-1), and M represents a metal), such as silver mesylate, silver sulfate, silver p-tosylate, sodium tetrafluoroborate, or sodium mesylate. Such reactions are preferably conducted in non-coordinating or weakly coordinating solvents such as dichloromethane, chloroform, 1,2-dichloroethane or tetrahydrofuran. The reaction temperature is usually between −20° C. and 150° C., preferably between 0° C. and 100° C. more preferably between 0° C. and 80° C.

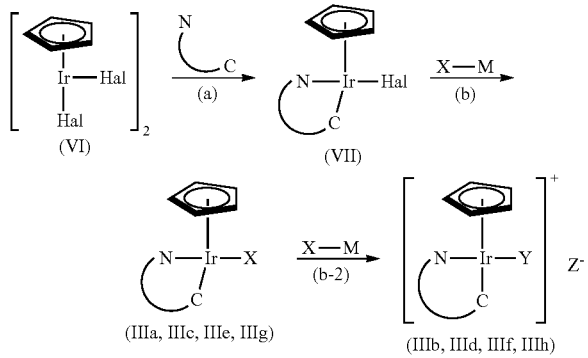

If the catalyst synthesis is carried out in the presence of a coordinating solvent (step b-2), for example acetonitrile or water, then complexes of structure (IIIb), (IIId), (IIIf) and (IIIh) may be isolated instead. Further suitable reagents and conditions for halogen abstraction reactions are reported for example in Chem. Rev. 1988, 88, 1405; Chem. Rev. 1993, 93, 927; Angew. Chem. Int. Ed. 2004, 43, 2066; and Organometallics 2017, 36, 801. The same conditions as described here are suitable for preparation of the opposite enantiomer of the catalyst (IIIa-ent), (IIIb-ent), (IIIc-ent), (IIId-ent), (IIIe-ent), (IIIf-ent), (IIIg-ent), (IIIh-ent) starting from the opposite enantiomer of the complex (VI) and/or from the opposite enantiomer of the C,N ligand.

The compound (VII) may be isolated, or it may be formed and used in-situ meaning that both steps (a) and (b) are performed without isolation. The order of steps (a) and (b) may be exchanged, wherein step (b) or (b-2) is performed before step (a).

According to the process of the present invention, the amount of the iridium catalyst is usually between 0.001 mol % and 5 mol %, preferably between 0.01 mol % and 1 mol % based on moles of oxime substrate.

According to the process of the present invention, the hydrogen pressure is usually between 1 and 100 bar, preferably between 5 and 80 bar, more preferably between 7 and 60 bar, and most preferably between 10 and 50 bar.

According to the process of the present invention, the reaction temperature is usually between −20° C. and 120° C., preferably between 0° C. and 100° C., more preferably between 0° C. and 80° C., and even more preferably between 10° C. and 60° C.

The oxime hydrogenation is preferably carried out in the presence of at least a stoichiometric amount of acid. Accordingly the molar amount of the acid should be the same or higher than the amount of oxime substrate to be reduced, for example at least from 1 to 3 molar equivalents, preferably from 1 to 2 molar equivalents, and in particular 1, 1.1 or 2 molar equivalents.

The pKa of the acid has to be such that it can at least partly protonate the oxime substrate and the hydroxylamine product. Accordingly, the pKa of the acid is preferably lower than the pKa of the product hydroxylamine salt (II). Suitable acids for most oxime substrates include, methanesulfonic acid, p-toluenesulfonic acid, camphorsulfonic acid, sulfuric acid, triflic acid, trifluoroacetic acid, and tetrafluoroboric acid. Preferably, the acid is selected from methanesulfonic acid, p-toluenesulfonic acid, camphorsulfonic acid, sulfuric acid, trifluoroacetic acid and triflic acid. More preferably, the acid is selected from methanesulfonic acid, camphorsulfonic acid and sulfuric acid.

Typically the oxime hydrogenation reaction is carried out in the presence of a solvent, preferred solvents are organic solvents such as alcohols, esters, ethers or hydrocarbons. Most preferred solvents are alcohols such as methanol, ethanol, trifluoroethanol, isopropanol, 2-butanol, 2-methyl-2-butanol, and ethers such as tetrahydrofuran and methyl-tetrahydrofuran. Preferably, the solvent is isopropanol, 2-methyl-2-butanol, ethanol and methanol.

In one embodiment, the major stereoisomer of hydroxylamine of formula (II) is produced in enantiomeric excess of 60%, more preferably, in enantiomeric excess of 80%, and even more preferably, in enantiomeric excess of 90%.

EXAMPLES

The Examples which follow serve to illustrate the invention.

The following abbreviations are used: s=singlet; bs=broad singlet; d=doublet; br d=broad doublet, dd=double doublet, dt=double triplet, t=triplet, tt=triple triplet, q=quartet, hept=heptet, m=multiplet, ddd=doublet of doublet of doublets, dtd=doublet of triplet of doublets, dddt=doublet of doublet of doublet of triplets, RT=room temperature, $R_t$=retention time, MH$^+$=mass of the molecular cation+proton.

$^1$H, $^{13}$C and $^{19}$F NMR spectra were recorded on a Bruker Avance III 400 spectrometer (400 MHz) and Bruker DRX600 (600 MHz) spectrometer.

Melting points were measured on a Büchi melting point apparatus, model B-540, and are uncorrected.

Infrared spectroscopy was recorded on an Alpha-P Bruker FT-IR Spectrometer. Only strong and relevant absorptions are reported.

Optical Rotations were measured on a Polartronic M polarimeter using a 0.5 cm cell with a Na 589 nm filter.

HRMS measurements were recorded on an Agilent LC-MS TOF mass spectrometer (ESI). High resolution mass are given in m/z with only molecular ions [M−I]+, [M−OMs]+, [M+H]+ and [M+Na]+ being reported.

If not otherwise specified, chiral analysis was conducted on a Waters UPLC—HClass, Waters SFC Acquity UPC$^2$/QDa, Agilent HPLC and Shimadzu UPLC system.

Chiral cyclopentadienyl iridium iodide dimer complexes (VI) were prepared according to the following literature procedures: Angew. Chem. Int. Ed. 2015, 54, 12149; Angew. Chem. Int. Ed. 2018, 57, 5459; Organometallics (DOI: 10.1021/acs.organomet.9b00365). The opposite enantiomers of (VI-ent) were prepared according the identical procedures but starting from the opposite enantiomer of the starting materials. Methanesulfonic acid was purchased from Sigma Aldrich as >99% extra pure grade and stored in a desiccator.

Example 1: General Procedure 1: Preparation of Chiral Cyclopentadienyl Iridium Iodide Dimer Complex (VI-1-ent)

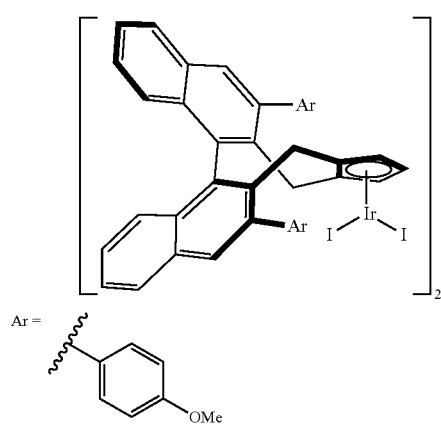

The chiral cyclopentadienyl ligand (prepared according to *J. Am. Chem. Soc.* 2015, 137, 12478; mixture of double bond isomers, 350 mg, 0.629 mmol, 1.00 eq.) was dissolved in benzene (4.0 mL, degassed by pump-freeze-thaw, 3 cycles) and thallium ethoxide (220 mg, 0.880 mmol, 1.40 eq.) was added as a solution in benzene (2.0 mL, degassed) under a nitrogen atmosphere and in the absence of light at room temperature. The mixture was heated to 80° C. in a sealed tube for 2 h. In parallel, ethylene gas was bubbled through a suspension of $[Ir(coe)_2Cl]_2$ (394 mg, 0.440 mmol, 0.70 eq.) in THF (6.0 mL) at 0° C. until a clear yellow solution was obtained. This solution of 'in situ' generated $[Ir(ethylene)_2Cl]_2$ was added to the above prepared reaction mixture at room temperature under a nitrogen atmosphere and was stirred for 18 h. The resulting red emulsion was purified by flash column chromatography (SiO2; nHex: toluene 70:30 to 0:100) to yield the corresponding [Cp$^x$Ir (ethylene)$_2$] complex (409 mg) as a pale yellow gum/solid. The [Cp$^x$Ir(ethylene)$_2$] complex (409 mg, 0.491 mmol, 1.00 eq.) was dissolved in toluene (3.0 mL) and a solution of iodine (137 mg, 0.540 mmol, 1.1 eq.) in toluene (2.00 mL) was added at 0° C. under a nitrogen atmosphere. The resulting brown solution was stirred for 30 min at 0° C. n-Hexane (15 mL) was added and the dark precipitate was filtered off, washing with pentane (3×5 mL) and re-dissolving it in dichloromethane. After removal of the solvent, the chiral cyclopentadienyl iridium iodide dimer complex (VI-1-ent) was obtained as a bright dark brown solid (489 mg, 78% yield). $^1$H NMR (400 MHz, CDCl$_3$): $\delta_H$=8.08 (d, J=8.2 Hz, 2H), 7.94-7.88 (m, 2H), 7.87 (d, J=0.8 Hz, 2H), 7.83 (s, 2H), 7.49 (dddd, J=17.5, 8.1, 6.8, 1.2 Hz, 4H), 7.36-7.27 (m, 8H), 7.14-7.10 (m, 2H), 7.10-7.03 (m, 8H), 7.02-6.96 (m, 2H), 6.76 (d, J=8.6 Hz, 4H), 5.17-5.12 (m, 2H), 4.73 (t, J=2.2 Hz, 2H), 4.59 (t, J=1.7 Hz, 2H), 3.96 (s, 6H), 3.84 (s, 6H), 3.79 (d, J=14.1 Hz, 2H), 3.73 (d, J=16.2 Hz, 2H), 3.59 (d, J=14.0 Hz, 2H), 3.16 (d, J=16.1 Hz, 2H); $^{13}$C NMR (101 MHz, CDCl$_3$) $\delta_C$=159.41, 158.79, 140.93, 139.49, 138.17, 136.41, 133.86, 132.75, 132.68, 132.60, 132.51, 132.00, 131.69, 131.53, 131.00, 130.73, 129.95, 129.56, 128.17, 128.02, 126.77, 126.63, 126.58, 126.55, 114.30, 114.23, 95.79, 90.76, 84.02, 80.65, 68.04, 55.75, 55.64, 30.22, 27.73; HRMS (ESI$^+$): m/z calcd for $C_{82}H_{62}I_3Ir_2O_4$ [M−I]$^+$ 1877.1041, found 1877.1048.

TABLE 1

Physical data of compounds (VI) prepared according to the General Procedure 1:

| Cpd. No. | Structure | Characterization Data |
| --- | --- | --- |
| (VI-3-ent) | [structure shown with Ar groups, Ir center, and two I ligands; Ar = 2-naphthyl] | Bright dark brown solid. $^1$H NMR (400 MHz, CDCl$_3$): $\delta_H$ = 8.10-7.10 (m, 48H), 4.96 (s, 2H), 4.55 (s, 2H), 4.08 (s, 2H), 3.79 (br. d, J = 14.3 Hz, 2H), 3.73 (d, J = 16.2 Hz, 2H), 3.64 (d, J = 13.9 Hz, 2H), 3.26 (d, J = 16.1 Hz, 2H); $^{13}$C NMR (101 MHz, CDCl$_3$) $\delta_C$ = 141.25, 139.81, 138.16, 137.88, 136.50, 133.94, 133.35, 132.76, 132.66, 132.64, 132.58, 131.91, 131.76, 131.43, 130.04, 129.56, 128.88, 128.87, 128.80, 128.77, 128.49, 128.31, 128.15, 128.09, 128.07, 127.79, 127.05, 126.98, 126.80, 126.75, 126.66, 125.93, 125.73, 83.49, 30.34, 27.66; HRMS (ESI$^+$): m/z calcd for $C_{94}H_{62}I_3Ir_2$ [M − I]$^+$ 1957.1244, found 1957.1250. |

Example 2: General Procedure 2A, Synthesis of Ligands of Formula (IV)

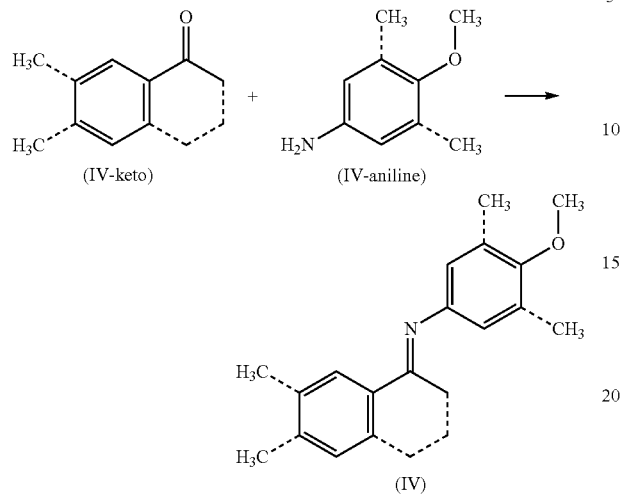

A round-bottom flask, equipped with a condenser, was charged with the aniline (IV-aniline) (1 eq.), ketone (IV-keto) (1 eq.), molecular sieves 4 Å and dry toluene. The reaction mixture was stirred and refluxed for 20 h. After cooling to room temperature, the mixture was filtered through a short pad of Celite. The resulting filtrate was concentrated under reduced pressure to afford the crude imine, which was purified by either trituration in hexane:Et$_2$O or by flash column chromatography to afford the desired imine product (IV).

Example 2: General Procedure 2B, Alternative Synthesis of Ligands of Formula (IV)

A flame-dried round-bottom flask was charged with the aniline (IV-aniline) (1 eq), ketone (IV-ketone) (1 eq), triethylamine (2.5 eq) and dry dichloromethane under a nitrogen atmosphere. After cooling to −78° C., a solution of titanium tetrachloride (0.5 eq) in dichloromethane was added dropwise and the reaction mixture was warmed to room temperature and stirred for 2 h. The reaction mixture was quenched by addition of sat. aq. Na$_2$CO$_3$ solution. After dilution with dichloromethane, the solids were filtered off and the phases were separated. Aqueous layer was extracted twice with dichloromethane.

Organic layers were combined, dried, filtered and evaporated to afford the crude imine, which was purified by either trituration in hexane:Et$_2$O or flash column chromatography to afford the desired imine product (IV).

Example 3: Preparation of (E)-4-methoxy-N-(7-(2-methoxyethoxy)-3,4-dihydro naphthalen-1(2H)-ylidene)-3,5-dimethylaniline (IV-8)

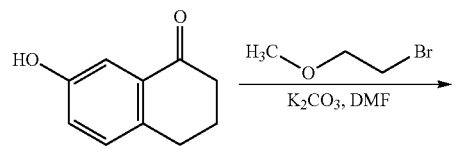

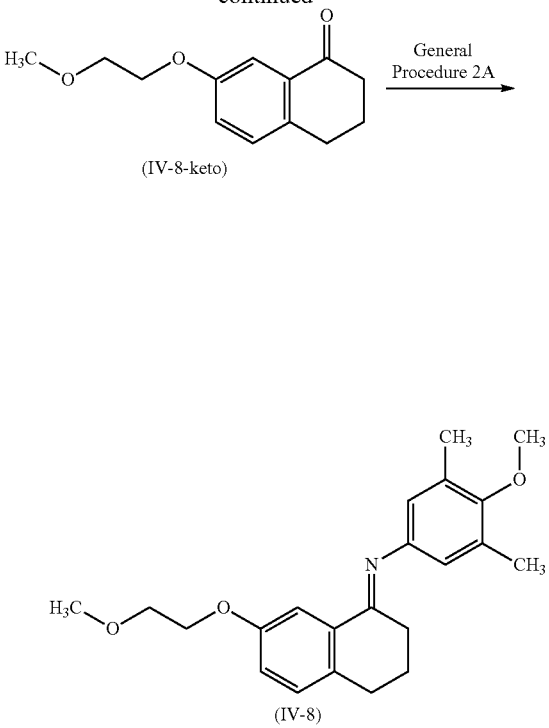

Step 1: a flame-dried sealed tube was charged with 7-hydroxy-1-tetralone (100 mg, 0.617 mmol) and dry potassium carbonate (256 mg, 1.850 mmol). DMF (1.2 mL) was added and the mixture was stirred for 10 min at room temperature. 1-bromo-2-methoxyethane bromide (0.12 mL, 1.233 mmol) was added and the reaction mixture was stirred for 16 h at 65° C. The reaction mixture was partitioned between water and diethyl ether. The aqueous phase was extracted three times with diethyl ether, the combined organic layers washed twice with water, then brine, dried over anhydrous Na$_2$SO$_4$, filtered and concentrated under reduced pressure to afford the crude product (IV-8-keto) (139 mg) as a brown oil. Rf 0.15 (SiO$_2$; nHex:EtOAc 90:10); $^1$H NMR (400 MHz, CDCl$_3$): δ=7.51 (d, J=2.8 Hz, 1H), 7.16 (d, J=8.4 Hz, 1H), 7.11 (dd, J=8.4, 2.8 Hz, 1H), 4.17-4.14 (m, 2H), 3.77-3.73 (m, 2H), 3.45 (s, 3H), 2.89 (t, J=6.1 Hz, 2H), 2.63 (dd, J=7.2, 5.8 Hz, 2H), 2.11 (p, J=6.5 Hz, 2H).

Step 2: following the General Procedure 2A, 4-methoxy-3,5-dimethylaniline (30.0 mg, 0.198 mmol) was reacted with 7-(2-methoxyethoxy)-3,4-dihydronaphthalen-1(2H)-one (IV-8-keto) (43.7 mg, 0.198 mmol) and molecular sieves (4 Å) in dry toluene (2.0 mL) stirring at reflux for 20 h. The crude imine product was purified by flash column chromatography (SiO$_2$; nHex:Et$_2$O:Et$_3$N 80:20:1 to 60:40:1) to afford the title compound (50 mg, 71%>95:5 E:Z) as a pale yellow solid. Rf 0.4 (nHex:Et$_2$O:Et$_3$N 60:40:1); m.p.=86-88° C.; IR (neat, cm-1): ν$_{max}$=2927, 1627, 1600, 1492, 1480, 1219; $^1$H NMR (400 MHz, CDCl$_3$): δ=7.81 (d, J=2.8 Hz, 1H), 7.09 (d, J=8.4 Hz, 1H), 7.00 (dd, J=8.4, 2.8 Hz, 1H), 6.44 (s, 2H), 4.21-4.16 (m, 2H), 3.77-3.73 (m, 2H), 3.72 (s, 3H), 3.44 (s, 3H), 2.82 (t, J=6.1 Hz, 2H), 2.55-2.49 (m, 2H), 2.27 (s, 6H), 1.88 (p, J=6.3 Hz, 2H); $^{13}$C NMR (101 MHz, CDCl$_3$) δ=165.44, 157.43, 152.97, 147.22, 134.87, 134.16, 131.32, 129.93, 119.76, 119.65, 109.19, 71.19, 67.47, 59.99, 59.27, 29.88, 29.30, 23.36, 16.30; HRMS (ESI+): m/z calculated for C$_{22}$H$_{28}$NO$_3$ [M+H]+ 354.2064, found 354.2060.

Example 4: Preparation (S,E)-4-methoxy-N-(7-(2-methoxy-1-phenylethoxy)-3,4-dihydro-naphthalen-1(2H)-ylidene)-3,5-dimethylaniline (IV-12)

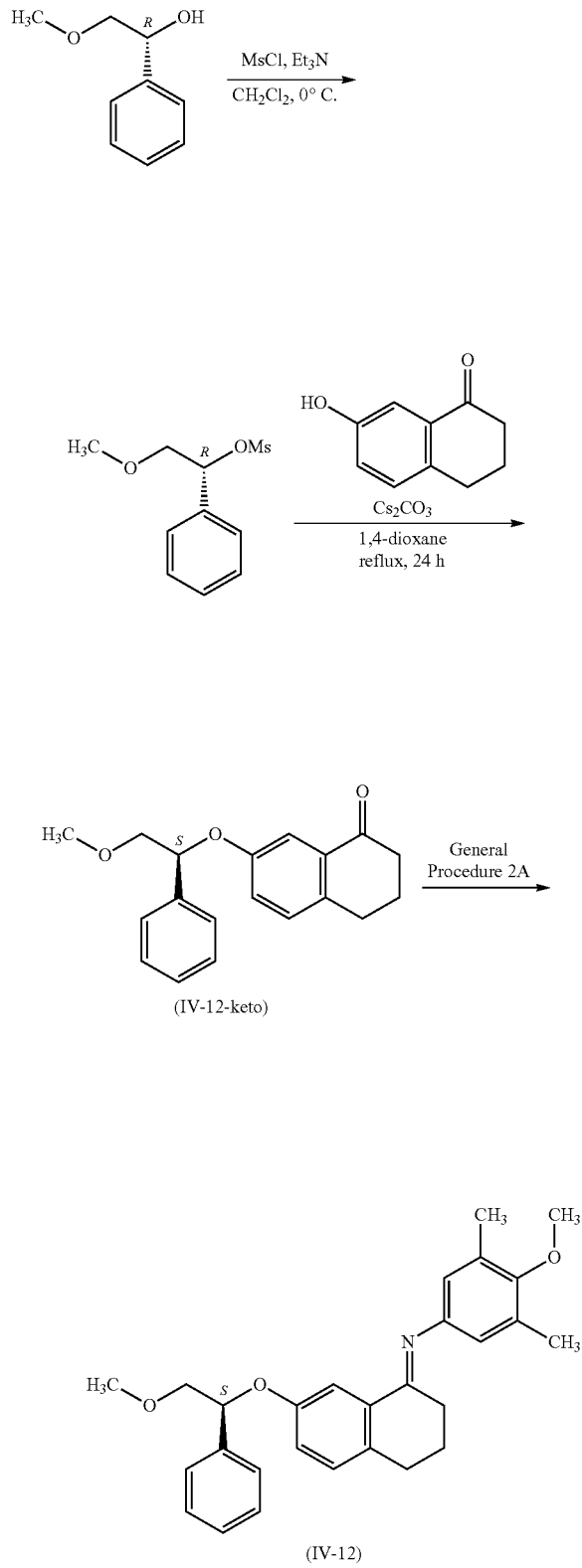

(IV-12-keto)

(IV-12)

Step 1: In a flame-dried round-bottom flask, methanesulfonyl chloride (37 μL, 0.473 mmol) was added dropwise to a solution of (R)-2-methoxy-1-phenylethanol (60 mg, 0.394 mmol) and triethylamine (66 μL, 0.473 mmol) in anhydrous dichloromethane (2.0 mL) at 0° C. The reaction mixture was stirred at 0° C. for 2 h. The reaction mixture was partitioned between $H_2O$ and $CH_2Cl_2$. The aqueous phase was further extracted twice with $CH_2Cl_2$. The combined organic layers were dried over $Na_2SO_4$, filtered and the solvent was removed under reduced pressure to afford the crude product (R)-2-methoxy-1-phenylethyl methanesulfonate (85 mg), which was used in the next step without further purification.

Step 2: A flame-dried sealed tube was charged with 7-hydroxy-1-tetralone (40 mg, 0.247 mmol) and dry caesium carbonate (121 mg, 0.370 mmol). Anhydrous 1,4-dioxane (1.0 mL) was added and the mixture was stirred for 10 min at room temperature. A solution of (R)-2-methoxy-1-phenylethyl methanesulfonate (85 mg) in 1,4-dioxane (0.5 mL) was added and the reaction mixture was stirred for 24 h at 100° C. The solvent was removed under reduced pressure. The remaining residue was partitioned between water and diethyl ether. The aqueous phase was extracted three times with diethyl ether, the combined organic layers were washed twice with water, then brine, dried over anhydrous $Na_2SO_4$, filtered and concentrated under reduced pressure. The crude product was purified by flash column chromatography ($SiO_2$; nHex:EtOAc 90:05 to 80:20) to afford ketone (IV-12)-keto (20 mg, 28% over 2 steps) as a colourless oil. $R_f$ 0.35 ($SiO_2$; nHex:EtOAc 80:20); $^1$H NMR (400 MHz, $CDCl_3$) δ 7.53-7.48 (m, 1H), 7.42-7.37 (m, 2H), 7.36-7.30 (m, 2H), 7.29-7.22 (m, 1H), 7.08 (d, J=1.6 Hz, 2H), 5.41 (dd, J=7.8, 3.5 Hz, 1H), 3.81 (dd, J=10.8, 7.8 Hz, 1H), 3.63 (dd, J=10.9, 3.5 Hz, 1H), 3.44 (s, 3H), 2.83 (t, J=6.1 Hz, 2H), 2.59-2.52 (m, 2H), 2.10-1.99 (n, 2H). $^{13}$C NMR (101 MHz, $CDCl_3$) δ 198.16, 156.69, 138.15, 137.36, 133.41, 129.97, 128.78, 128.23, 126.64, 122.74, 112.70, 79.56, 59.53, 39.08, 28.98, 23.51. Chiral HPLC: Chiralpak IA column, 4.6×250 mm; nHex:iPrOH 90:10, flow=1.0 mL/min; T=25° C.; λ=254 nm. $t_{R,A}$=9.1 min (minor), $t_{R,B}$=19.4 min (major); 94:6 er.

Step 3: Following the General Procedure 2A, 4-methoxy-3,5-dimethylaniline (10.2 mg, 0.067 mmol) was reacted with (S)-7-(2-methoxy-1-phenylethoxy)-3,4-dihydronaphthalen-1(2H)-one (IV-12-keto) (20.0 mg, 0.067 mmol) and molecular sieves (4 Å) in dry toluene (0.7 mL) stirring at reflux for 20 h. The crude imine product was purified by flash column chromatography ($SiO_2$; nHex:$Et_2O$:$Et_3N$ 80:20:1 to 60:40:1) to afford the title compound (IV-12) (9 mg, 31%>95:5 E:Z) as a pale yellow oil. $R_f$ 0.5 (nHex:$Et_2O$:$Et_3N$ 60:40:1); $^1$H NMR (400 MHz, $CDCl_3$) δ 7.87 (d, J=2.8 Hz, 1H), 7.45-7.39 (m, 2H), 7.36-7.30 (m, 2H), 7.29-7.22 (m, 2H), 7.00 (d, J=8.4 Hz, 1H), 6.92 (dd, J=8.4, 2.7 Hz, 1H), 6.40 (s, 2H), 5.44 (dd, J=7.6, 3.7 Hz, 1H), 3.80 (dd, J=10.8, 7.6 Hz, 1H), 3.72 (s, 3H), 3.64 (dd, J=10.8, 3.7 Hz, 1H), 3.43 (s, 3H), 2.75 (t, J=6.1 Hz, 2H), 2.54-2.39 (m, 2H), 2.27 (s, 6H), 1.83 (p, J=6.4 Hz, 2H).

TABLE 2

*Physical data of further compounds of Formula (IV) prepared according to the General Procedures 2A or 2B:*

| Cpd. No. | Structure | Characterization Data |
|---|---|---|
| (IV-4) | | Synthesized according to General Procedure 2A. m.p. = 97-99° C.; IR (neat, cm$^{-1}$): v$_{max}$ = 2937, 1626, 1595, 1495, 1479, 1248, 1220; $^1$H NMR (400 MHz, CDCl$_3$): δ = 8.23 (d, J = 8.8 Hz, 1H), 6.83 (dd, J = 8.8, 2.6 Hz, 1H), 6.67 (d, J = 2.6 Hz, 1H), 6.44 (s, 2H), 3.84 (s, 3H), 3.72 (s, 3H), 2.86 (t, J = 6.1 Hz, 2H), 2.52 (dd, J = 7.2, 5.6 Hz, 2H), 2.27 (s, 6H), 1.89 (p, J = 6.5 Hz, 2H); $^{13}$C NMR (101 MHz, CDCl$_3$) δ = 164.96, 161.49, 152.82, 147.46, 143.18, 131.22, 128.36, 127.34, 119.92, 113.05, 112.77, 60.01, 55.43, 30.51, 29.92, 23.24, 16.32; HRMS (ESI+): m/z calcd for C$_{20}$H$_{24}$NO$_2$ [M + H]+ 310.1802, found 310.1811. |
| (IV-15) | | Synthesized according to General Procedure 2A. Beige solid. m.p. = 138-140° C.; $^1$H NMR (400 MHz, CDCl$_3$): δ = 8.33 (d, J = 8.8 Hz, 1H), 7.82 (dd, J = 8.5, 3.0 Hz, 2H), 7.75 (d, J = 8.1 Hz, 1H), 7.45 (ddd, J = 8.2, 6.8, 1.3 Hz, 1H), 7.38 (ddd, J = 8.1, 6.8, 1.3 Hz, 1H), 7.17 (d, J = 1.9 Hz, 1H), 7.04 (dd, J = 8.6, 2.0 Hz, 1H), 6.88 (dd, J = 8.8, 2.7 Hz, 1H), 6.71 (d, J = 2.6 Hz, 1H), 3.87 (s, 3H), 2.88 (t, J = 6.1 Hz, 2H), 2.53 (dd, J = 7.1, 5.6 Hz, 2H), 1.91 (p, J = 6.3 Hz, 2H). $^{13}$C NMR (151 MHz, CDCl$_3$) δ = 165.58, 161.68, 149.66, 143.47, 134.33, 130.37, 128.85, 128.52, 127.86, 127.29, 127.11, 126.28, 124.30, 121.37, 115.44, 113.16, 112.82, 55.47, 30.48, 30.18, 23.19. HRMS (ESI+); m/z calcd for C$_{21}$H$_{20}$NO [M + H]+ 302.1539, found 302.1537. |
| (IV-5) | | Synthesized according to General Procedure 2A. $^1$H NMR (400 MHz, CDCl$_3$): δ = 7.81 (d, J = 2.8 Hz, 1H), 7.10 (d, J = 8.5 Hz, 1H), 6.95 (dd, J = 8.4, 2.8 Hz, 1H), 6.45 (s, 2H), 3.85 (s, 3H), 3.72 (s, 3H), 2.83 (t, J = 6.1 Hz, 2H), 2.53 (ddd, J = 7.4, 5.4, 1.5 Hz, 2H), 2.28 (s, 6H), 1.89 (p, J = 6.7 Hz, 2H). |
| (IV-14-keto) | | Synthesized from hydroxy-1-benzosuberone (*Chem. Commun.* 2017, 53, 1490) according to Example 3 (Step 1). Yellow oil. Rf 0.35 (SiO$_2$; nHex:EtOAc 80:20); $^1$H NMR (400 MHz, CDCl$_3$); δ = 7.27 (d, J = 2.8 Hz, 1H), 7.10 (d, J = 8.3 Hz, 1H), 7.01 (dd, J = 8.3, 2.8 Hz, 1H), 4.13 (ddd, J = 6.2, 4.5, 1.2 Hz, 2H), 3.74 (ddd, J = 5.6, 3.2, 1.3 Hz, 2H), 3.44 (s, 3H), 2.86 (dd, J = 6.9, 5.1 Hz, 2H), 2.72 (td, J = 6.6, 5.0, 1.3 Hz, 2H), 1.88-1.74 (m, 4H); $^{13}$C NMR MHz, CDCl$_3$) δ = 205.69, 157.57, 139.54, 134.34, 131.18, 119.98, 112.91, 71.09, 67.58, 59.32, 40.92, 31.81, 25.47, 21.00. |

TABLE 2-continued

Physical data of further compounds of Formula (IV) prepared according to the General Procedures 2A or 2B:

| Cpd. No. | Structure | Characterization Data |
| --- | --- | --- |
| (IV-14) | | Synthesized from (IV-14-keto) according to General Procedure 2A.<br>Yellow oil. Mixture of E/Z-diastereoisomers in a 90:10 E:Z ratio. Rf 0.2 (nHex:Et$_2$O:Et$_3$N 70:30:1); $^1$H NMR (400 MHz, CDCl$_3$) (mixture of E:Z stereoisomers in a 0.9:0.1 ratio): δ = 7.29 (d, J = 2.8 Hz, 0.9H), 7.04 (d, J = 8.3 Hz, 0.9H), 7.00 (d, J = 8.2 Hz, 0.1H), 6.90 (dd, J = 8.3, 2.8 Hz, 0.9H), 6.65 (dd, J = 8.3, 2.7 Hz, 0.1H), 6.45 (s, 1.8H), 6.28 (s, 0.2H), 6.23 (d, J = 2.7 Hz, 0.1H), 4.18-4.14 (m, 1.8H), 3.81-3.77 (m, 0.2H), 3.77-3.73 (m, 1.8H), 3.72 (s, 2.7H), 3.61 (s, 0.3H), 3.55-3.52 (m, 0.2H), 3.45 (s, 2.7H), 3.35 (s, 0.3H), 2.90-2.75 (m, 2H), 2.75-2.67 (m, 0.2H), 2.51-2.46 (m, 1.8H), 2.28 (s, 5.4H), 2.10 (s, 0.6H), 2.02-1.94 (m, 0.2H), 1.83-1.75 (m, 1.8H), 1.68-1.59 (m, 1.8H), 1.34-1.27 (m, 0.2H); $^{13}$C NMR (101 MHz, CDCl$_3$) δ = 174.51 (Z), 173.84 (E), 157.51 (E), 156.58 (Z), 153.16 (Z), 152.95 (E), 147.02 (E), 146.24 (Z), 141.75 (E), 140.25 (Z), 132.52 (E), 132.32 (Z), 131.36 (E), 131.19 (Z), 130.65 (Z), 130.48 (E), 121.18 (Z), 119.04 (E), 116.75 (E), 115.09 (Z), 113.36 (E), 113.24 (Z), 71.22 (E), 70.81 (Z), 67.51 (E), 67.38 (Z), 59.99 (E), 59.83 (Z), 59.30 (E), 59.21 (Z), 32.45 (E), 31.75 (E), 31.71 (Z), 27.59 (Z), 26.38 (E), 24.48 (E), 22.78 (Z), 16.34 (E), 16.16 (Z), 11.75 (Z). HRMS (ESI+): m/z calcd for C$_{23}$H$_{30}$NO$_3$ [M + H]+ 368.2220, found 368.2223 |
| (IV-13-keto) | | Synthesized from 6-hydroxychroman-4-one (*Bioorg. Med. Chem. Lett.* 1999, 9, 2773) according to Example 3 (Step 1).<br>Brown oil. $^1$H NMR (400 MHz, CDCl$_3$); δ = 7.31 (d, J = 3.1 Hz, 1H), 7.13 (dd, J = 9.0, 3.2 Hz, 1H), 6.89 (d, J = 9.0 Hz, 1H), 4.48 (dd, J = 7.0, 5.9 Hz, 2H), 4.10 (td, J = 5.5, 4.5, 1.2 Hz, 2H), 3.75-3.71 (m, 2H), 3.43 (s, 3H), 2.77 (t, J = 6.5 Hz, 2H); $^{13}$C NMR (101 MHz, CDCl$_3$) δ = 191.95, 156.83, 153.31, 125.98, 121.16, 119.31, 108.39, 71.05, 67.96, 67.20, 59.31, 37.82. |
| (IV-13) | | Synthesized from (IV-13-keto) according to General Procedure 2B.<br>IR (neat, cm$^{-1}$); ν$_{max}$ = 2924, 1633, 1609, 1487, 1434, 1278; $^1$H NMR (400 MHz, CDCl$_3$); δ = 7.64 (d, J = 3.1 Hz, 1H), 7.02 (dd, J = 9.0, 3.2 Hz, 1H), 6.85 (d, J = 9.0 Hz, 1H), 6.46 (s, 2H), 4.22 (dd, J = 6.6, 5.6 Hz, 2H), 4.16-4.11 (m, 2H), 3.77-3.70 (m, 5H), 3.44 (s, 3H), 2.70 (t, J = 6.1 Hz, 2H), 2.27 (s, 6H); $^{13}$C NMR (101 MHz, CDCl$_3$) δ = 159.63, 153.41, 153.36, 153.34, 146.10, 131.46, 122.42, 121.89, 120.27, 118.74, 108.40, 71.23, 67.97, 66.28, 60.01, 59.31, 28.97, 16.33. HRMS (ESI+); m/z calcd for C$_{21}$H$_{26}$NO$_4$ [M + H]$^+$ 356.1856, found 356.1861. |
| (IV-17-keto) | | Synthesized from 7-hydroxy-1-tetralone according to Example 3 (Step 1).<br>Rf = 0.15 (SiO$_2$; n-Hex:EtOAc 80:20); $^1$H NMR (400 MHz, CDCl$_3$); δ = 7.44 (d, J = 2.8 Hz, 1H), 7.19 (d, J = 8.4 Hz, 1H), 7.13 (dd, J = 8.4, 2.9 Hz, 1H), 4.67 (s, 2H), 3.79 (s, 3H), 2.89 (t, J = 6.1 Hz, 2H), 2.62 (dd, J = 7.3, 5.8 Hz, 2H), 2.10 (p, J = 6.5 Hz, 2H); $^{13}$C NMR (101 MHz, CDCl$_3$) δ = 198.10, 169.19, 156.56, 138.31, 133.48, 130.43, 122.41, 109.86, 65.27, 52.39, 39.02, 28.99, 23.48. |
| (IV-17) | | Synthesized from (IV-17-keto) according to General Procedure 2B (T = 0° C., reaction time = 5 h).<br>$^1$H NMR (400 MHz, CDCl$_3$); δ = 7.71 (d, J = 2.8 Hz, 1H), 7.05 (d, J = 8.4 Hz, 1H), 6.96 (dd, J = 8.4, 2.9 Hz, 1H), 6.36 (s, 2H), 4.62 (s, 2H), 3.73 (s, 3H), 3.65 (s, 3H), 2.76 (t, J = 6.1 Hz, 2H), 2.48-2.41 (m, 2H), 2.21 (s, 6H), 1.82 (h, J = 6.3, 5.8 Hz, 2H); $^{13}$C NMR (101 MHz, CDCl$_3$) δ = 169.55, 165.18, 156.43, 153.04, 147.15, 135.10, 135.04, 131.39, 130.22, 119.66, 119.60, 109.43, 65.43, 60.03, 52.35, 29.84, 29.33, 23.28, 16.34. HRMS (ESI+): m/z calcd for C$_{22}$H$_{26}$NO$_4$ [M + H]$^+$ 368.1856, found 368.1859. |

Example 5: General Procedure 3, Synthesis of Chiral Catalysts of Formula (III)

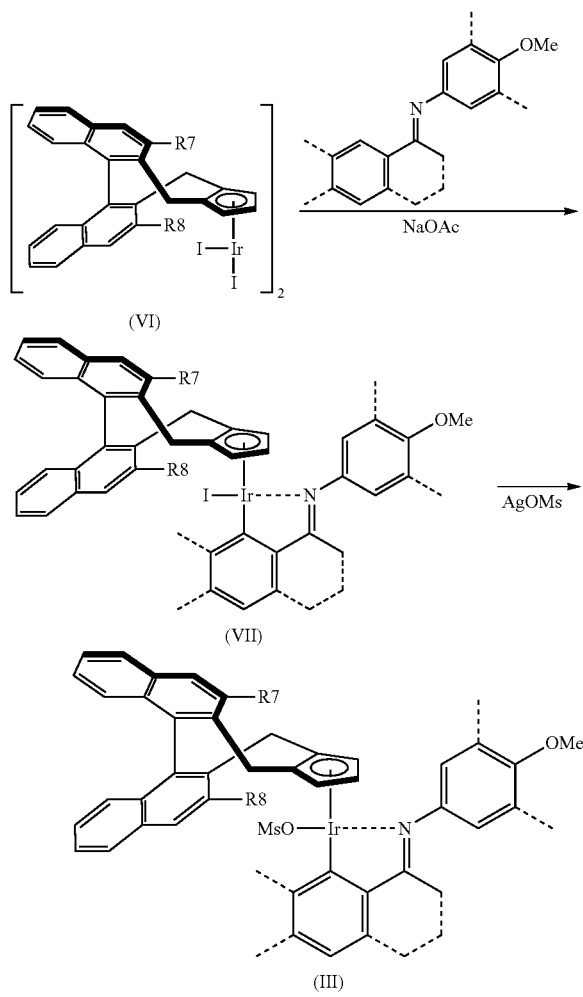

Step (1)—Method A: A flame-dried sealed tube was charged with iridium complex (VI) (1.0 eq dimer), sodium acetate (20 eq) and the corresponding imine ligand (IV) (2.2 eq). 1,2-DCE (0.015-0.100 M) was added under a nitrogen atmosphere and the reaction mixture was heated to 50-80° C. stirring for 20 h. After cooling to room temperature, the mixture was directly purified by flash column chromatography to afford the corresponding Cp*Ir(III)-iodide complex (VII) (typically a mixture of diastereoisomers).

Step (1)—Method B: A flame-dried sealed microwave tube was charged with iridium complex (VI) (1.0 eq dimer), sodium acetate (10 eq), silver acetate (2.0 eq) and the corresponding imine ligand (IV) (3.0 eq). 1,2-DCE (0.015-0.100 M) was added under a nitrogen atmosphere and the reaction mixture was heated to 100° C. in a microwave reactor stirring for 3 h. After cooling to room temperature, the mixture was directly purified by flash column chromatography to afford the corresponding Cp*Ir(III)-iodide complex (VII) (typically a mixture of diastereoisomers).

Step (2): A flame-dried sealed tube, wrapped in aluminium foil, was charged with the iridium-iodide complex (VII) (1.0 eq) and AgOMs (1.0 to 2.0 eq). Chloroform (0.015 to 0.100 M) was added under a nitrogen atmosphere and the reaction mixture was stirred at room temperature for 20 h. The mixture was filtered through a pad of Celite®. The filtrate was concentrated under reduced pressure to afford the corresponding CpIr(III)-OMs complex (III) (typically as one species, or as a mixture of mesylate complex (IIIa) and aqua complex (IIIb, also aqua-III)), which was used as catalyst in the oxime reductions without further purification.

Example 6: Preparation of [(R)-BINOL-diPh]CpIr [(E)-4-methoxy-N-(7-(2-methoxy ethoxy)-3,4-dihydronaphthalen-1(2H)-ylidene)-3,5-dimethylaniline] methanesulfonate (III-3)

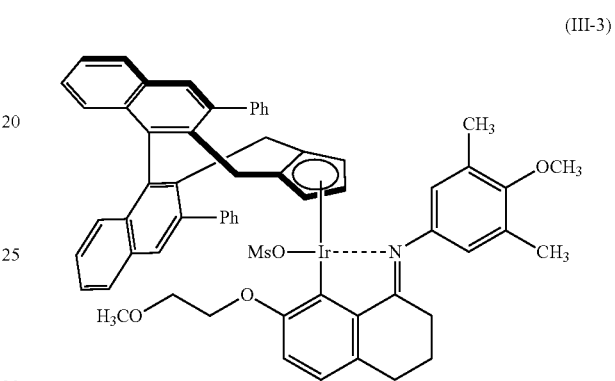

Following General Procedure 3 (step 1—method B), the corresponding chiral cyclopentadienyl iridium iodide dimer [(R)-BINOL-diPh]CpIrI$_2$]$_2$ (200 mg, 0.106 mmol; *Angew. Chem. Int. Ed.* 2015, 54, 12149) was reacted with NaOAc (87 mg, 1.062 mmol), AgOAc (36 mg, 0.212 mmol) and (E)-4-methoxy-N-(7-(2-methoxyethoxy)-3,4-dihydronaphthalen-1(2H)-ylidene)-3,5-dimethylaniline (113 mg, 0.319 mmol) in 1,2-DCE (2.1 mL) at 100° C. stirring for 3 h. After cooling to room temperature, the mixture was directly purified by flash column chromatography (SiO$_2$; nHex:Et$_2$O 80:20 to 65:35) to afford the corresponding iridium-iodide complex (VII-3) (200 mg, 81%, 85:15 dr) as an orange solid. R$_f$ 0.35 (SiO$_2$; nHex:Et$_2$O 60:40); [α]$_D^{20}$=+151.6 (c=0.1, CHCl$_3$); IR (neat, cm$^{-1}$): ν$_{max}$=2925, 1588, 1566, 1480, 1447, 1402, 1228, 1211, 704; $^1$H NMR (400 MHz, CDCl$_3$) (mixture of diastereoisomers in a 0.85:0.15 ratio; the peaks correspond to the major diast. unless otherwise stated): δ=7.99 (s, 1H), 7.97 (d, J=7.8 Hz, 1H), 7.82 (d, J=8.3 Hz, 1H), 7.79 (s, 1H), 7.74 (d, J=2.6 Hz, 1H), 7.56-7.44 (m, 4H), 7.38-7.29 (m, 3H), 7.17 (ddd, J=8.3, 6.8, 1.3 Hz, 1H), 7.09 (ddt, J=8.7, 7.5, 2.5 Hz, 4H), 6.81 (dd, J=8.3, 3.2 Hz, 2H), 6.73 (d, J=8.0 Hz, 1H), 6.60-6.48 (m, 3H), 6.00 (s, 0.15H, minor diast.), 5.79 (t, J=1.7, 1.3 Hz, 1H), 5.60 (d, J=2.7 Hz, 1H), 4.86 (t, J=2.2 Hz, 0.15H, minor diast.), 4.79 (t, J=2.2 Hz, 1H), 4.21 (t, J=1.6 Hz, 1H), 4.07 (dd, J=7.1, 2.9 Hz, 2H), 3.67-3.61 (m, 2H), 3.31 (s, 3H), 3.30 (s, 3H), 3.24 (s, 0.45H, minor diast.), 3.20 (s, 0.45H, minor diast.), 2.93-2.78 (m, 2H), 2.78-2.67 (m, 3H), 2.65-2.52 (m, 1H), 2.16 (s, 3H), 2.14 (s, 0.3H), 2.05 (d, J=13.5 Hz, 1H), 1.80-1.62 (m, 2H), 1.02 (s, 0.45H, minor diast.), 1.00 (s, 3H); $^{13}$C NMR (151 MHz, CDCl$_3$) (mixture of diastereoisomers in a 0.85:0.15 ratio; the peaks correspond to the major diast. unless otherwise stated; some peaks corresponding to the minor diast. are missing due to low intensity) δ$_C$=183.50, 160.82, 160.02 (minor diast.), 155.06, 152.10, 151.64 (minor diast.), 146.88 (minor diast.), 146.32, 145.70, 145.38 (minor diast.), 141.74, 140.87, 140.57, 139.85, 138.06, 137.99, 135.28, 133.32, 132.58, 132.19, 132.17, 131.95, 131.83, 131.25, 130.42, 129.83, 129.77, 129.74, 129.47, 128.51, 128.07, 128.05, 128.01, 127.23, 126.77, 126.51, 126.41, 126.30, 126.27, 126.17, 125.98, 125.67 (minor diast.), 122.58, 122.19, 115.70 (minor diast.), 115.27, 107.16 (minor diast.), 106.36, 90.67 (minor diast.), 90.16, 86.73, 81.45, 71.88, 71.71 (minor diast.), 68.16, 64.14, 59.70, 58.91, 34.40 (minor diast.), 32.11 (minordiast.), 31.49, 30.60, 30.46, 28.88, 25.64, 24.10, 22.85 (minor diast.), 21.37 (minor diast.), 15.86, 15.30, 14.29 (minor diast.); HRMS (ESI+): m/z calcd for $C_{61}H_{53}IrNO_3$ $[M-I]^+$ 1040.3655, found 1040.3654.

Then, following General Procedure 3 (step 2), iridium-iodide complex (VII-3) (180 mg, 0.154 mmol) was reacted with AgOMs (32 mg, 0.154 mmol) in $CDCl_3$ (3.1 mL) stirring at room temperature for 20 h. The mixture was filtered through a short pad of Celite®. The filtrate was concentrated under reduced pressure to afford the corresponding iridium-methanesulfonate complex (III-3) (168 mg, 96%, 90:10 NMR mixture of (III-3):(aqua-III-3) as a light brown solid. $^1$H NMR (400 MHz, $CDCl_3$) (the peaks correspond to (III-3) unless otherwise stated): δ=7.97 (d, J=8.1 Hz, 2H), 7.81 (d, J=8.2 Hz, 1H), 7.79 (s, 1H), 7.55-7.44 (m, 4H), 7.38-7.28 (m, 3H), 7.24-7.15 (m, 3H), 7.08 (dddd, J=8.4, 6.9, 3.3, 1.4 Hz, 2H), 6.93 (d, J=8.1 Hz, 1H), 6.88 (d, J=8.1 Hz, 0.15H, (aqua-III-3)), 6.78 (d, J=8.5 Hz, 1H), 6.73 (d, J=8.2 Hz, 1H), 6.63-6.47 (m, 3H), 6.10 (t, J=2.0 Hz, 0.85H), 6.00 (s, 0.10H, (aqua-III-3)), 5.59 (d, J=2.5 Hz, 1H), 5.44 (t, J=2.3 Hz, 0.85H), 4.85 (t, J=2.2 Hz, 0.10H, (aqua-III-3)), 4.54 (s, 1H), 4.18-4.09 (m, 1H), 3.99-3.91 (m, 1H), 3.74-3.62 (m, 2H), 3.33 (s, 2.5H), 3.31 (s, 3H), 3.30 (s, 0.3H, (aqua-III-3)), 2.90 (d, J=16.2 Hz, 1H), 2.86 (d, J=13.9 Hz, 1H), 2.79-2.68 (m, 2H), 2.66-2.43 (m, 2H), 2.17-2.11 (m, 4H), 2.08 (d, J=13.5 Hz, 1H), 2.01 (s, 2.5H), 1.98 (s, 0.3H, (aqua-III-3)), 1.84-1.66 (m, 2H), 1.02 (d, J=2.7 Hz, 3H); $^{13}$C NMR (151 MHz, $CDCl_3$) (the peaks correspond to both species (III-3) and (aqua-III-3); some peaks of the (aqua-III-3) complex might be missing due to low intensity) δ=185.87 (aqua-III-3), 183.60 (III-3), 160.13, 160.01, 155.15, 154.90, 153.90, 148.18, 146.84, 145.36, 144.43, 141.72, 141.50, 140.86, 140.56, 140.53, 139.94, 139.91, 138.07, 138.04, 137.94, 137.55, 135.25, 135.22, 133.28, 132.85, 132.57, 132.23, 132.18, 132.11, 131.89, 131.84, 131.57, 131.50, 130.63, 130.53, 130.18, 129.87, 129.78, 129.75, 129.62, 129.43, 128.60, 128.52, 128.50, 128.34, 128.06, 128.00, 127.91, 127.22, 127.19, 126.77, 126.75, 126.50, 126.44, 126.40, 126.37, 126.29, 126.24, 126.03, 125.96, 125.67, 124.48, 124.44, 124.03, 123.00, 122.19, 122.10, 115.59, 114.33, 107.63, 107.13, 90.69, 83.21, 82.89, 82.78, 73.86, 71.75, 71.68, 71.08, 68.10, 67.58, 67.23, 66.08, 64.01, 59.71, 59.05, 58.89, 31.17, 30.45, 30.08, 29.72, 28.80, 28.69, 25.81, 24.04, 23.90, 22.82, 22.78, 15.93, 15.82, 15.30, 15.27, 14.29; HRMS (ESI+): m/z calcd for $C_{61}H_{53}IrNO_3$ $[M-OMs]^+$ 1040.3655, found 1040.3662.

TABLE 3

Physical data of further compounds of Formula (III) prepared according to General Procedure 3:

| Cpd. No. | Structure | Characterization Data |
|---|---|---|
| (III-1) |  | Brown solid. $^1$H NMR (400 MHz, $CDCl_3$); δ = 7.91 (br d, J = 8.1 Hz, 1H), 7.28-7.80 (m, 6H), 6.70-7.24 (m, 9H), 6.60-6.68 (m, 1H), 5.85 (bs, 1H), 5.33 (s, 1H), 5.26 (bs, 1H), 5.02 (bs, 2H); 3.93 (s, 3H); 3.93 (s, 3H); 3.43-3.53 (m, 6H); 3.25-3.30 (m, 4H); 2.83 (br d, J = 13.8 Hz, 1H); 2.28 (bs, 3H); 2.23 (s, 3H); 1.84 (br d, J = 14.7 Hz, 1H); 1.63 (br d, J = 13.8 Hz, 1H) ppm. |

TABLE 3-continued

Physical data of further compounds of Formula (III) prepared according to General Procedure 3:

| Cpd. No. | Structure | Characterization Data |
|---|---|---|
| (III-2) | | Brown solid. $[\alpha]_D^{25}$ = −101.0 (c = 0.18, CHCl$_3$); IR (neat, cm$^{-1}$); $v_{max}$ = 2930, 1618, 1596, 1568, 1451, 1228, 749; $^1$H NMR (400 MHz, CDCl$_3$) (mixture of (III-2 and (aqua-III-2) in a 0.9:0.1 ratio; the peaks correspond to (III-2) unless otherwise stated): δ = 7.86 (d, J = 8.2 Hz, 1H), 7.73 (d, J = 8.2 Hz, 1H), 7.59 (br. s, 1H), 7.41 (ddd, J = 8.5, 6.6, 1.2 Hz, 1H), 7.31 (ddd, J = 8.1, 6.8, 1.2 Hz, 1H), 7.14 (d, J = 9.2 Hz, 2H), 7.05 (ddd, J = 8.2, 6.8, 1.2 Hz, 1H), 6.97 (ddd, J = 8.3, 6.8, 1.2 Hz, 1H), 6.85 (d, J = 7.8 Hz, 2H), 6.79 (d, J = 8.0 Hz, 1H), 6.75 (d, J = 8.5 Hz, 1H), 6.46 (br. s, 1H), 5.97 (t, J = 2.0, 1.6 Hz, 0.1H, (aqua-III-2), 5.90 (s, 1H), 5.29 (s, 1H), 5.03 (s, 1H), 4.22 (dt, J = 10.3, 5.0 Hz, 1H), 4.08-4.00 (m, 1H), 3.93 (s, 3H), 3.79-3.73 (m, 2H), 3.46 (s, 3H), 3.42 (s, 3H), 3.29-3.22 (m, 4H), 2.92-2.51 (m, 6H), 2.35 (s, 3H), 2.22 (s, 3H), 1.97-1.86 (m, 2H), 1.82-1.69 (m, 1H), 0.94 (s, 3H); $^{13}$C NMR (151 MHz, CDCl$_3$) (the peaks correspond to both (III-2) and (aqua-III-2) δ = 185.04, 182.71, 160.45 (aqua-III-2), 159.98 (III-2), 155.97, 155.58, 155.12, 154.92, 147.96, 146.83, 144.15, 143.32, 138.06, 137.91, 137.80, 136.61, 136.09, 135.88, 133.76, 133.65, 127.68, 127.30, 127.24, 126.94, 126.90, 126.87, 126.76, 126.57, 126.57, 126.37, 126.08, 124.86, 124.55, 124.21, 124.06, 123.85, 123.57, 122.66, 119.78, 116.45, 105.71, 104.19, 104.05, 96.20, 88.76, 85.55, 82.95, 73.50, 73.09, 71.91, 70.26, 69.08, 68.33, 59.75, 59.15, 59.04, 55.65, 55.59, 54.84, 54.72, 37.20, 32.07, 32.04, 31.57, 31.54, 30.46, 29.52, 29.48, 29.24, 29.02, 25.03, 24.90, 24.28, 24.08, 22.87, 22.08, 16.38, 16.29, 14.33, 14.28; HRMS (ESI+); m/z calcd for C$_{51}$H$_{49}$IrNO$_5$ [M − OMs]$^+$ 948.3240, found 904.3246. |
| (III-4) | | Brown solid. $^1$H NMR (400 MHz, CDCl$_3$) δ = 7.81 (d, J = 8.3 Hz, 1H), 7.68 (d, J = 8.2 Hz, 1H), 7.50 (s, 1H), 7.39 (ddd, J = 8.1, 6.8, 1.3 Hz, 1H), 7.31-7.27 (m, 1H), 7.12 (s, 1H), 7.01 (ddd, J = 8.2, 6.7, 1.2 Hz, 1H), 6.93 (ddd, J = 8.2, 6.8, 1.3 Hz, 1H), 6.84-6.78 (m, 2H), 6.71 (d, J = 8.1 Hz, 1H), 6.65 (d, J = 8.4 Hz, 1H), 6.42 (d, J = 2.3 Hz, 1H), 5.76 (t, J = 2.3 Hz, 1H), 5.35 (s, 1H), 5.23 (s, 1H), 4.73 (p, J = 6.0 Hz, 1H), 4.37 (p, J = 6.0 Hz, 1H), 4.21 (ddd, J = 10.4, 7.2, 3.3 Hz, 1H), 4.04-3.97 (m, 1H), 3.82-3.69 (m, 2H), 3.41 (s, 3H), 3.41 (s, 3H), 3.26 (d, J = 14.9 Hz, 1H), 2.83 (d, J = 13.3 Hz, 1H), 2.80-2.70 (m, 1H), 2.66-2.48 (m, 2H), 2.25 (s, 3H), 2.21 (s, 3H), 1.94-1.66 (m, 4H), 1.54-1.48 (m, 1H), 1.46 (d, J = 6.0 Hz, 3H), 1.41 (d, J = 6.0 Hz, 3H), 0.96 (d, J = 6.0 Hz, 3H), 0.93-0.88 (m, 6H); $^{13}$C NMR (101 MHz, CDCl$_3$) 185.37, 160.03, 155.06, 154.92, 153.44, 151.38, 148.30, 143.77, 138.39, 136.72, 135.96, 133.71, 133.64, 132.09, 129.16, 128.03, 127.96, 127.81, 127.29, 127.02, 126.91, 126.73, 126.71, 126.36, 125.88, 124.37, 124.11, 123.59, 123.02, 115.29, 110.05, 109.07, 107.00, 90.56, 83.28, 71.90, 71.82, 70.09, 69.88, 67.88, 59.67, 59.09, 37.01, 31.28, 28.88, 25.42, 24.08, 22.40, 22.32, 22.11, 21.87, 21.85, 16.21, 14.30, 1.16. HRMS (ESI+); m/z calcd for C$_{55}$H$_{57}$IrNO$_5$ [M − OMs]$^+$ 1004.3866, found 1004.3861. |
| (III-6) | | Brown solid. $[\alpha]_D^{25}$ = −29.6 (c = 0.06, CHCl$_3$); IR (neat, cm$^{-1}$); $v_{max}$ = 2935, 2177, 1736, 1594, 1563, 1543, 1505, 1454, 1463, 1243, 1227; $^1$H NMR (400 MHz, CDCl$_3$); δ = 7.90 (d, J = 8.1 Hz, 1H), 7.73 (d, J = 8.2 Hz, 1H), 7.67 (d, J = 8.6 Hz, 1H), 7.49 (ddd, J = 8.1, 6.8, 1.2 Hz, 1H), 7.44 (d, J = 2.3 Hz, 1H), 7.32 (ddd, J = 8.1, 6.8, 1.2 Hz, 1H), 7.17-7.08 (m, 3H), 6.97 (td, J = 8.2, 6.8, 0.7 Hz, 1H), 6.85 (d, J = 8.4 Hz, 1H), 6.79-6.70 (m, 2H), 6.40 (d, J = 2.3 Hz, 1H), 5.87 (t, J = 2.3 Hz, 1H), 5.28 (d, J = 14.6 Hz, 2H), 5.05 (q, J = 8.8, 8.1 Hz, 2H), 3.93 (s, 3H), 3.92 (s, 3H), 3.47 (s, 3H), 3.30 (s, 3H), 2.93-2.68 (m, 3H), 2.60 (ddd, J = 16.9, 12.1, 4.6 Hz, 1H), 2.49 (dt, J = 17.1, 4.1 Hz, 1H), 2.23 (s, 3H), 1.92 (dt, J = 8.4, 4.3 Hz, 1H), 1.82 (d, J = 14.5 Hz, 1H), 1.78-1.66 (m, 1H); $^{13}$C NMR (151 MHz, CDCl$_3$) δ = 182.66, 164.32, 162.12, 157.39, 155.81, 155.35, 145.07, 141.18, 140.28, 139.81, 138.03, 136.02, 135.72, 133.90, 133.62, 128.03, 127.96, 127.24, 127.15, 127.08, 127.03, 126.77, 126.75, 126.71, 126.52, 126.41, 126.36, 126.21, 126.01, 125.92, 123.85, 121.36, 119.93, 109.95, 109.90, 107.18, 106.99, 105.55, 105.50, 104.01, 103.95, 96.17, 90.12, 85.56, 85.18, 72.09, 70.85, 67.44, 55.52, 55.45, 55.39, 55.14, 55.06, 54.56, 31.97, 30.74, 29.68, 29.32, 24.38, 24.14, 23.81, 22.69, 21.89, 14.19; HRMS (ESI+): m/z calcd for C$_{47}$H$_{41}$IrNO$_4$ [M − OMs]$^+$ 876.2665, found 876.2656. |

TABLE 3-continued

Physical data of further compounds of Formula (III) prepared according to General Procedure 3:

| Cpd. No. | Structure | Characterization Data |
|---|---|---|
| (III-8) | | Brown solid. $^1$H NMR (400 MHz, CDCl$_3$): δ = 7.86 (d, J = 8.2 Hz, 1H), 7.73 (d, J = 8.2 Hz, 1H), 7.50 (d, J = 9.6 Hz, 2H), 7.42 (t, J = 7.4 Hz, 1H), 7.32 (t, J = 7.4 Hz, 1H), 7.15 (s, 1H), 7.11 (s, 1H), 7.04 (t, J = 7.6 Hz, 1H), 6.98 (t, J = 7.7 Hz, 1H), 6.84 (d, J = 8.4 Hz, 1H), 6.76 (d, J = 8.6 Hz, 1H), 6.41 (d, J = 2.2 Hz, 1H), 5.99 (t, J = 2.6, 1.8 Hz, 1H), 5.24 (s, 1H), 5.15 (s, 1H), 5.02 (s, 1H), 3.93 (s, 3H), 3.92 (s, 3H), 3.46 (s, 3H), 3.27 (s, 3H), 2.93-2.49 (m, 6H), 2.21 (s, 6H), 1.98-1.65 (m, 4H), 0.97 (s, 3H); $^{13}$C NMR (151 MHz, CDCl$_3$) δ = 182.81, 165.10, 162.27, 155.86, 155.52, 155.05, 145.14, 143.27, 140.43, 138.02, 135.89, 133.77, 133.67, 127.59, 127.27, 126.93, 126.81, 126.60, 126.11, 124.69, 124.21, 123.89, 123.67, 121.51, 110.49, 107.36, 105.75, 104.13, 88.16, 84.34, 74.93, 66.95, 59.76, 55.61, 55.55, 54.79, 38.58, 30.92, 29.83, 24.58, 24.05, 22.23, 16.35, 14.36, 14.29; HRMS (ESI+): m/z calcd for C$_{49}$H$_{45}$IrNO$_4$ [M − OMs]$^+$ 904.2978, found 904.2975. |
| (III-10) | | Brown solid. [α]$_D^{25}$ = −55.1 (c = 0.37, CHCl$_3$); IR (neat, cm$^{-1}$); ν$_{max}$ = 2928, 2240, 1729, 1618, 1595, 1561, 1545, 1243, 1227, 1195, 746, 731; $^1$H NMR (400 MHz, CDCl$_3$): δ = 8.04 (d, J = 8.2 Hz, 1H), 7.89 (d, J = 8.8 Hz, 1H), 7.69 (t, J = 8.0 Hz, 2H), 7.62 (d, J = 8.0 Hz, 2H), 7.54 (s, 1H), 7.33-7.17 (m, 4H), 7.11-7.03 (m, 2H), 6.95 (q, J = 7.3 Hz, 2H), 6.73 (d, J = 8.8 Hz, 1H), 6.69 (d, J = 8.4 Hz, 1H), 6.45 (s, 1H), 6.01 (s, 1H), 5.76 (d, J = 8.2 Hz, 1H), 5.56 (s, 1H), 5.19 (s, 1H), 5.03 (s, 1H), 3.95 (s, 3H), 3.84 (s, 3H), 3.34 (s, 3H), 3.29 (d, J = 7.6 Hz, 1H), 2.99-2.63 (m, 4H), 2.51 (d, J = 14.6 Hz, 2H), 2.24 (s, 3H), 1.98-1.86 (m, 1H), 1.86-1.69 (m, 3H); $^{13}$C NMR (151 MHz, CDCl$_3$) δ = 183.64, 165.42, 162.52, 156.00, 155.37, 145.55, 144.53, 140.13, 138.16, 135.81, 133.86, 133.61, 131.69, 131.14, 129.58, 127.77, 127.64, 127.51, 127.26, 127.12, 126.89, 126.84, 126.71, 126.68, 126.09, 125.82, 125.66, 124.33, 123.87, 123.50, 121.67, 121.25, 109.69, 107.49, 105.65, 104.25, 88.53, 84.77, 74.71, 67.03, 55.59, 55.49, 54.90, 38.61, 30.81, 24.53, 24.02, 21.46, 14.29; HRMS (ESI+): m/z calcd for C$_{50}$H$_{41}$IrNO$_3$ [M − OMs]$^+$ 896.2716, found 896.2725. |
| (III-12) | | Brown solid. $^1$H NMR (400 MHz, CDCl$_3$): δ = 7.86 (d, J = 8.3 Hz, 1H), 7.74 (d, J = 8.2 Hz, 1H), 7.59 (br. s, 1H), 7.42 (ddd, J = 8.2, 6.8, 1.2 Hz, 1H), 7.32 (ddd, J = 8.1, 6.7, 1.2 Hz, 1H), 7.14 (d, J = 10.2 Hz, 2H), 7.05 (ddd, J = 8.2, 6.8, 1.3 Hz, 1H), 6.97 (ddd, J = 8.2, 5.9, 1.3 Hz, 1H), 6.90-6.82 (m, 2H), 6.80 (d, J = 8.1 Hz, 1H), 6.76 (d, J = 8.5 Hz, 1H), 6.21 (s, 1H), 5.92 (t, J = 2.4 Hz, 1H), 5.26 (s, 1H), 5.03 (s, 1H), 3.93 (s, 3H), 3.85 (s, 3H), 3.46 (s, 3H), 3.27 (s, 3H), 3.22 (d, J = 14.7 Hz, 1H), 2.92-2.79 (m, 2H), 2.75 (d, J = 13.8 Hz, 1H), 2.69-2.50 (m, 3H), 2.31 (br. s, 3H), 2.22 (s, 3H), 2.00-1.68 (m, 4H), 0.94 (s, 3H); $^{13}$C NMR (151 MHz, CDCl$_3$) δ = 182.77, 161.12, 155.87, 155.58, 154.91, 146.58, 137.73, 137.21, 135.84, 133.70, 133.46, 128.68, 127.53, 127.30, 127.22, 127.14, 126.91, 126.83, 126.42, 126.03, 124.88, 124.07, 123.81, 122.69, 116.94, 105.62, 103.95, 85.60, 59.75, 57.99, 55.66, 54.75, 31.59, 29.16, 25.08, 24.25, 22.00, 16.29, 14.32; HRMS (ESI+): m/z calcd for C$_{49}$H$_{45}$IrNO$_4$ [M − OMs]$^+$ 904.2978, found 904.2976. |
| (III-15) | | Brown solid. $^1$H NMR (400 MHz, CDCl$_3$): δ = 7.73-7.49 (br. m, 2H), 7.48-7.28 (br. m, 3H), 7.14-6.87 (br. m, 2H), 6.76-6.50 (br. m, 2H), 5.73-5.38 (br. m, 0.5H), 5.25-5.04 (br. m, 0.5H), 4.19-3.88 (br. m, 1H), 3.75 (s, 3H), 3.67-3.28 (br. m, 4H), 3.11-2.46 (br. m, 4H), 2.34 (s, 6H), 1.91-1.71 (br. m, 2H), 1.48 (s, 15H); HRMS (ESI+); m/z calcd for C$_{38}$H$_{45}$IrNO$_3$ [M − OMs]$^+$ 756.3029, found 756.3032. |

TABLE 3-continued

Physical data of further compounds of Formula (III) prepared according to General Procedure 3:

| Cpd. No. | Structure | Characterization Data |
| --- | --- | --- |
| (III-16-ent) | | Brown solid. $^1$H NMR (400 MHz, CDCl$_3$) δ = 7.58 (s, 1H), 6.88 (d, J = 8.8 Hz, 1H), 6.83-6.69 (m, 6H), 6.43-6.38 (m, 1H), 5.79 (t, J = 2.3 Hz, 1H), 5.41 (s, 1H), 4.21 (ddd, J = 10.4, 6.8, 3.6 Hz, 1H), 4.01 (dt, J = 10.6, 3.8 Hz, 1H), 3.79-3.71 (m, 5H), 3.69 (s, 3H), 3.63 (s, 3H), 3.58 (s, 3H), 3.43 (s, 3H), 3.12 (s, 3H), 3.07 (d, J = 14.9 Hz, 1H), 2.86-2.72 (m, 2H), 2.67-2.58 (m, 3H), 2.35 (s, 3H), 2.25 (s, 3H), 2.03 (s, 3H), 1.89 (tt, J = 9.0, 4.4 Hz, 1H), 1.80 (d, J = 13.8 Hz, 1H), 1.77-1.70 (m, 2H). HRMS (ESI+); m/z calcd for C$_{45}$H$_{49}$IrNO$_7$ [M − OMs]$^+$ 908.3138, found 908.3136. |
| (III-18) | | Brown solid. [α]$_D^{25}$ = −52.5 (c = 0.34, CHCl$_3$); IR (neat, cm$^{-1}$); v$_{max}$ = 2931, 1618, 1596, 1560, 1450, 1226, 749; $^1$H NMR (400 MHz, CDCl$_3$): δ = 7.85 (d, J = 8.2 Hz, 1H), 7.73 (d, J = 8.2 Hz, 1H), 7.59 (s, 1H), 7.41 (ddd, J = 8.1, 6.8, 1.2 Hz, 1H), 7.31 (ddd, J = 8.2, 6.8, 1.2 Hz, 1H), 7.14 (d, J = 2.8 Hz, 2H), 7.04 (ddd, J = 8.2, 6.7, 1.2 Hz, 1H), 6.96 (ddd, J = 8.3, 6.8, 1.3 Hz, 1H), 6.85 (t, J = 7.4 Hz, 2H), 6.74 (t, J = 8.4 Hz, 2H), 6.40 (s, 1H), 5.88 (s, 1H), 5.29 (s, 1H), 5.08 (s, 1H), 4.27-4.19 (m, 1H), 4.04-3.97 (m, 1H), 3.93 (s, 4H), 3.83-3.70 (m, 2H), 3.44 (s, 3H), 3.42 (s, 3H), 3.31 (s, 3H), 3.25 (d, J = 14.8 Hz, 1H), 3.10 (dt, J = 16.1, 8.2 Hz, 1H), 2.88 (dt, J = 15.3, 4.4 Hz, 1H), 2.74 (d, J = 13.7 Hz, 1H), 2.70-2.64 (m, 2H), 2.37 (s, 2H), 2.23 (s, 4H), 1.95-1.87 (m, 1H), 1.84 (d, J = 13.7 Hz, 1H), 1.77 (d, J = 14.8 Hz, 1H), 1.74-1.61 (m, 1H), 0.95 (s, 3H); $^{13}$C NMR (151 MHz, CDCl$_3$) mixture of (III)-18 and aqua-(III)-18 δ = 189.78, 187.51, 160.30, 159.90, 155.97, 155.63, 155.59, 155.31, 155.11, 154.89, 150.59, 149.49, 145.21, 144.27, 138.56, 137.92, 137.67, 137.26, 136.10, 135.87, 133.75, 133.73, 133.61, 133.53, 132.29, 131.54, 129.27, 128.96, 128.12, 127.75, 127.66, 127.54, 127.52, 127.39, 127.27, 127.23, 127.17, 126.94, 126.90, 126.87, 126.81, 126.78, 126.48, 126.31, 126.05, 126.00, 125.65, 125.34, 124.80, 124.46, 124.15, 123.99, 123.82, 122.04, 121.61, 117.35, 114.57, 105.67, 105.62, 104.50, 104.29, 89.39, 86.33, 84.32, 83.84, 73.18, 72.63, 71.95, 71.86, 69.68, 67.97, 59.75, 59.13, 59.02, 55.65, 55.59, 55.10, 55.01, 31.84, 31.66, 30.97, 30.89, 30.45, 25.75, 25.57, 25.11, 25.02, 23.17, 22.84, 22.52, 21.89, 16.42, 16.33, 14.39, 14.34; HRMS (ESI+); m/z calcd for C$_{52}$H$_{51}$IrNO$_5$ [M − OMs]$^+$ 962.3396, found 962.3401 |
| (III-19) | | Brown solid. [α]$_D^{25}$ = −146.7 (c = 0.30, CHCl$_3$); IR (neat, cm$^{-1}$); v$_{max}$ = 2932, 1730, 1598, 1560, 1245; $^1$H NMR (400 MHz, CDCl$_3$) (complex mixture of 4 different species): δ = 8.05 (d, J = 7.5 Hz, 1H), 8.01 (d, J = 7.5 Hz, 1H), 7.90-7.79 (m, 1H), 7.73 (d, J = 8.2 Hz, 1H), 7.48-7.27 (m, 2H), 7.22 (t, J = 5.0 Hz, 1H), 7.15 (d, J = 3.9 Hz, 1H), 7.11 (dd, J = 10.2, 7.9 Hz, 1H), 7.08-6.93 (m, 3H), 6.90 (d, J = 8.6 Hz, 1H), 6.87-6.79 (m, 1H), 6.79-6.69 (m, 1H), 6.61-6.50 (m, 1H), 6.47 (s, 1H), 6.37 (s, 1H), 6.34 (s, 1H), 6.27 (s, 1H), 6.20-6.09 (m, 1H), 6.00 (t, J = 2.4 Hz, 1H), 5.99-5.96 (m, 1H), 5.95-5.89 (m, 1H), 5.54-5.50 (m, 1H), 5.49-5.45 (m, 1H), 5.45-5.42 (m, 1H), 5.39-5.34 (m, 1H), 5.01 (s, 1H), 4.97 (s, 1H), 4.94 (s, 1H), 4.69 (s, 1H), 4.38-4.19 (m, 1H), 4.19-4.03 (m, 1H), 4.03-3.84 (m, 3H), 3.80-3.58 (m, 3H), 3.49-3.44 (m, 3H), 3.44-3.39 (m, 3H), 3.34 (d, J = 5.4 Hz, 1H), 3.11-3.05 (m, 2H), 2.87-2.70 (m, 1H), 2.64-2.50 (m, 1H), 2.26-1.86 (m, 4H), 0.88 (td, J = 7.0, 5.9, 3.0 Hz, 3H); HRMS (ESI+): m/z calcd for C$_{50}$H$_{47}$IrNO$_6$ [M − OMs]$^+$ 950.3033, found 950.3025. |

TABLE 3-continued

Physical data of further compounds of Formula (III) prepared according to General Procedure 3:

| Cpd. No. | Structure | Characterization Data |
|---|---|---|
| (III-22-ent) | | Brown solid. ¹H NMR (400 MHz, CDCl₃) (mixture of (III)-21: aqua-(III)-21 in a 0.8:0.2 ratio) (only peaks corresponding to (III)-21 are shown unless otherwise stated) δ = 7.95 (d, J = 8.9 Hz, 2H), 7.79 (d, J = 8.1 Hz, 1H), 7.74 (s, 1H), 7.46 (ddd, J = 8.0, 6.8, 1.1 Hz, 1H), 7.32 (ddd, J = 8.1, 6.8, 1.1 Hz, 1H), 7.27-7.21 (m, 3H), 7.18-7.12 (m, 4H), 7.08-7.01 (m, 3H), 6.94 (d, J = 8.1 Hz, 1H), 6.75 (dd, J = 8.2, 2.8 Hz, 2H), 6.49 (d, J = 8.5 Hz, 1H), 6.13 (d, J = 2.7 Hz, 1H), 6.07 (d, J = 8.2 Hz, 2H), 5.62 (d, J = 2.6 Hz, 1H), 5.46 (t, J = 2.2 Hz, 1H), 4.92 (t, J = 2.3 Hz, 0.2H, aqua-(III)-22), 4.69 (s, 1H), 4.21-4.10 (m, 1H), 4.01-3.94 (m, 4H), 3.78-3.58 (m, 5H), 3.34 (s, 3H), 3.31 (s, 3H), 2.96-2.86 (m, 2H), 2.79-2.71 (m, 1H), 2.64-2.45 (m, 2H), 2.17 (s, 3H), 2.15-2.06 (m, 2H), 2.00 (s, 3H), 1.92-1.59 (m, 2H), 1.03 (s, 3H). HRMS (ESI+): m/z calcd for C₆₃H₅₇IrNO₅ [M − OMs]⁺ 1100.3866, found 1100.3875. |
| (III-23-ent) | | Brown solid. ¹H NMR (400 MHz, CDCl₃) shows a complex mixture of different isomers/species. HRMS (ESI+): m/z calcd for C₆₉H₅₇IrNO₃ [M − OMs]⁺ 1140.3968, found 1140.3962. |
| (III-24-ent) | | Brown solid. [α]_D²⁵ = −69.7 (c = 0.50, CHCl₃); ¹H NMR (400 MHz, CDCl₃) δ = 8.01-7.95 (m, 2H), 7.85-7.76 (m, 3H), 7.56-7.45 (m, 5H), 7.39-7.28 (m, 4H), 7.24-7.14 (m, 4H), 7.11-7.04 (m, 2H), 6.94 (d, J = 8.2 Hz, 1H), 6.82 (d, J = 8.6 Hz, 1H), 6.71 (d, J = 8.2 Hz, 1H), 6.62-6.55 (m, 1H), 6.53 (d, J = 8.5 Hz, 1H), 6.21 (t, J = 1.7 Hz, 1H), 5.60-5.55 (m, 2H), 4.58 (d, J = 10.2 Hz, 1H), 4.51 (d, J = 1.9 Hz, 1H), 3.71 (s, 3H), 3.40-3.32 (m, 4H), 2.93 (d, J = 16.0 Hz, 1H), 2.85 (d, J = 13.6 Hz, 1H), 2.80-2.71 (m, 1H), 2.66-2.45 (m, 2H), 2.35-2.21 (m, 1H), 2.15 (s, 3H), 2.01 (s, 3H), 1.88-1.62 (m, 2H), 1.04 (s, 3H). HRMS (ESI+): m/z calcd for C₆₁H₅₁IrNO₄ [M − OMs]⁺ 1054.3447, found 1054.3443. |

Example 7: General Procedure 4: Synthesis of Oxime Ether Substrates (I)

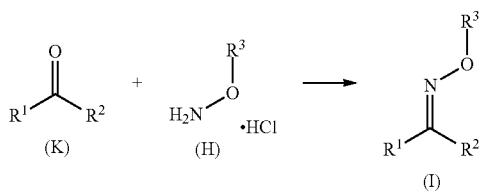

In a Teflon-capped sealed tube, the alkoxylammonium chloride (H) (1.2 to 3.0 eq) was added to a solution of the ketone (K) (1.0 eq) in EtOH (0.3 M). Water (0.33 v/v) was added and the mixture was stirred at room temperature for 5 min. Sodium acetate (1.5 to 4.0 eq) was added portionwise and the reaction mixture was stirred at 70° C. for 16 h. After cooling to room temperature, the reaction mixture was partitioned between $CH_2Cl_2$ and water. The aqueous phase was extracted twice with $CH_2Cl_2$. The combined organic phase was washed with brine, dried over $Na_2SO_4$, filtered and the solvent was removed under reduced pressure. The crude product (typically a mixture of E/Z diastereoisomers) was purified by flash column chromatography to afford the desired E or Z oxime ether product.

Example 8: General Procedure 5: Synthesis of 4-substituted-1H-2,3-benzoxazines (I-31) and (I-32) via Cyclodehydration of N-(benzyloxy)carboxamides (XV-31) and (XV-32)

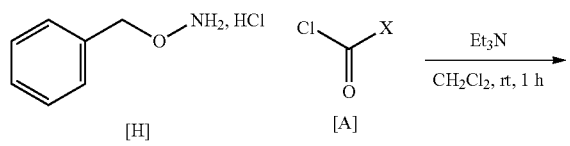

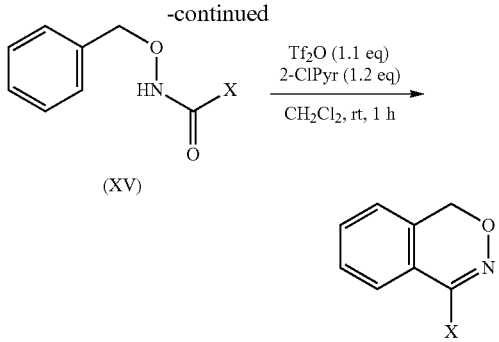

X = cHex: (I)-31, 60%
X = Ph: (I)-32, 65%

Step 1: In a round-bottom flask, the corresponding acyl chloride [A] (1.1 eq.) was added dropwise to a solution of O-benzylhydroxylamine hydrochloride [H] (1.0 eq.) and trimethylamine (2.2 eq.) in dichloromethane (0.2 M) at 0° C. The reaction mixture was stirred for 1 h at room temperature. The reaction mixture was washed with $H_2O$, dried over $Na_2SO_4$, filtered, and the solvent removed under reduced pressure to afford the crude product. Filtration through a short silica plug, eluting with pent:EtOAc 50:50 afforded the pure N-(benzyloxy)carboxamide product (XV) in a quantitative yield (XV-31; *Synth. Commun.* 2005, 731) (XV-32; *Bioorg. Med. Chem. Lett.* 2015, 4933).

Step 2: In a flame-dried Schlenk tube, under a nitrogen atmosphere, trifluoromethanesulfonic anhydride (1.1 eq.) was added dropwise to a stirred mixture of the corresponding N-(benzyloxy)carboxamide (XV) (1.0 eq.) and 2-chloropyridine (1.2 eq.) in dichloromethane (0.25 M) at −78° C. After 5 min, the reaction mixture was placed in an ice-water bath and warmed to 0° C. After 15 min, the reaction mixture was stirred at room temperature for further 2 h. The reaction was quenched with $NaHCO_3$ (sat., aq.). The aqueous phase was extracted twice in $CH_2Cl_2$, the combined organic layers were dried over $Na_2SO_4$, filtered and the solvent removed under reduced pressure to afford the crude product. Purification by flash column chromatography ($SiO_2$, pent:EtOAc 99:1 to 90:10) afforded the pure product (I-31, 60% yield; I-32, 65% yield). Experimental data of compounds (I-31) and (I-32) included in Table 4.

TABLE 4

Physical data of compounds (I) prepared according to the General Procedure 4:

| Cpd. No. | Structure | Characterization Data |
|---|---|---|
| (E-I-1) | ![structure] | The analytical data are in accordance with WO2013/127764 A1. Colourless solid. $^1$H NMR (400 MHz, $CDCl_3$) δ = 7.33 (s, 2H), 3.79 (s, 2H), 3.78 (s, 3H), 1.80 (s, 3H). $^{13}$C NMR (101 MHz, $CDCl_3$) δ = 153.09, 136.79, 133.27, 132.18, 128.24, 61.59, 36.96, 13.86. |

TABLE 4-continued

Physical data of compounds (I) prepared according to the General Procedure 4:

| Cpd. No. | Structure | Characterization Data |
|---|---|---|
| (Z-I-1) | | The analytical data are in accordance with WO2013/127764 A1. Pale yellow solid. $^1$H NMR (400 MHz, CDCl$_3$) δ = 7.35 (s, 2H), 4.00 (s, 2H), 3.90 (s, 3H), 1.60 (s, 3H). |
| (E-I-2) | | Colourless solid. $^1$H NMR (400 MHz, CDCl$_3$) δ = 8.19 (s, 1H), 7.33 (s, 2H), 3.78 (s, 2H), 1.91 (s, 3H); $^{13}$C NMR (101 MHz, CDCl$_3$) δ = 154.43, 136.54, 133.45, 131.95, 128.26, 36.98, 13.88. |
| (E-I-3) | | Pale yellow oil. IR (neat, cm−1): ν$_{max}$ = 2923, 1581, 1548, 1453, 1439, 1369, 1018, 854, 696; $^1$H NMR (400 MHz, CDCl$_3$) (E isomer): δ = 7.36-7.26 (m, 7H), 5.01 (s, 2H), 3.79 (s, 2H), 1.85 (s, 3H); $^{13}$C NMR (101 MHz, CDCl$_3$) δ = 153.57, 138.35, 136.77, 133.19, 132.26, 128.30, 128.15, 127.71, 75.74, 37.02, 14.30; HRMS (EI+): m/z calcd for C16H15Cl3NO [M + H]+ 342.0214, found 342.0211. |
| (E-I-4) | | Colourless oil. $^1$H NMR (400 MHz, CDCl$_3$) δ = 7.31 (s, 2H), 3.76 (s, 2H), 1.83 (s, 3H), 1.15 (s, 9H); $^{13}$C NMR (101 MHz, CDCl$_3$) δ = 150.71, 136.64, 133.04, 132.78, 127.91, 78.05, 37.37, 27.64, 14.10. |
| (E-I-5) | | Colourless oil. $^1$H NMR (400 MHz, CDCl$_3$) δ = 7.32 (s, 2H), 5.10 (t, J = 4.3 Hz, 1H), 4.01 (d, J = 4.3 Hz, 2H), 3.99-3.85 (m, 4H), 3.78 (s, 2H), 1.86 (s, 3H); $^{13}$C NMR (101 MHz, CDCl$_3$) δ = 154.08, 136.74, 133.29, 132.05, 128.21, 102.14, 74.26, 65.18, 36.93, 14.24. |
| (E-I-6) | | The analytical data are in accordance with Chem. Commun., 2017, 53, 12189. Colourless liquid. $^1$H NMR (400 MHz, CDCl$_3$) δ = 7.17-7.10 (m, 2H), 6.87-6.81 (m, 2H), 3.88 (s, 3H), 3.79 (s, 3H), 3.40 (s, 2H), 1.72 (s, 3H). |

TABLE 4-continued

*Physical data of compounds (I) prepared according to the General Procedure 4:*

| Cpd. No. | Structure | Characterization Data |
|---|---|---|
| (E-I-7) | | Colourless oil. $^1$H NMR (400 MHz, CDCl$_3$) δ = 7.60-7.53 (m, 1H), 7.30-7.22 (m, 2H), 7.13-7.07 (m, 1H), 3.89 (s, 3H), 3.67 (s, 2H), 1.78 (s, 3H). $^{13}$C NMR (101 MHz, CDCl$_3$) δ = 155.75, 136.78, 133.06, 130.76, 128.50, 127.69, 125.13, 61.52, 41.58, 13.87. |
| (Z-I-7) | | Colourless oil. $^1$H NMR (400 MHz, CDCl$_3$) δ = 7.56 (dd, J = 7.9, 1.3 Hz, 1H), 7.29-7.22 (m, 1H), 7.19 (dd, J = 7.7, 1.9 Hz, 1H), 7.11 (td, J = 7.7, 1.9 Hz, 1H), 3.89 (s, 3H), 3.84 (s, 2H), 1.75 (s, 3H). $^{13}$C NMR (101 MHz, CDCl$_3$) δ = 155.16, 136.52, 132.96, 130.79, 128.39, 127.77, 125.15, 61.48, 35.78, 19.73. |
| (E-I-8) | | Colourless oil. $^1$H NMR (400 MHz, CDCl$_3$) δ = 6.85 (s, 2H), 3.84 (s, 3H), 3.53 (s, 2H), 2.29 (s, 6H), 2.26 (s, 3H), 1.67 (s, 3H); $^{13}$C NMR (101 MHz, CDCl$_3$) δ = 156.11, 137.45, 136.15, 130.56, 129.21, 61.40, 35.47, 20.99, 20.47, 13.06. |
| (I-9) | | Colourless oil. $^1$H NMR (400 MHz, CDCl$_3$) (mixture of E:Z isomers in a 0.7:0.3 ratio) δ = 7.41-7.15 (m, 10H, E + Z), 5.99 (s, 0.3H, Z), 5.08 (s, 0.7H, E), 3.93 (s, 2.1H, E), 3.89 (s, 0.9H, Z), 1.88 (s, 2.1H, E), 1.80 (s, 0.9H, Z). $^{13}$C NMR (101 MHz, CDCl$_3$) (mixture of E:Z isomers in a 0.7:0.3 ratio) δ = 158.10 (E), 157.30 (Z), 140.54 (E), 140.34 (Z), 129.22 (Z), 129.18 (E), 128.56 (Z), 128.51 (E), 126.88 (E), 126.80 (Z), 61.60 (E), 61.56 (Z), 56.82 (E), 49.25 (Z), 19.04 (Z), 13.88 (E). |
| (E-I-10) | | Colourless oil. $^1$H NMR (400 MHz, CDCl$_3$) δ = 7.35-7.27 (m, 4H), 7.25-7.18 (m, 1H), 3.93 (s, 3H), 1.56 (s, 3H), 1.48 (s, 6H); $^{13}$C NMR (101 MHz, CDCl$_3$) δ = 162.09, 146.64, 128.48, 126.37, 126.22, 61.50, 45.31, 26.98, 12.46. |
| (E-I-11) | | Compound described in *Chem. Commun.* 2007, 1530; no characterization data given. Colourless liquid. $^1$H NMR (400 MHz, CDCl$_3$) δ = 3.81 (s, 3H), 2.20-2.09 (m, 1H), 1.84-1.62 (m, 7H), 1.38-1.09 (m, 6H); $^{13}$C NMR (101 MHz, CDCl$_3$) δ = 161.164, 61.13, 44.61, 30.28, 26.17, 26.15, 11.74. |

TABLE 4-continued

*Physical data of compounds (I) prepared according to the General Procedure 4:*

| Cpd. No. | Structure | Characterization Data |
|---|---|---|
| (E-I-12) | [Structure: cyclohexyl-C(CH₃)=N-O-CH₂-Ph] | The analytical data are in accordance with *J. Am. Chem. Soc.* 1996, 118, 5138. |
| (E-I-13) | [Structure: (H₃C)₃C-C(CH₃)=N-O-CH₃] | The analytical data are in accordance with *J. Chem. Soc., Perkin Trans.* 1, 2000, 3250. |
| (E-I-14) | [Structure: 1-adamantyl-C(CH₃)=N-O-CH₃] | Compound described in *Chem. Commun.* 2007, 1530; no experimental data given. Colourless liquid. $^1$H NMR (400 MHz, CDCl$_3$) δ = 3.82 (s, 3H), 2.05-1.98 (m, 3H), 1.78-1.63 (m, 15H); $^{13}$C NMR (101 MHz, CDCl$_3$) δ = 163.79, 61.16, 39.62, 38.99, 36.96, 28.35, 9.59. |
| (Z-I-15) | [Structure: 1-adamantyl-C(CH₂OH)=N-O-CH₃] | Colourless solid; m.p. = 71-73° C. $^1$H NMR (400 MHz, CDCl$_3$) δ = 4.18 (d, J = 7.0 Hz, 2H), 3.88 (s, 3H), 3.12 (t, J = 7.0 Hz, 1H), 2.06-1.99 (m, 3H), 1.79-1.62 (m, 12H). $^{13}$C NMR (101 MHz, CDCl$_3$) δ = 165.92, 61.78, 56.03, 38.92, 38.49, 36.73, 28.03. |
| (Z-I-16) | [Structure: 1-adamantyl-C(CH₂OTs)=N-O-CH₃] | Colourless solid; m.p. = 80-82° C. $^1$H NMR (400 MHz, CDCl$_3$) δ = 7.84-7.78 (m, 2H), 7.35 (d, J = 8.0 Hz, 2H), 4.58 (s, 2H), 3.67 (s, 3H), 2.46 (s, 3H), 2.03-1.95 (m, 3H), 1.76-1.58 (m, 12H). $^{13}$C NMR (101 MHz, CDCl$_3$) δ = 157.57, 144.92, 132.75, 129.73, 128.42, 61.72, 58.47, 39.32, 38.69, 36.60, 28.08, 21.81. |
| (E-I-17) | [Structure: 4-MeO-C₆H₄-C(CH₃)=N-O-CH₃] | The analytical data are in accordance with *J. Org. Chem.* 2006, 71, 3998. |

TABLE 4-continued

Physical data of compounds (I) prepared according to the General Procedure 4:

| Cpd. No. | Structure | Characterization Data |
|---|---|---|
| (I-18) | | 50:50 E:Z mixture.<br>The analytical data are in accordance with *Org. Lett.* 2018, 20, 4994-4997 and *ACS Catal.* 2016, 6, 3890-3894. |
| (E-I-19) | | Colourless oil; $^1$H NMR (400 MHz, CDCl$_3$) δ = 7.31 (dd, J = 8.9, 2.7 Hz, 2H), 6.87 (dd, J = 8.9, 2.7 Hz, 2H), 3.91 (s, 3H), 3.81 (s, 3H), 3.19 (tt, J = 12.2, 3.1 Hz, 1H), 1.81-1.62 (m, 5H), 1.47 (qd, J = 11.8, 2.5 Hz, 2H), 1.33 (qt, J = 12.4, 3.0 Hz, 2H), 1.16 (qt, J = 12.9, 3.0 Hz, 1H); $^{13}$C NMR (101 MHz, CDCl$_3$) δ = 163.82, 159.87, 129.42, 128.82, 113.62, 61.75, 55.42, 39.01, 29.61, 26.51, 26.18. |
| (Z-I-19) | | Colourless solid; $^1$H NMR (400 MHz, CDCl$_3$) δ = 7.22-7.15 (m, 2H), 6.95-6.87 (m, 2H), 3.82 (s, 3H), 3.80 (d, J = 1.1 Hz, 3H), 2.44 (tt, J = 11.3, 2.6 Hz, 1H), 1.89-1.70 (m, 4H), 1.70-1.60 (m, 1H), 1.38-1.06 (m, 5H); $^{13}$C NMR (101 MHz, CDCl$_3$) δ 161.93, 159.42, 129.09, 126.74, 113.58, 61.65, 55.32, 44.46, 30.94, 26.39, 26.19. |
| (I-20) | | 45:55 E:Z mixture. Colourless liquid; $^1$H NMR (400 MHz, CDCl$_3$) (mixture of E:Z isomers in a 0.45:0.55 ratio) δ = 7.42-7.30 (m, 4H, E + Z), 7.22-7.17 (m, 1H, E + Z), 3.94 (s, 1.35H, E), 3.80 (s, 1.65H, Z), 3.23 (tt, J = 12.2, 3.2 Hz, 0.45H, E), 2.46 (ddq, J = 11.3, 7.7, 3.3 Hz, 0.55H), 1.92-1.60 (m, 5H, E + Z), 1.54-1.07 (m, 5H, E + Z); $^{13}$C NMR (101 MHz, CDCl$_3$) (mixture of E:Z isomers in a 0.45:0.55 ratio) δ = 164.20 (E), 162.48 (Z), 136.27, 134.67, 128.42, 128.19, 128.16, 128.12, 127.53, 61.82, 61.68, 44.38, 38.85, 30.77, 29.56, 26.44, 26.30, 26.12. |
| (I-21) | | 50:50 E:Z mixture.<br>(E-isomer): colourless liquid; $^1$H NMR (400 MHz, CDCl$_3$) δ = 7.30 (ddd, J = 8.2, 7.4, 1.8 Hz, 1H), 7.09 (dd, J = 7.4, 1.8 Hz, 1H), 6.93 (td, J = 7.4, 1.0 Hz, 1H), 6.88 (dd, J = 8.3, 1.0 Hz, 1H), 3.92 (s, 3H), 3.80 (s, 3H), 3.12 (tt, J = 11.6, 3.4 Hz, 1H), 1.88-1.77 (m, 2H), 1.74-1.58 (m, 2H), 1.38-1.14 (m, 5H), 1.08 (at, J = 12.9, 3.5 Hz, 1H); $^{13}$C NMR (101 MHz, CDCl$_3$) δ = 163.70, 157.62, 130.65, 129.76, 125.40, 120.36, 110.90, 61.74, 55.43, 39.31, 28.91, 26.34, 26.21.<br>(Z-isomer): colourless liquid; $^1$H NMR (400 MHz, CDCl$_3$) δ = 7.34-7.27 (m, 1H), 7.01-6.91 (m, 3H), 3.80 (s, 3H), 3.78 (s, 3H), 2.43 (tt, J= 11.4, 3.4 Hz, 1H), 1.93-1.81 (m, 2H), 1.81-1.67 (m, 2H), 1.67-1.59 (m, 1H), 1.36-1.06 (m, 5H); $^{13}$C NMR (101 MHz, CDCl$_3$) δ = 160.90, 155.87, 129.42, 128.55, 124.38, 120.32, 111.23, 61.67, 55.82, 44.16, 30.46, 26.35, 26.18. |
| (I-22) | | Compound described in U.S. Pat. No. 5,354,865; no characterization data given, 40:60 E:Z mixture.<br>Pale yellow solid; $^1$H NMR (400 MHz, CDCl$_3$) (mixture of E:Z isomers in a 0.4:0.6 ratio) δ = 7.92-7.81 (m, 4H, E + Z), 7.59-7.45 (m, 3H, E + Z), 7.36-7.26 (m, 1H, E + Z), 7.05-6.94 (m, 2H, E + Z), 6.88-6.77 (m, 1H, E + Z), 5.25 (s, 0.8H, E), 5.24 (s, 1.2H, Z), 3.98-3.88 (m, 3.2H, E + Z), 3.80 (s, 1.8H, Z), 3.49-3.29 (m, 2.4H, E + Z), 2.64 (tt, J = 8.7, 5.9 Hz, 0.6H, Z), 1.86 (dtd, J = 13.4, 12.2, 4.5 Hz, 1H, E + Z), 1.70-1.54 (m, 3H, E + Z); $^{13}$C NMR (101 MHz, CDCl$_3$) (E + Z isomers) δ = 161.83, 160.04, 158.65, 158.58, 136.93, 135.21, 134.43, 134.37, 133.42, 133.39, 133.20, 129.51, 128.57, 128.06, 128.04, 127.86, 126.56, 126.49, 126.42, 126.39, 126.27, 126.23, 125.40, 125.37, 120.80, 120.17, 115.25, 114.97, 114.95, 114.50, 70.36, 70.33, 68.04, 67.81, 62.01, 61.91, 41.29, 36.13, 30.38, 29.07. |

TABLE 4-continued

Physical data of compounds (I) prepared according to the General Procedure 4:

| Cpd. No. | Structure | Characterization Data |
|---|---|---|
| (I-23) | | Compound described in *Bioorg. Med. Chem. Lett.* 2007 3894; no characterization data given. 50:50 E:Z mixture.<br>Colourless oil; $^1$H NMR (400 MHz, CDCl$_3$) (mixture of E:Z isomers in a 1:1 ratio) δ = 7.70-7.57 (m, 4H), 7.53-7.44 (m, 2H), 7.34-7.27 (m, 2H), 3.95 (s, 3H), 3.79 (s, 3H), 3.23 (tt, J = 12.1, 3.1 Hz, 1H, E), 2.46 (tq, J = 11.6, 3.3 Hz, 1H, Z), 1.90-1.62 (m, 10H), 1.51-1.06 (m, 10H); $^{19}$F NMR (376 MHz, CDCl$_3$) δ = −62.73, −62.74; $^{13}$C NMR (101 MHz, CDCl$_3$) (E + Z isomers) δ = 162.93, 161.24, 139.90, 138.38, 131.03, 130.71, 130.42, 130.38, 130.10, 129.77, 128.58, 128.25, 128.20, 128.04, 125.23, 125.19, 125.15, 125.11, 122.84, 122.79, 120.14, 120.08, 62.07, 61.84, 44.19, 38.74, 30.67, 29.53, 26.39, 26.21, 26.07, 26.04. |
| (I-24) | | 50:50 E:Z mixture.<br>Colourless oil; $^1$H NMR (400 MHz, CDCl$_3$) (mixture of E:Z isomers in a 1:1 ratio) δ = 7.48-7.33 (m, 6H), 7.23-7.17 (m, 2H), 6.74 (dd, J = 17.6, 10.9 Hz, 2H), 5.79 (ddd, J = 17.6, 1.8, 0.9 Hz, 2H), 5.29 (ddd, J = 10.9, 1.7, 0.9 Hz, 2H), 3.96 (s, 3H), 3.82 (s, 3H), 3.23 (tt, J = 12.3, 3.1 Hz, 1H), 2.48 (tt, J = 11.2, 3.3 Hz, 1H), 1.93-1.63 (m, 10H), 1.57-1.08 (m, 10H); $^{13}$C NMR (101 MHz, CDCl$_3$) (E + Z isomers) δ = 163.82, 162.19, 137.71, 137.50, 136.54, 136.51, 135.70, 134.03, 128.34, 127.85, 126.01, 125.98, 114.52, 114.45, 61.86, 61.72, 44.33, 38.90, 30.80, 29.55, 26.47, 26.31, 26.15, 26.13. |
| (I-25) | | 60:40 E:Z mixture.<br>Pale yellow oil; $^1$H NMR (400 MHz, CDCl$_3$) (mixture of E:Z isomers in a 0.6:0.4 ratio) δ = 8.28 (t, J = 2.0 Hz, 0.6H, E), 8.21-8.12 (m, 1.4H, E + Z), 7.77 (dt, J = 7.8, 1.3 Hz, 0.6H, E), 7.59 (dt, J = 7.7, 1.4 Hz, 0.4H), 7.56-7.45 (m, 1H, E + Z), 3.15 (tt, J = 12.2, 3.3 Hz, 0.6H, E), 2.52 (tt, J = 10.9, 3.4 Hz, 0.4H, Z), 1.90-1.54 (m, 5H, E + Z), 1.42-1.10 (m, 14H, E + Z). $^{13}$C NMR (101 MHz, CDCl$_3$) (E + Z isomers) δ = 159.29 (E), 157.12 (Z), 148.12, 148.05, 139.32, 136.71, 134.54, 133.97, 129.00, 128.83, 123.29, 122.92, 122.87, 122.82, 79.10, 78.85, 44.01, 39.26, 30.90, 29.27, 27.68, 27.53, 26.61, 26.23, 26.20. |
| (I-26) | | 55:45 E:Z mixture.<br>Yellow oil; $^1$H NMR (400 MHz, CDCl$_3$) (mixture of E:Z isomers in a 0.55:0.45 ratio) δ = 7.40-7.35 (m, 1.1H, E), 7.24-7.17 (m, 0.9H, Z), 7.06-7.02 (m, 0.9H, Z), 7.02-6.98 (m, 1.1H, E), 3.93 (s, 1.65H, E), 3.79 (s, 1.35H, Z), 3.19 (tt, J = 12.2, 3.1 Hz, 0.55H, E), 2.50-2.37 (m, 0.45H, Z), 1.89-1.61 (m, 5H, E + Z), 1.52-1.07 (m, 5H, E + Z). $^{13}$C NMR (101 MHz, CDCl$_3$) (E + Z isomers) δ = 163.21 (E), 161.40 (Z), 140.27, 139.95, 133.05, 131.15, 129.66, 129.28, 118.83, 118.79, 61.90, 61.75, 44.29, 38.87, 30.81, 29.55, 26.44, 26.29, 26.12. |
| (I-27) | | 50:50 E:Z mixture.<br>Colourless oil; $^1$H NMR (600 MHz, CDCl$_3$) (mixture of E:Z isomers in a 1:1 ratio) δ = 7.85-7.80 (m, 2H), 7.80-7.75 (m, 2H), 7.37-7.33 (m, 2H), 7.20-7.15 (m, 2H), 3.93 (s, 3H), 3.77 (s, 3H), 3.20 (tt, J = 12.3, 3.2 Hz, 1H, E), 2.44 (tq, J = 11.1, 3.4 Hz, 1H, Z), 1.89-1.61 (m, 10H), 1.49-1.05 (m, 34H). $^{13}$C NMR (101 MHz, CDCl$_3$) (E + Z isomers) δ = 164.10 (E), 162.63 (Z), 138.98, 137.61, 134.58, 134.53, 127.47, 126.82, 83.97, 61.87, 61.70, 44.29, 38.82, 30.71, 29.54, 26.44, 26.26, 26.13, 26.09, 25.01, 24.99. |

TABLE 4-continued

Physical data of compounds (I) prepared according to the General Procedure 4:

| Cpd. No. | Structure | Characterization Data |
|---|---|---|
| (I-28) | | 45:55 E:Z mixture.<br>Colourless oil; $^1$H NMR (400 MHz, CDCl$_3$) (mixture of E:Z isomers in a 0.45:0.55 ratio) δ = 7.49 (ddd, J = 7.7, 4.6, 1.1 Hz, 1H, E + Z), 7.28-7.23 (m, 0.55H, Z), 7.20 (dd, J = 3.7, 1.0 Hz, 0.45H, E), 7.08 (dd, J = 5.2, 3.9 Hz, 0.55H, Z), 7.00 (dd, J = 5.1, 3.7 Hz, 0.45H, E), 4.02 (s, 1.65H, Z), 3.94 (s, 1.35H, E), 3.54 (p, J = 9.1 Hz, 0.45H, E), 3.27 (p, J = 8.0 Hz, 0.55H, Z), 2.05-1.58 (m, 8H). $^{13}$C NMR (101 MHz, CDCl$_3$) (E + Z isomers) δ = 157.56 (E), 151.76 (Z), 139.28, 133.05, 129.83, 129.24, 127.03, 126.49, 126.28, 125.58, 62.10, 61.88, 43.69, 38.72, 31.43, 30.07, 26.75, 25.49. |
| (I-29) | | 60:40 E:Z mixture.<br>Colourless solid; $^1$H NMR (400 MHz, CDCl$_3$) (mixture of E:Z isomers in a 0.60:0.40 ratio) δ = 7.92-7.83 (m, 2.4H, E + Z), 7.65-7.57 (m, 1H, E + Z), 7.51 (tt, J = 8.2, 1.3 Hz, 2H, E + Z), 7.31 (t, J = 1.9 Hz, 0.6H, E), 7.13 (dd, J = 3.4, 2.3 Hz, 0.4H, Z), 7.11 (dd, J = 3.3, 2.2 Hz, 0.6H, E), 6.56 (dd, J = 3.4, 1.6 Hz, 0.4H, Z), 6.50 (dd, J = 3.3, 1.6 Hz, 0.6H, E), 3.93 (s, 1.2H, Z), 3.87 (s, 1.8H, E), 3.06 (tt, J = 11.9, 3.7 Hz, 0.6H, E), 2.45 (tt, J = 11.5, 3.1 Hz, 0.4H, Z), 1.90-1.51 (m, 6H, E + Z), 1.46-1.14 (m, 4H, E + Z). $^{13}$C NMR (101 MHz, CDCl$_3$) (E + Z isomers) δ = 157.52 (E), 152.93 (Z), 138.90, 138.81, 134.22, 134.15, 129.63, 129.60, 127.11, 127.07, 124.63, 124.05, 121.00, 119.99, 119.96, 119.30, 114.24, 113.68, 62.04, 61.89, 42.63, 38.78, 31.75, 29.28, 26.72, 26.51, 26.30, 26.12. |
| (Z-I-30) | | The analytical data are in accordance with *Tetrahedron* 2004, 60, 3893. |
| (I-31) | | Synthesized according to General Procedure 5.<br>Colourless oil; $^1$H NMR (400 MHz, CDCl$_3$) δ = 7.49-7.36 (m, 3H), 7.18-7.12 (m, 1H), 4.84 (s, 2H), 2.88 (tt, J = 11.5, 3.2 Hz, 1H), 2.05-1.93 (m, 2H), 1.91-1.80 (m, 2H), 1.80-1.70 (m, 1H), 1.59-1.21 (m, 5H). $^{13}$C NMR (101 MHz, CDCl$_3$) δ = 163.36, 133.12, 131.53, 128.42, 124.51, 123.19, 122.45, 66.69, 39.49, 31.22, 26.58, 26.30. |
| (I-32) | | Synthesized according to General Procedure 5.<br>The analytical data are in accordance with *Org. Biomol. Chem.*, 2018, 16, 6284. |
| (E-I-33) | | Compound described in *Org. Lett.* 2017 3199; no characterization data given.<br>Colourless liquid; $^1$H NMR (400 MHz, CDCl$_3$) δ = 7.78 (dd, J = 5.4, 3.1 Hz, 2H), 7.65 (dd, J = 5.5, 3.0 Hz, 2H), 7.59 (d, J = 8.3 Hz, 2H), 7.49 (d, J = 8.3 Hz, 2H), 4.44 (t, J = 5.2 Hz, 2H), 4.05 (t, J = 5.2 Hz, 2H), 3.29-3.23 (m, 5H), 2.68 (t, J = 7.4 Hz, 1H), 1.62-1.42 (m, 4H). $^{19}$F NMR (376 MHz, CDCl$_3$) δ = −62.78; $^{13}$C NMR (101 MHz, CDCl$_3$) δ = 168.33, 158.04, 139.04, 134.28, 133.99, 132.27, 131.26, 130.94, 130.62, 130.30, 126.58, 125.37, 125.34, 125.30, 125.26, 123.25, 72.35, 70.79, 58.63, 38.06, 29.63, 26.23, 23.04. |

TABLE 4-continued

Physical data of compounds (I) prepared according to the General Procedure 4:

| Cpd. No. | Structure | Characterization Data |
|---|---|---|
| (I-34) | | 65:35 E:Z mixture.<br>Pale yellow oil; $^1$H NMR (400 MHz, CDCl$_3$) (mixture of E:Z isomers in a 0.65:0.35 ratio) δ = 8.29 (ddd, J = 7.8, 1.3, 0.7 Hz, 0.35H, Z), 7.74-7.70 (m, 0.65H, E), 7.43-7.24 (m, 3H, E + Z), 4.06 (dd, J = 9.4, 4.1 Hz, 0.65H, E), 4.03 (s, 1.05H, Z), 3.98 (s, 1.95H, E), 3.95 (dd, J = 8.6, 4.3 Hz, 0.35H, Z), 3.77 (s, 1.05H, Z), 3.71 (s, 1.95H, E), 3.46-3.28 (m, 1.35H, E + Z), 3.15 (ddq, J = 17.2, 4.3, 0.8 Hz, 0.65H, E): $^{13}$C NMR (101 MHz, CDCl$_3$) (E + Z isomers) δ = 172.72 (Z), 172.47 (E), 159.22 (E), 156.87 (Z), 146.96 (Z), 146.03 (E), 135.30 (E), 132.85 (Z), 131.47 (Z), 130.81 (E), 129.42 (Z), 127.63 (E), 127.26 (Z), 125.44 (E), 125.39 (Z), 122.03 (E), 62.79 (Z), 62.48 (E), 52.62 (Z), 52.38 (E), 46.64 (Z), 44.83 (E), 34.2 (E), 33.49 (Z). |
| (I-35) | | Compound described in *J. Org. Chem.* 2010, 914; no characterization data given.<br>70:30 E:Z mixture. Colourless oil; $^1$H NMR (400 MHz, CDCl$_3$) (mixture of E:Z isomers in a 0.70:0.30 ratio) δ = 8.17 (d, J = 7.8 Hz, 0.3H, Z), 7.55 (d, J = 7.6 Hz, 0.7H, E), 7.28-7.07 (m, 3H, E + Z), 3.88 (s, 0.9H, Z), 3.85 (s, 2.1H, E), 3.33 (pd, J = 7.3, 2.0 Hz, 0.7H, E), 3.15 (dt, J = 16.7, 8.3 Hz, 1H, E + Z), 2.98 (pd, J = 7.1, 4.1 Hz, 0.3H, Z), 2.53 (dd, J = 16.5, 4.2 Hz, 0.3H, Z), 2.49-2.40 (m, 0.7H, E), 1.20 (d, J = 7.0 Hz, 0.9H, Z), 1.15 (d, J = 7.2 Hz, 2.1H, E); $^{13}$C NMR (101 MHz, CDCl$_3$) (E + Z isomers) δ = 166.17 (E), 162.92 (Z), 147.65 (Z), 146.81 (E), 135.52 (E), 133.38 (Z), 130.99 (Z), 130.38 (E), 129.53 (Z), 127.10 (E), 126.85 (Z), 125.83 (E), 125.57 (Z), 121.89 (E), 62.26 (Z), 62.06 (E), 38.30 (E), 38.10 (Z), 36.42 (Z), 34.52 (E), 20.45 (Z), 18.61 (E). |
| (Z-I-36) | | Colourless liquid; $^1$H NMR (400 MHz, CDCl$_3$) δ = 4.30 (q, J = 7.2 Hz, 2H), 3.84 (s, 3H), 2.68 (hept, J = 6.9 Hz, 1H), 1.32 (t, J = 7.1 Hz, 3H), 1.14 (d, J = 7.0 Hz, 6H); $^{13}$C NMR (101 MHz, CDCl$_3$) δ = 164.14, 156.62, 62.25, 61.40, 31.07, 19.65, 14.37. |
| (E-I-37) | | Synthesized according to *Tetrahedron: Asymmetry* 1997, 2649, Experimental data are in accordance with the referred publication. |

Example 9: Synthesis of Enantioenriched (2R)-N-methoxy-1-(2,4,6-trichlorophenyl) propan-2-amine (II-1) via Asymmetric Oxime Hydrogenation

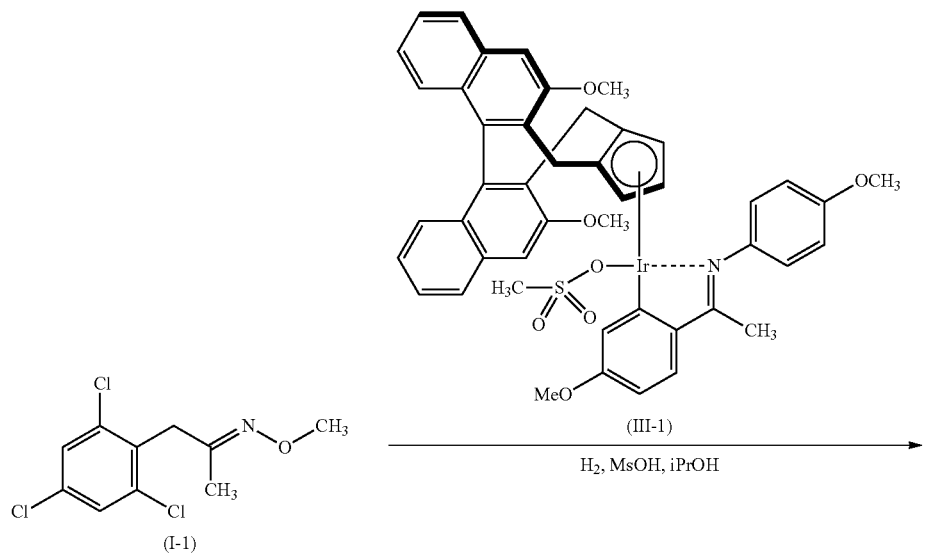

A 50 mL Hastelloy reactor with glass inlet was charged with (E)-N-methoxy-1-(2,4,6-trichlorophenyl)propan-2-imine (I-1) (267 mg), catalyst (III-1) (9.5 mg), iPrOH (5 mL, anhydrous, degassed with argon), and methanesulfonic acid (144 mg) under argon. The reactor was purged with hydrogen (3×5 bar), pressurized to 50 bar $H_2$ and stirred for 16 h at 23° C. Hydrogen was released and the reactor was purged with argon. GC and NMR analysis of the crude reaction mixture indicated full conversion. The reaction mixture was added slowly onto sat. $NaHCO_3$ solution (15 mL) and water (10 mL), and was extracted with dichloromethane (2×15 mL). The combined organic layers were dried ($Na_2SO_4$), filtered and evaporated. The crude product was further purified by column chromatography (silica, ethyl acetate—cyclohexane gradient) to give 250 mg of the desired product (II-1). Colourless oil; $^1H$ NMR (400 MHz, $CDCl_3$) δ=7.32 (s, 2H), 5.47 (br. s, 1H), 3.55 (s, 3H), 3.44 (dp, J=8.0, 6.4 Hz, 1H), 3.16 (dd, J=13.4, 5.9 Hz, 1H), 2.91 (dd, J=13.4, 8.0 Hz, 1H), 1.08 (d, J=6.5 Hz, 3H). Chiral SFC analysis: Column=Daicel Chiralpak IA 3×100 mm, particle size=3μ, λ=220 nm, $CO_2$:iPrOH 85:15, flow=2.0 ml/min, T=40° C.; $t_{R,A}$=0.45 min (minor enantiomer, 34%), $t_{R,B}$=0.51 min (major enantiomer, 66%).

TABLE 5

Synthesis of enantioenriched N-methoxy-1-(2,4,6-trichlorophenyl)propan-2-amine (III-1) via asymmetric hydrogenation of oxime ether (I-1); screeening of catalysts (III);

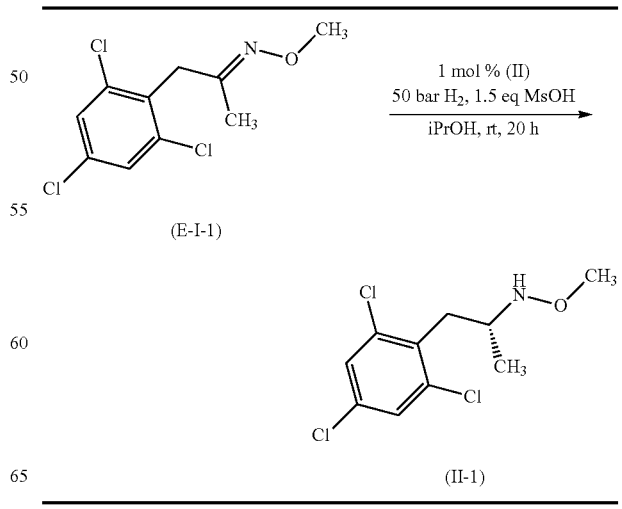

Standard conditions: according to the general procedure 4, E-oxime (E-I-1) was reacted with 1.5 eq of methanesulfonic acid, iPrOH solvent (0.5 mol oxime/1 L solvent), 1 mol % catalyst (III), 50 bar $H_2$, RT, 20 h, unless otherwise indicated. In all reactions high selectivity towards the desired product (>95%) was observed.

TABLE 6

Stereospecific asymmetric hydrogenation of E or Z-oxime ethers (I-1) and (I-7) to yield enantioenriched alkoxylamines (II-1) and (II-7); variations of solvents and acids:

| Catalyst | Deviation from the standard conditions | Conversion of (I-1) | R:S-Enantiomeric ratio of (II-1) |
|---|---|---|---|
| (III-1) | — | >95% | 66:34 |
| (III-6) | — | >95% | 67:33 |
| (III-8) | — | >95% | 78:22 |
| (III-10) | — | >95% | 71:29 |
| (III-12) | — | >95% | 83:17 |
| (III-2) | — | >95% | 90:10 |
| (III-4) | — | >95% | 92:8 |
| (III-4) | 0.01 mol % Ir | 94% | 87:13 |
| (III-16-ent) | — | >95% | 10:90 |
| (III-3-ent) | — | >95% | 4:96 |
| (III-3-ent) | 4 h | >95% | 4:96 |
| (III-3-ent) | 0.01 mol % Ir | 40% | 17:83 |
| (III-3-ent) | 0.01 mol % Ir, c = 1.0M | 73% | 18:82 |
| (III-18) | — | >95% | 92:18 |
| (III-19) | — | >95% | 85:15 |
| (III-15) | — | >95% | 67:33 |
| (III-22-ent) | — | >95% | 5:95 |
| (III-23-ent) | — | >95% | 7:93 |
| (III-24-ent) | — | >95% | 10:90 |

Conditions: according to the general procedure 4, the F or Z oxime (I-1) was reacted with acid, solvent (0.5 mol oxime/1 L solvent), 1 mol % (III-3-ent), 50 bar $H_2$, RT, 20 h, unless otherwise indicated. In all reactions high selectivity towards the desired product (>95%) was observed.

| Oxime | Solvent | Acid (eq.) | Conversion of (I-1) | R:S-Enantiomeric ratio of (II-1) |
|---|---|---|---|---|
| E-(I-1) | MeOH | MsOH (1.5 eq.) | >95% | 15:85 |
| E-(I-1) | iPrOH | MsOH (1.5 eq.) | >95% | 4:96 |
| E-(I-1) | tAmylOH | MsOH (1.0 eq.) | >95% | 4:96 |
| Z-(I-1) | tAmylOH | MsOH (1.0 eq.) | >95% | 88:12 |
| E-(I-1) | tAmylOH | TFA (5.0 eq.) | 80% | 15:85 |
| E-(I-7) | iPrOH | MsOH (1.5 eq.) | >95% | 14:86 |
| E-(I-7) | tAmylOH | MsOH (1.5 eq.) | >95% | 13:87 |
| E-(I-7) | tAmylOH | MsOH (1.0 eq.) | >95% | 9.5:90.5 |
| E-(I-7) | tAmylOH | $H_2SO_4$ (1.0 eq.) | >95% | 20:80 |
| E-(I-7) | tAmylOH | PTSA•$H_2O$ (1.0 eq.) | >95% | 14:86 |
| E-(I-7) | tAmylOH | $HBF_4$ (1.0 eq.) | >95% | 17:83 |
| E-(I-7) | tAmylOH | TFA (1.0 eq.) | 63% | 7:93 |
| E-(I-7) | tAmylOH | TFA (5.0 eq.) | >95 | 7:93 |

Example 10: Synthesis of 4-(difluoromethyl)-N-methoxy-1-methyl-N-[(1R)-1-methyl-2-(2,4,6-trichlorophenyl)ethyl]pyrazole-3-carboxamide (XIII-1)

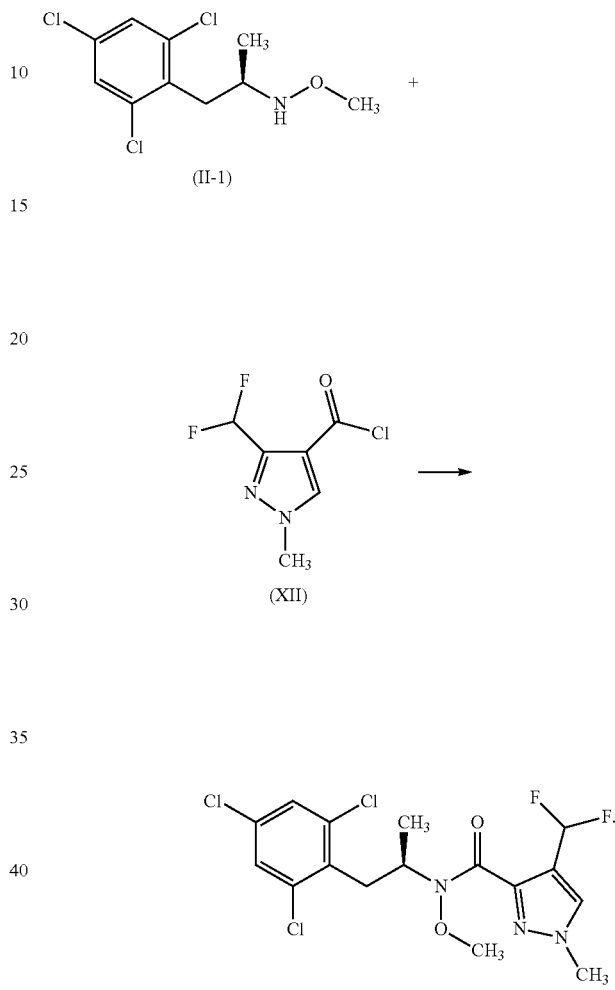

A reaction vial was charged with N-methoxy-1-(2,4,6-trichlorophenyl) propan-2-amine (II-1) (made according to Example 10; 25 mg, 66:34 R:S) and dichloromethane (0.4 mL). Triethylamine (0.027 mL), followed by 3-(difluoromethyl)-1-methyl-pyrazole-4-carbonyl chloride (XII) (20 mg) dissolved in dichloromethane (0.2 mL) were added dropwise at room temperature. The reaction mixture was stirred at room temperature for 1.5 h. The reaction mixture was diluted with dichloromethane, extracted with aq. HCl (1M), aq. $NaHCO_3$, brine, dried over sodium sulfate and evaporated under vacuum. The product was isolated by flash column chromatography ($SiO_2$; ethyl acetate-cyclohexane gradient) to give 20 mg of the desired product (XIII-1). Analytical data corresponds to that reported in WO14/206855. Chiral SFC analysis: Daicel SFC Chiralpak IC column 3×100 mm, wavelength: 220 nm, solvent: A=$CO_2$, B=EtOH, gradient: 50% B in 1.8 min, injection volume: 1 µl, flow: 2.0 ml/min, retention time=0.90 minutes (minor (S)-enantiomer, 33.3%), 1.41 minutes (major (R)-enantiomer, 66.7%).

Example 11: General Procedure 6: Asymmetric Hydrogenation of Oxime Ethers Using Catalysts of the Invention to Produce Enantioenriched N-alkoxylamines Example 12: General Procedure 7: N-alkoxyamine Product Derivatization by N-acylation with Benzoyl Chloride

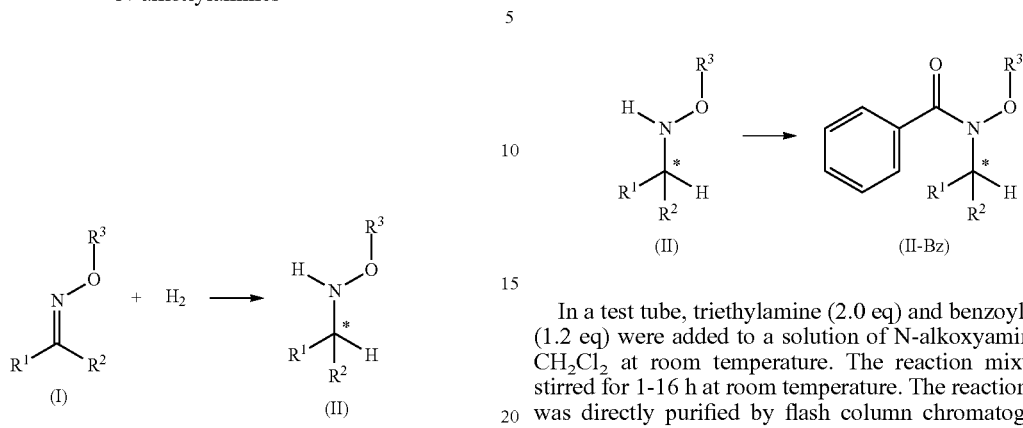

In a test tube, triethylamine (2.0 eq) and benzoyl chloride (1.2 eq) were added to a solution of N-alkoxyamine (II) in CH₂Cl₂ at room temperature. The reaction mixture was stirred for 1-16 h at room temperature. The reaction mixture was directly purified by flash column chromatography to afford the corresponding N-benzoyl-N-alkoxyamine product (II-Bz). The enantiomeric excess of the product was determined by chiral stationary phase HPLC.

A flame-dried test tube, equipped with a magnetic stirring bar and a septum seal, was charged with the corresponding catalyst (1 mol %) and the oxime substrate (1 eq.). Dry ROH solvent (0.5 M; R=t-Amyl, i-propyl, ethyl, methyl) was added followed by a dropwise addition of either trifluoroacetic or methanesulfonic acid (1.0-5.0 eq.). A needle was inserted in the septum and test tube was placed in a high-pressure reactor. The reactor was purged with hydrogen (3×5 bar), pressurized to 50 bar of $H_2$ and the reaction mixture was stirred at 25° C. for 16 h. Hydrogen was released and the reaction mixture was added slowly onto NaHCO₃ (aq., sat.) and extracted three times with CH₂Cl₂. The combined organic layers were dried over Na₂SO₄, filtered and the solvent was removed under reduced pressure to afford the crude N-alkoxyamine product (typically with >95% NMR purity). Purification by flash column chromatography afforded the pure product. The enantiomeric excess of the product was determined by chiral stationary phase HPLC.

TABLE 7

Synthesis of hydroxylamines (II) via asymmetric hydrogenation of oximes (I) using catalyst (III-3-ent), substrate, scope:

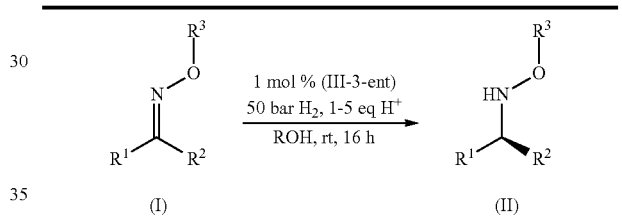

Reaction conditions: according to General Procedure 4, 1 eq. of oxime (I), 1.0-5.0 eq. of MsOH or TFA acid, ROH solvent (0.5 mol oxime/1 L solvent; R=t-Amyl, i-propyl, ethyl, methyl), 1 mol % catalyst (III-3-ent), 50 bar $H_2$, room temperature, 16 h, unless otherwise stated. In all reactions high selectivity towards the desired product (>95%) was observed.

| Cpd. No. | Structure | Structure & Characterization Data |
|---|---|---|
| (S)-(II-1) | 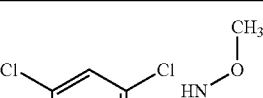 | Synthesized from (E-I-1) according to General Procedure 6 using i-PrOH, 1.0 eq. of MsOH; >95% yield. The analytical data are in accordance with WO2014/206855 A1. Colourless oil; $^1$H NMR (400 MHz, CDCl₃) δ = 7.32 (s, 2H), 5.47 (br. s, 1H), 3.55 (s, 3H), 3.44 (dp, J = 8.0, 6.4 Hz, 1H), 3.16 (dd, J = 13.4, 5.9 Hz, 1H), 2.91 (dd, J = 13.4, 8.0 Hz, 1H), 1.08 (d, J = 6.5 Hz, 3H). Chiral SFC: Column = Daicel Chiralpak IA 3 × 100 mm, particle size - 3μ, λ = 220 nm, CO₂:iPrOH 85:15, flow = 2.0 ml/min, T = 40° C.; $t_{RA}$ = 0.45 min (major enantiomer, 96%), $t_{RB}$ = 0.51 min (minor enantiomer, 4%). |
| (R)-(II-2) | 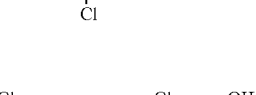 | Synthesized according to General Procedure 6 using (III-3), i-PrOH, 1.0 eq. of MsOH; >95% yield. Colourless solid; $^1$H NMR (400 MHz, CDCl₃) δ = 7.32 (s, 2H), 4.76 (br. s, 2H), 3.40 (h, J = 6.6 Hz, 1H), 3.15 (dd, J = 13.6, 6.9 Hz, 1H), 2.92 (dd, J = 13.6, 7.0 Hz, 1H), 1.15 (d, J = 6.5 Hz, 3H). Chiral HPLC: Chiralpak IF column, 4.6 × 250 mm; nHex:iPrOH 95:05, flow = 1.0 mL/min; T = 25° C.; λ = 230 nm, $t_{RA}$ = 15.6 min (minor enantiomer, 18%), $t_{RB}$ = 17.0 min (major enantiomer, 82%). |

| Cpd. No. | Structure | Structure & Characterization Data |
|---|---|---|
| (R)-(II-3) | | Synthesized according to General Procedure 6 using (III-3), i-PrOH, 1.0 eq. of MsOH; >95% NMR yield.<br>Colourless oil; IR (neat, cm$^{-1}$): $v_{max}$ = 3248, 2969, 1580, 1546, 1452, 1439, 1372, 855, 697; $^1$H NMR (400 MHz, CDCl$_3$): δ = 7.38-7.27 (m, 7H), 5.53 (br. S, 1H), 4.72 (s, 2H), 3.47 (dtd, J = 7.8, 6.5, 6.1 Hz, 1H), 3.18 (dd, J = 13.4, 6.1 Hz, 1H), 2.92 (dd, J = 13.4, 7.8 Hz, 1H), 1.11 (d, J = 6.5 Hz, 3H); $^{13}$C NMR (101 MHz, CDCl$_3$) δ = 137.83, 136.50, 134.53, 132.69, 128.57, 128.47, 128.35, 127.94, 76.88, 55.81, 35.49, 17.90; HRMS (EI$^+$): m/z calcd for C$_{16}$H$_{17}$Cl$_3$NO [M + H]$^+$ 344.0370, found 344.0370;<br>The crude product (II-3) was converted to the N-benzoyl derivative (II-3-Bz) according to the General Procedure 7, for chiral HPLC analysis: |

(II-3-Bz)

IR (neat, cm$^{-1}$): $v_{max}$ = 294.0, 1598, 1359, 1175, 975, 553; $^1$H NMR (400 MHz, CDCl$_3$) δ = 7.51 (d, J = 7.3 Hz, 2H), 7.45 (tt, J = 7.6, 1.1 Hz, 1H), 7.41-7.32 (m, 5H), 7.31-7.16 (m, 4H), 5.01-4.54 (m, 3H, 3.28 (d, J = 7.3 Hz, 2H), 1.33 (d, J = 6.8 Hz, 3H); $^{13}$C NMR (101 MHz, CDCl$_3$) δ = 170.78, 136.76, 135.04, 133.31, 133.24, 130.75, 129.46, 128.81, 128.58, 128.40, 128.30, 127.99, 78.30, 55.73 (br.), 34.82, 17.47; HRMS (EI$^+$): m/z calcd for C$_{23}$H$_{21}$Cl$_3$NO$_2$ [M + H]$^+$ 448.0632, found 448.0642; Chiral HPLC: Chiralpak IG column, 4.6 × 250 mm; nHex:iPrOH 90:10, flow = 1.0 mL/min; T = 25° C.; λ = 230 nm, $t_{RA}$ = 26.7 min (minor enantiomer, 8%), $t_{RB}$ = 28.4 min (major enantiomer, 92%).

| Cpd. No. | Structure | Structure & Characterization Data |
|---|---|---|
| (S)-(II-4) | | Synthesized according to General Procedure 6 using i-PrOH, 1.0 eq. of MsOH; >95% yield.<br>Colourless oil; $^1$H NMR (400 MHz, CDCl$_3$) δ = 7.30 (s, 2H), 4.68 (br. s, 1H), 3.30 (dp, J = 7.7, 6.4 Hz, 1H), 3.15 (dd, J = 13.3, 6.5 Hz, 1H), 2.82 (dd, J = 13.3, 7.7 Hz, 1H), 1.12 (s, 9H), 1.07 (d, J = 6.4 Hz, 3H); $^{13}$C NMR (101 MHz, CDCl$_3$) δ = 136.49, 135.06, 132.44, 128.23, 76.89, 56.31, 35.69, 26.90, 18.40. Chiral SFC: Column = Daicel Chiralpak IG 3 × 100 mm, particle size = 3μ, λ = 210 nm, CO$_2$:MeOH 80:20, flow = 2.0 ml/min, T = 40° C.; $t_{RA}$ = 0.77 min (major enantiomer, 97%), $t_{RB}$ = 0.87 min (minor enantiomer, 3%). |
| (S)-(II-5) | | Synthesized according to General Procedure 6 using i-PrOH, 1.0 eq. of MsOH; >95% yield.<br>$^1$H NMR (400 MHz, CDCl$_3$) δ = 7.30 (s, 2H), 5.69 (d, J = 5.4 Hz, 1H), 5.06 (t, J = 4.1 Hz, 1H), 4.03-3.83 (m, 4H), 3.77 (d, J = 4.1 Hz, 2H), 3.51-3.39 (dp, J = 7.9, 6.4 Hz, 1H), 3.14 (dd, J = 13.4, 6.1 Hz, 1H), 2.90 (dd, J = 13.4, 7.9 Hz, 1H), 1.08 (d, J = 6.4 Hz, 3H).<br>The crude product (II-5) was converted to the N-benzoyl derivative (II-5-Bz) according to the General Procedure 7, for chiral HPLC analysis: |

| Cpd. No. | Structure | Structure & Characterization Data |
|---|---|---|
| | 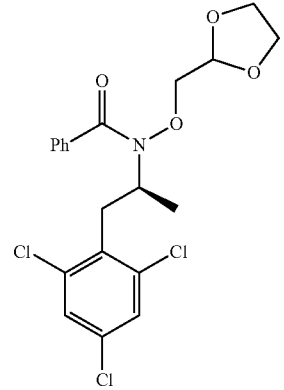<br>(II-5-Bz) | $^{1}$H NMR (400 MHz, CDCl$_3$) δ = 7.51-7.39 (m, 3H), 7.39-7.31 (m, 2H), 7.29-7.20 (m, 2H), 5.21-5.06 (br. m, 1H), 4.75-4.55 (br. m, 1H), 4.08-3.82 (m, 6H), 3.38-3.22 (m, 2H), 1.36 (d, J = 6.8 Hz, 3H); $^{13}$C NMR (101 MHz, CDCl$_3$) δ = 170.87, 136.75, 134.65, 133.25, 130.89, 128.39, 128.32, 127.94, 101.31, 76.63, 65.27, 65.22, 55.92, 34.65, 17.26; Chiral HPLC: Chiralpak IG column, 4.6 × 250 mm; nHex:iPrOH 70:30, flow = 1.0 mL/min; T = 25° C.; λ = 230 nm, $t_{RA}$ = 19.6 min (minor enantiomer, 7%), $t_{RB}$ = 24.5 min (major enantiomer, 93%). |
| (S)-<br>(II-6) | 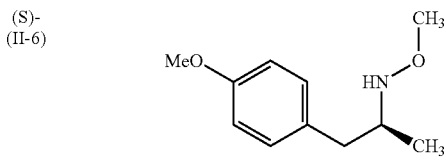 | Synthesized according to General Procedure 6 using t-AmylOH, 2.0 eq. of TFA; >95% yield.<br>Compound described in *J. Med. Chem.* 1965 100; Colourless oil; $^{1}$H NMR (400 MHz, CDCl$_3$) δ = 7.12-7.07 (m, 2H), 6.87-6.79 (m, 2H), 3.78 (s, 3H), 3.54 (s, 3H), 3.18 (h, J = 6.5 Hz, 1H), 2.73 (dd, J = 13.6, 7.0 Hz, 1H), 2.55 (dd, J = 13.6, 6.5 Hz, 1H), 1.06 (d, J = 6.4 Hz, 2H).<br>The crude product (II-6) was converted to the N-benzoyl derivative (II-6-Bz) according to the General Procedure 7, for chiral HPLC analysis: |
| | 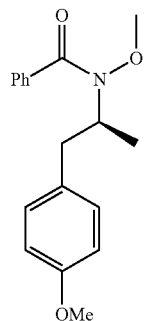<br>(II-6-Bz) | Colourless oil; $^{1}$H NMR (400 MHz, CDCl$_3$) δ = 7.40-7.33 (m, 1H), 7.32-7.23 (m, 2H), 7.17 (d, J = 7.7 Hz, 2H), 7.03 (d, J = 8.1 Hz, 2H), 6.83-6.76 (m, 2H), 4.46-4.21 (br. m, 1H), 3.79 (s, 3H), 3.71 (br. s, 3H), 3.04 (dd, J = 13.7, 8.9 Hz, 1H), 2.65 (dd, J = 13.8, 5.9 Hz, 1H), 1.37 (d, J = 6.7 Hz, 3H). $^{13}$C NMR (101 MHz, CDCl$_3$) δ = 170.54, 158.48, 135.28, 130.59, 130.36, 130.27, 128.12, 127.49, 113.92, 64.12, 58.47, 55.42, 39.29, 18.43. Chiral HPLC: Chiralpak IG column, 3 × 100 mm; nHex:iPrOH 80:20, flow = 1.0 mL/min; T = 35° C.; λ = 254 nm, $t_{RA}$ = 7.9 min (major enantiomer, 78%), $t_{RB}$ = 10.1 min (minor enantiomer, 22%). |

| Cpd. No. | Structure | Structure & Characterization Data |
|---|---|---|
| (S)-(II-7) | *[structure: 2-bromobenzyl with CH(CH3)NHOCH3]* | Synthesized from (E-I-7) according to General Procedure 6 using t-AmylOH, 5 eq. of TFA; >95% yield, 93:7 er. Product enantio-enriched to 99:1 er (81% yield) by crystallization of the 4-nitrobenzenesulfonic acid salt in iPrOH/cHex as the racemate. Colourless oil; $^1$H NMR (400 MHz, CDCl$_3$) δ = 7.61-7.54 (m, 1H), 7.31-7.21 (m, 2H), 7.11 (ddd, J = 8.0, 5.1, 3.8 Hz, 1H), 5.59 (br. s, 1H), 3.59 (s, 3H), 3.37 (h, J = 6.7 Hz, 1H), 3.03 (dd, J = 13.4, 6.9 Hz, 1H), 2.75 (dd, J = 13.4, 6.8 Hz, 1H), 1.15 (d, J = 6.4 Hz, 3H). $^{13}$C NMR (101 MHz, CDCl$_3$) δ = 138.63, 133.14, 131.70, 128.15, 127.46, 125.06, 62.77, 56.08, 40.38, 17.95. Chiral HPLC: Chiralpak IA column, 3 × 100 mm; nHex:iPrOH 99.5:0.5, flow = 0.5 mL/min; T = 25° C.; λ = 210 nm. $t_{RA}$ = 9.2 min (minor enantiomer, 1%), $t_{RB}$ = 10.7 min (major enantiomer, 99%). |
| (S)-(II-8) | *[structure: 2,4,6-trimethylbenzyl with CH(CH3)NHOCH3]* | Synthesized according to General Prodcedure 6 using t-AmylOH, 1.0 eq. of TFA, 2 mol % (III-3); 60% yield. Colourless oil; $^1$H NMR (400 MHz, CDCl$_3$) δ = 6.85 (s, 2H), 5.46 (br. s, 1H), 3.57 (s, 3H), 3.24 (h, J = 6.6 Hz, 1H), 2.88 (dd, J = 13.8, 6.8 Hz, 1H), 2.59 (dd, J = 13.8, 7.4 Hz, 1H), 2.31 (s, 6H), 2.26 (s, 3H), 1.11 (d, J = 6.3 Hz, 3H). $^{13}$C NMR (101 MHz, CDCl$_3$) δ = 137.02, 135.55, 132.88, 129.25, 62.79, 56.69, 33.74, 20.92, 20.49, 18.32. The Crude product (II-8) was converted to the N-benzoyl derivative (II-8-Bz) according to the General Procedure 7, for chiral HPLC analysis: |

*[structure: (II-8-Bz) N-benzoyl derivative]*

(II-8-Bz)

Colourless oil; $^1$H NMR (400 MHz, CDCl$_3$) δ = 7.40-7.32 (m, 1H), 7.30-7.23 (m, 2H), 7.22-7.10 (m, 2H), 6.74 (s, 2H), 4.49-4.28 (m, 1H), 3.78 (s, 3H), 3.02 (dd, J = 14.0, 7.5 Hz, 1H), 2.80 (dd, J = 14.0, 6.8 Hz, 1H), 2.23 (s, 3H), 2.11 (s, 6H), 1.36 (d, J = 6.8 Hz, 3H). Chiral HPLC: Chiralpak IG column, 3 × 100 mm; nHex:iPrOH 80:20, flow = 1.0 mL/min; T = 35° C.; λ = 254 nm, $t_{RA}$ = 4.7 min (major enantiomer, 97%), $t_{RB}$ = 6.2 min (minor enantiomer, 3%).

| Cpd. No. | Structure | Structure & Characterization Data |
|---|---|---|
| (S)-(II-9) | *[structure: 1,2-diphenyl with CH(CH3)NHOCH3]* | Synthesized according to General Procedure 6 using MeOH, 1.5 eq. of MsOH; 94% yield. Colourless oil; $^1$H NMR (400 MHz, CDCl$_3$) δ = 7.40-7.35 (m, 2H), 7.35-7.25 (m, 6H), 7.24-7.15 (m, 2H), 5.65 (br. s, 1H), 3.88 (d, J = 10.5 Hz, 1H), 3.78 (dq, J = 10.5, 6.1 Hz, 1H), 3.51 (s, 3H), 1.14 (d, J = 6.1 Hz, 3H); $^{13}$C NMR (101 MHz, CDCl$_3$) δ = 142.63, 142.18, 129.05, 128.73, 128.38, 128.11, 126.91, 126.60, 62.92, 59.15, 55.49, 17.38. Chiral SFC: Column = Daicel Chiralpak IG 3 × 100 mm, particle size = 3μ, λ = 220 nm, CO$_2$:iPrOH 90:10, flow = 2.0 ml/min, T = 40° C.; $t_{RA}$ = 1.23 min (major enantiomer, 93%), $t_{RB}$ = 1.39 min (minor enantiomer, 7%). |
| (S)-(II-10) | *[structure: phenyl-C(CH3)2-CH(CH3)NHOCH3]* | Synthesized according to General Procedure 6 using MeOH, 1.5 eq. of MsOH; 38% yield. Colourless oil; $^1$H NMR (400 MHz, CDCl$_3$) δ = 7.41-7.29 (m, 4H), 7.24-7.18 (m, 1H), 5.21 (br. s, 1H), 3.44 (s, 3H), 3.18 (q, J = 6.4 Hz, 1H), 1.34 (s, 3H), 1.30 (s, 3H), 1.07 (d, J = 6.4 Hz, 3H); $^{13}$C NMR (101 MHz, CDCl$_3$) δ = 147.88, 128.38, 126.23, 126.16, 64.53, 62.25, 40.49, 26.53, 23.27, 13.97. Chiral HPLC: Chiralpak IG column, 4.6 × 250 mm; nHex:iPrOH 99.9:0.1, flow = 1.0 mLmin; T = 25° C.; λ = 210 nm, $t_{RA}$ = 10.6 min (major enantiomer, 77%), $t_{RB}$ = 12.9 min (minor enantiomer, 22%). |

| Cpd. No. | Structure | Structure & Characterization Data |
|---|---|---|
| (S)-(II-11) | [Structure: cyclohexyl-CH(CH₃)-NH-O-CH₃] | Synthesized according to General Procedure 6 using iPrOH, 1.0 eq. of MsOH; >95% NMR yield (analytical data are in accordance with *Chem. Commun.* 2007, 1530). The cruded product was converted to the N-benzoyl derivative (II-11-Bz) according th the general procedure 7, for chiral HPLC analysis:<br><br>[Structure: (II-11-Bz) PhC(=O)-N(OCH₃)-CH(CH₃)-cyclohexyl]<br><br>(II-11-Bz)<br><br>$^1$H NMR (400 MHz, CDCl$_3$) δ = 7.67-7.50 (m, 2H), 7.50-7.31 (m, 3H), 3.93 (br. s, 1H), 3.65 (s, 3H), 1.90 (dtd, J = 13.4, 4.6, 4.2, 2.3 Hz, 1H), 1.79-1.56 (m, 5H), 1.33 (d, J = 6.8 Hz, 3H), 1.29-1.01 (m, 3H), 0.97-0.75 (m, 2H); $^{13}$C NMR (101 MHz, CDCl$_3$) δ = 170.51, 135.55, 130.41, 128.32, 127.95, 63.96, 61.02, 41.16, 30.30, 30.20, 26.31, 26.28, 26.10, 16.58. Chiral HPLC: Chiralpak IC column, 4.6 × 250 mm; nHex:iPrOH 80:20, flow = 1.0 mL/min; T = 25° C.; λ = 254 nm. $t_{RA}$ = 11.1 min (minor enantiomer, 14%), $t_{RB}$ = 13.8 min (major enantiomer, 86%). |
| (R)-(II-12) | [Structure: cyclohexyl-CH(CH₃)-NH-O-CH₂-Ph] | Synthesized according to General Procedure 6 using (III-3), iPrOH, 1.0 eq. of MsOH; >95% NMR yield (analytical data are in accordance with *Chem. Commun.* 2007, 1530). The crude product was converted to the N-benzoyl derivative (II-12-Bz) according to the general procedure 7, for chiral HPLC analysis:<br><br>[Structure: (II-12-Bz) PhC(=O)-N(OCH₂Ph)-CH(CH₃)-cyclohexyl]<br><br>(II-12-Bz)<br><br>IR (neat, cm$^{-1}$): ν$_{max}$ = 2927, 2851, 1645, 1448, 1384, 697; $^1$H NMR (400 MHz, CDCl$_3$) δ = 7.72-7.55 (m, 2H), 7.51-7.37 (m, 3H), 7.37-7.27 (m, 3H), 7.15 (s, 2H), 4.77 (br. s, 2H), 4.07 (br. s, 1H), 2.03-1.86 (m, 1H), 1.84-1.67 (m, 4H), 1.67-1.57 (m, 1H), 1.34 (d, J = 6.8 Hz, 3H), 1.29-1.03 (m, 3H), 1.02-0.76 (m, 2H); $^{13}$C NMR (101 MHz, CDCl$_3$) δ = 170.86, 135.71, 134.96, 130.41, 129.46, 128.74, 128.51, 128.31, 128.12, 78.26, 53.55, 41.23, 30.37, 30.22, 26.32, 26.25, 26.08, 167.67; HRMS (EI$^+$): m/z calcd for C$_{22}$H$_{28}$NO$_2$ [M + H]$^+$ 338.2115, found 338.2120. Chiral HPLC: Chiralpak IG column, 4.6 × 250 mm; nHex:iPrOH 70:30, flow = 1.0 mL/min; T = 25° C.; λ = 230 nm, $t_{RA}$ = 12.70 min (minor enantiomer, 16%), $t_{RB}$ = 22.90 min (major enantiomer, 84%). |

| Cpd. No. | Structure | Structure & Characterization Data |
|---|---|---|
| (S)-(II-13) | [Structure: N-methoxy amine of tert-butyl methyl carbinol analog with CH3 groups] | Synthesized according to General Procedure 6 using iPrOH, 1.0 eq. of MsOH; >95% NMR yield. The crude methoxyamine methanesulfonic acid salt was converted directly to the N-benzoyl derivative (II-13-Bz) according to the general procedure 7 (using 3 eq. of triethylamine), for chiral HPLC analysis:<br><br>[Structure: (II-13-Bz)]<br><br>(II-13-Bz)<br><br>Colourless oil; $^1$H NMR (400 MHz, CDCl$_3$) δ = 7.64 (s, 2H), 7.48-7.29 (m, 3H), 4.63 (br. s, 1H), 3.46 (br. s, 3H), 1.34 (d, J = 7.0 Hz, 3H), 1.00 (br. s, 9H). Chiral HPLC: Chiralpak IC column, 4.6 × 250 mm; nHex:iPrOH 80:20, flow = 1.0 mL/min; T = 25° C.; λ = 254 nm, $t_{RA}$ = 9.4 min (minor enantiomer, 13%). $t_{RB}$ = 10.6 min (major enantiomer, 87%). |
| (S)-(II-14) | [Structure: 1-adamantyl methyl carbinol N-methoxy amine] | Synthesized according to General Procedure 6 using t-AmylOH, 1.0 eq. of MsOH, 74% yield.<br>Analytical data are in accordance with *Chem. Commun.* 2007, 1530. Colourless oil; $^1$H NMR (400 MHz, CDCl$_3$) δ = 5.48 (br. s, 1H), 3.48 (s, 3H), 2.51 (q, J = 6.7 Hz, 1H), 1.95 (p, J = 3.3 Hz, 3H), 1.73-1.56 (m, 9H), 1.49 (dq, J = 12.2, 2.6 Hz, 3H), 1.03 (d, J = 6.5 Hz, 3H); $^{13}$C NMR (101 MHz, CDCl$_3$) δ = 64.74, 61.86, 39.03, 37.36, 35.17, 28.64, 12.58.<br>The product (II-14) was converted to the N-benzoyl derivative (II-14-Bz) according to the General Procedure 7, for chiral HPLC analysis:<br><br>[Structure: (II-14-Bz)]<br><br>(II-14-Bz)<br><br>Colourless oil; $^1$H NMR (400 MHz, CDCl$_3$) (mixture of 2 rotamers A:B in a 0.65:0.35 ratio) δ = 7.84-7.47 (br. m, 2H, rot. A + B), 7.47-7.33 (m, 3H, rot. A + B), 4.49 (br. m, 1H, rot. A + B), 3.82 (br. s, 1.05H, rot. B), 3.40 (br. s, 1.95H, rot. B), 2.02-1.89 (br. m, 3H, rot. A + B), 1.81-1.41 (br. m, 12H, rot. A + B), 1.32 (d, J = 7.0 Hz, 3H, rot. A + B). Chiral HPLC: Chiralpak IC column 4.6 × 250 mm; nHex:iPrOH 80:20, flow = 1.0 mL/min; T = 25° C.; λ = 254 nm, $t_{RA}$ = 9.2 min (minor enantiomer, 7%), $t_{RB}$ = 11.3 min (major enantiomer, 93%). |
| (S)-(II-15) | [Structure: 1-adamantyl CH(NHOMe)CH2OH] | Synthesized according to General Procedure 6 using t-AmylOH, 1.0 eq. of MsOH, >95% yield, 91:9 er. Product enantio-enriched to 93:7 er (75% yield) by crystallization in nHex at –20° C.<br>Colourless solid; $^1$H NMR (400 MHz, CDCl$_3$) δ = 5.99 (d, J = 5.7 Hz, 1H), 3.82-3.70 (m, 1H), 3.66-3.57 (m, 1H), 3.49 (d, J = 1.2 Hz, 3H), 2.77 (br. s, 1H), 2.46 (dtd, J = 7.8, 3.8, 1.8 Hz, 1H), 1.99-1.86 (m, 3H), 1.74-1.49 (m, 12H); $^{13}$C NMR (101 MHz, CDCl$_3$) δ = 70.61, 61.82, 60.31, 39.59, 37.08, 35.13, 28.47.<br>The product (II-15) was converted to the O-benzoyl derivative (II-15-Bz) according to the General Procedure 7, for chiral HPLC analysis: |

-continued

| Cpd. No. | Structure | Structure & Characterization Data |
|---|---|---|
| (II-15-Bz) | | Colourless oil; $^1$NMR (400 MHz, CDCl$_3$) δ 8.10-7.98 (m, 2H), 7.62-7.51 (m, 1H), 7.45 (dd, J = 8.4, 7.0 Hz, 2H), 5.83 (br. s, 1H), 4.60 (dd, J = 11.5, 4.2 Hz, 1H), 4.40 (dd, J = 11.5, 5.6 Hz, 1H), 3.51 (s, 3H), 2.72 (dd, J = 5.6, 4.3 Hz, 1H), 2.00 (p, J = 3.1 Hz, 3H), 1.83-1.59 (m, 12H). $^{13}$C NMR (101 MHz, CDCl$_3$) δ = 166.76, 133.06, 130.46, 129.73, 128.53, 68.25, 62.01, 61.65, 39.73, 37.16, 35.34, 28.57. Chiral HPLC: Chiralpak ID column 3 × 100 mm; nHex:iPrOH 98:2, flow = 1.0 mL/min; T = 25° C.; λ = 254 nm, $t_{RA}$ = 6.4 min (minor enantiomer, 7%), $t_{RB}$ = 7.0 min (major enantiomer, 93%). |
| (S)-(II-16) | | Synthesized according to General Procedure 6 using MeOH:THF 2:1 v/v, 1.5 eq. of MsOH, 95% yield.<br>Colourless oil; $^1$H NMR (400 MHz, CDCl$_3$) δ = 7.81 (d, J = 8.1 Hz, 2H), 7.34 (d, J = 8.2 Hz, 2H), 5.61 (br. s, 1H), 4.26 (dd, J = 10.0, 3.8 Hz, 1H), 4.15 (dd, J = 10.0, 5.1 Hz, 1H), 3.37 (s, 3H), 2.50-2.46 (m, 1H), 2.44 (s, 3H), 1.99-1.86 (m, 3H), 1.73-1.54 (m, 9H), 1.54-1.43 (m, 3H); $^{13}$C NMR (101 MHz, CDCl$_3$) δ = 144.87, 133.08, 129.91, 128.14, 67.97, 66.89, 61.34, 39.62, 36.99, 35.32, 28.45, 21.78. Chiral HPLC: Chiralpak IA column, 4.6 × 250 mm; nHex:iPrOH 98:2, flow = 1.0 mL/min; T = 25° C.; λ = 230 nm, $t_{RA}$ = 15.3 min (major enantiomer, 91%), $t_{RB}$ = 18.1 min (minor enantiomer, 9%). |
| (R)-(II-18) | | Synthesized according to General Procedure 6 using iPrOH, 1.5 eq. of MsOH, 71% yield.<br>Colourless oil; $^1$H NMR (400 MHz, CDCl$_3$) δ = 7.39-7.23 (m, 5H), 5.84 (br. s, 1H), 3.73 (d, J = 7.1 Hz, 1H), 3.44 (s, 3H), 2.00 (dq, J = 13.7, 6.8 Hz, 1H), 1.00 (d, J = 6.7 Hz, 3H), 0.79 (d, J = 6.8 Hz, 3H), $^{13}$C NMR (101 MHz, CDCl$_3$) δ = 141.09, 128.26, 128.05, 127.22, 71.62, 62.28, 31.12, 20.04, 19.16. Chiral HPLC: Chiralpak ID column, 3 × 100 mm; nHept:iPrOH 99.9:0.1, flow = 0.5 mL/min; T = 40° C.; λ = 210 nm; $t_{RA}$ = 5.2 min (major enantiomer, 90%), $t_{RB}$ = 6.3 min (minor enantiomer, 10%). |
| (R)-(II-19) | | Synthesized from oxime (I-19) (50:50 E:Z mixture) according to General Procedure 6 using EtOH, 1.5 eq, of MsOH, >95% yield.<br>Colourless oil; $^1$H NMR (400 MHz, CDCl$_3$) δ = 7.23-7.16 (m, 2H), 6.90-6.82 (m, 2H), 5.81 (br. s, 1H), 3.80 (s, 3H), 3.68 (d, J = 7.3 Hz, 1H), 3.39 (s, 3H), 1.93-1.80 (m, 1H), 1.79-1.68 (m, 1H), 1.68-1.54 (m, 3H), 1.54-1.41 (m, 1H), 1.35-0.71 (m, 5H); $^{13}$C NMR (101 MHz, CDCl$_3$) δ = 158.72, 133.41, 129.18, 113.43, 70.27, 62.26, 55.29, 40.98, 30.59, 29.50, 26.56. 26.37, 26.31. Chiral HPLC: Chiralpak IC column, 4.6 × 250 mm; nHex:iPrOH 99.5:0.5, flow = 1.0 mL/min; T = 25° C. λ = 230 nm, $t_{RA}$ = 9.3 min (92%), $t_{RB}$ = 11.1 min (8%). |
| (R)-(II-20) | | Synthesized according to General Procedure 6 using EtOH, 1.5 eq. of MsOH, >95% yield.<br>Colourless oil; $^1$H NMR (400 MHz, CDCl$_3$) δ = 7.38-7.19 (m, 5H), 5.86 (br. s, 1H), 3.74 (d, J = 7.3 Hz, 1H), 3.40 (s, 3H), 1.94-1.84 (m, 1H), 1.79-1.70 (m, 1H), 1.70-1.55 (m, 3H), 1.51-1.42 (m, 1H), 1.32-0.76 (m, 5H); $^{13}$C NMR (101 MHz, CDCl$_3$) δ = 141.146, 128.23, 128.07, 127.17, 70.95, 62.28, 41.04, 30.54, 29.61, 26.56, 26.39, 26.34. Chiral HPLC: Chiralpak IG column, 4.6 × 250 nm; nHex:iPrOH 99.5:0.5, flow = 1.0 mL/min; T = 25° C. λ = 210 mm, $t_{RA}$ = 10.0 min (94%), $t_{RB}$ = 11.6 min (6%). |

-continued

| Cpd. No. | Structure | Structure & Characterization Data |
|---|---|---|
| (R)-(II-21) | | Synthesized according to General Procedure 6 using EtOH, 1.5 eq. of MsOH, >95% yield.<br>Colourless oil; $^1$H NMR (400 MHz, CDCl$_3$) δ = 7.30-7.24 (m, 1H), 7.21 (ddd, J = 8.1, 7.4, 1.8 Hz, 1H), 6.93 (td, J = 7.4, 1.1 Hz, 1H), 6.87 (dd, J = 8.2, 1.1 Hz, 1H), 6.14 (br. s, 1H), 4.12 (d, J = 8.1 Hz, 1H), 3.81 (s, 3H), 3.44 (s, 3H), 2.07-1.97 (m, 1H), 1.78-1.54 (m, 4H), 1.43-1.33 (m, 1H), 1.30-0.81 (m, 5H). $^{13}$C NMR (101 MHz, CDCl$_3$) δ = 157.66, 129.86, 129.20, 127.88, 120.36, 110.74, 65.24, 61.81, 55.50, 40.10, 30.81, 30.11, 26.69, 26.50, 26.42, Chiral HPLC: Chiralpak IC column, 4.6 × 250 mm; nHex:iPrOH 99.5:0.5, flow = 0.7 mL/min; T = 25° C.; λ = 230 nm, $t_{RA}$ = 8.9 min (74%), $t_{RB}$ = 9.5 min (26%). |
| (R)-(II-22) | | Synthesized according to General Procedure 6 using EtOH:THF 3:1 v/v, 1.5 eq. of MsOH, >95% yield.<br>Colourless oil; $^1$H NMR (400 MHz, CDCl$_3$) δ = 7.93-7.78 (m, 4H), 7.55 (dd, J = 8.4, 1.7 Hz, 1H), 7.52-7.45 (m, 2H), 7.30-7.22 (m, 1H), 6.98-6.92 (m, 2H), 6.88 (dt, J = 7.5, 1.3 Hz, 1H), 5.80 (br. s, 1H), 5.25 (s, 2H), 3.98-3.90 (m, 1H), 3.79 (dt, J = 11.5, 3.4 Hz, 1H), 3.70 (d, J = 7.8 Hz, 1H), 3.41 (s, 3H), 3.33 (td, J = 11.9, 2.2 Hz, 1H), 3.25-3.15 (m, 1H), 1.83 (dqd, J = 11.5, 8.1, 3.8 Hz, 1H), 1.74 (ddq, J = 13.1, 4.0, 1.9 Hz, 1H), 1.48-1.32 (m, 1H), 1.19 (td, J = 10.7, 9.4, 3.8 Hz, 2H). $^{13}$C NMR (101 MHz, CDCl$_3$) δ = 158.75, 142.21, 134.62, 133.41, 133.17, 129.36, 128.51, 128.03, 127.85, 126.52, 126.37, 126.21, 125.43, 120.89, 114.83, 113.95, 70.39, 70.23, 68.02, 67.91, 62.29, 38.44, 30.66, 29.66. Chiral HPLC: Chiralpak IC column, 3 × 100 mm; nHex:iPrOH 90:10, flow = 1.0 mL/min; T = 35° C.; λ = 245 nm, $t_{RA}$ = 8.5 min (minor enantiomer, 7%), $t_{RB}$ = 9.5 min (major enantiomer, 93%). |
| (R)-(II-23) | | Synthesized according to General Procedure 6 using EtOH, 1.5 eq. of MsOH, 95% yield.<br>Colourless oil; $^1$H NMR (400 MHz, CDCl$_3$) δ = 7.58 (d, J = 8.1 Hz, 2H), 7.42 (d, J = 8.0 Hz, 2H), 5.87 (br. s, 1H), 3.81 (d, J = 7.3 Hz, 1H), 3.38 (s, 3H), 1.92-1.81 (m, 1H), 1.81-1.70 (m, 1H), 1.69-1.54 (m, 3H), 1.47-1.36 (m, 1H), 1.31-0.75 (m, 5H). $^{13}$C NMR (101 MHz, CDCl$_3$) δ = 145.85, 129.86, 129.54, 129.22, 128.90, 128.53, 125.79, 125.02, 124.98, 123.09, 120.38, 70.57, 62.34, 41.03, 30.32, 29.60, 26.42, 26.27, 26.22. $^{19}$F NMR (376 MHz, CDCl$_3$) δ = -62.35. Chiral HPLC: Chiralpak IA column, 4.6 × 250 mm; nHex:iPrOH 99.9:0.1, flow = 0.7 mL/min; T = 25° C.; λ = 210 nm, $t_{RA}$ = 12.3 min (major enantiomer, 85%), $t_{RB}$ = 13.5 min (minor enantiomer, 15%). |
| (R)-(II-24) | | Synthesized according to General Procedure 6 using 2 mol % of (III-3-ent), EtOH, 1.5 eq. of MsOH, 48% yield.<br>Colourless oil; $^1$H NMR (400 MHz, CDCl$_3$) δ = 7.40-7.34 (m, 2H), 7.28-7.23 (m, 2H), 6.71 (dd, J = 17.6, 10.9 Hz, 1H), 5.85 (br. s, 1H), 5.73 (dd, J = 17.6, 1.0 Hz, 1H), 5.22 (d, J = 10.9, 1.0 Hz, 1H), 3.74 (d, J = 7.3 Hz, 1H), 3.40 (s, 3H), 1.92-1.81 (m, 1H), 1.79-1.69 (m, 1H), 1.68-1.55 (m, 3H), 1.53-1.41 (m, 1H), 1.31-0.75 (m, 5H); $^{13}$C NMR (101 MHz, CDCl$_3$) δ = 141.23, 136.82, 136.53, 128.39, 125.97, 113.45, 70.66, 62.31, 41.01, 30.53, 29.58, 26.54, 26.37, 26.31. Chiral HPLC: Chiralpak IC column, 4.6 × 250 mm; nHex, flow = 1.0 mL/min; T = 25° C.; λ = 254 nm. $t_{RA}$ = 28.9 min (major enantiomer, 94%), $t_{RB}$ = 32.3 min (minor enantiomer, 6%). |
| (R)-(II-25) | | Synthesized according to General Procedure 6 using 2 mol % of (III-3-ent), MeOH, 1.5 eq. of MsOH, >95% yield.<br>Colourless oil; $^1$H NMR (400 MHz, CDCl$_3$) δ 8.16-8.07 (m, 2H), 7.56 (dt, J = 7.6, 1.4 Hz, 1H), 7.46 (t, J = 7.8 Hz, 1H), 5.22 (br. s, 1H), 3.73 (d, J = 7.8 Hz, 1H), 2.05-1.94 (m, 1H), 1.76 (ddt, J = 12.8, 5.0, 2.4 Hz, 1H), 1.72-1.50 (m, 3H), 1.45-1.32 (m, 1H), 1.03 (s, 13H), 0.90-0.75 (m, 1H); Chiral HPLC: Chiralpak IB column, 4.6 × 250 mm; nHex:iPrOH 99.95:0.05, flow = 0.7 mL/min; T = 25° C., λ = 254 nm, $t_{RA}$ = 9.0 min (minor enantiomer, 10%), $t_{RB}$ = 9.5 min (major enantiomer 90%). |

| Cpd. No. | Structure | Structure & Characterization Data |
|---|---|---|
| (R)-(II-26) | | Synthesized according to General Procedure 6 under 20 bar H₂, 1.5 eq. of MsOH in EtOH, 5 h, 80% yield. Colourless oil; ¹H NMR (400 MHz, CDCl₃) δ = 7.31-7.27 (m, 2H), 7.02-6.96 (m, 2H), 5.84 (br. s, 1H), 3.72 (d, J = 7.3 Hz, 1H), 3.38 (s, 3H), 1.91-1.80 (m, 1H), 1.80-1.69 (m, 1H), 1.69-1.52 (m, 3H), 1.50-1.37 (m, 1H), 1.32-0.90 (m, 4H), 0.88-0.72 (m, 1H); ¹³C NMR (101 MHz, CDCl₃) δ = 138.75, 138.41, 129.60, 118.72, 70.34, 62.33, 40.99, 30.49, 29.54, 26.49, 26.31, 26.25. Chiral HPLC: Chiralpak IG column, 4.6 × 250 mm; nHex:iPrOH 99.5:05, flow = 1.0 mL/min; T = 25° C.; λ = 254 nm, $t_{RA}$ = 10.5 min (major enantiomer, 89%), $t_{RB}$ = 11.2 min (minor enantiomer 11%). |
| (R)-(II-27) | | Synthesized according to General Procedure 6 using 2 mol % of (III-3-ent) in EtOH:THF 3:1 v/v, 1.5 eq. of MsOH, 58% yield. Colourless oil; ¹H NMR (400 MHz, CDCl₃) δ = 7.72-7.67 (m, 2H), 7.25-7.20 (m, 2H), 5.80 (br. s, 1H), 3.69 (d, J = 7.3 Hz, 1H), 3.31 (s, 3H), 1.84-1.74 (m, 1H), 1.70-1.61 (m, 1H), 1.61-1.45 (m, 3H), 1.41-1.32 (m, 1H), 1.27 (s, 12H), 1.22-0.69 (m, 5H); ¹³C NMR (101 MHz, CDCl₃) δ = 144.83, 134.58, 127.71, 83.83, 71.02, 62.31, 41.04, 30.49, 29.58, 26.52, 26.36, 26.29, 25.04, 25.01. Chiral HPLC: Chiralpak IG column, 3 × 100 mm; nHex:iPrOH 99:1, flow = 0.7 mL/min; T = 35° C.; λ = 230 nm. $t_{RA}$ = 6.7 min (minor enantiomer; 12%), $t_{RB}$ = 8.3 min (major enantiomer 88%). |
| (R)-(II-28) | | Synthesized according to General Procedure 6 using 2 mol % of (III-3-ent), MeOH, 1.5 eq. of MsOH, >95% yield. Colourless oil; ¹H NMR (400 MHz, CDCl₃) δ = 7.24-7.19 (m, 1H), 6.98-6.91 (m, 2H), 5.77 (d, J = 4.2 Hz, 1H), 3.99 (dd, J = 9.4, 4.2 Hz, 1H), 3.43 (s, 3H), 2.22-2.09 (m, 1H), 1.95-1.82 (m, 1H), 1.73-1.43 (m, 2H), 1.42-1.29 (m, 1H), 1.27-1.12 (m, 1H); Chiral HPLC: Chiralpak IG column, 4.6 × 250 mm; nHex:iPrOH 99.5:0.5, flow = 1.0 mL/min; T = 25° C.; λ = 230 nm, $t_{RA}$ = 8.6 min (major enantiomer, 90%), $t_{RB}$ = 9.5 min (minor enantiomer 10%). |
| (R)-(II-29) | | Synthesized according to General Procedure 6 in EtOH:THF 3:1 v/v, 1.5 eq. of MsOH, >95% yield. Colourless oil; ¹H NMR (400 MHz, CDCl₃) δ = 7.85-7.79 (m, 2H), 7.61-7.54 (m, 1H), 7.51-7.43 (m, 2H), 7.09 (dd, J = 3.2, 2.3 Hz, 1H), 7.04 (t, J = 1.9 Hz, 1H), 6.25 (dd, J = 3.2, 1.6 Hz, 1H), 5.66 (br. s, 1H), 3.62 (d, J = 6.6 Hz, 1H), 3.33 (s, 3H), 1.80-1.45 (m, 6H), 1.29-0.66 (m, 5H); ¹³C NMR (101 MHz, CDCl₃) δ = 139.24, 133.80, 129.36, 129.06, 126.77, 120.97, 119.06, 114.33, 63.94, 62.32, 39.99, 30.29, 29.12, 26.55, 26.31, 26.21. Chiral HPLC: Chiralpak IG column, 3 × 100 mm; nHex:iPrOH 90:10, flow = 1.0 mL/min; T = 35° C.; λ = 254 nm, $t_{RA}$ = 7.5 min (minor enantiomer, 8%), $t_{RB}$ = 8.4 min (major enantiomer 92%). |
| (R)-(II-30) | | Synthesized according to General Procedure 6 in MeOH:THF 3:1 v/v, 1.5 eq. of MsOH, 90% yield. Colourless oil; ¹H NMR (400 MHz, CDCl₃) δ = 7.37-7.23 (m, 5H), 5.99 (br. s, 1H), 3.77 (s, 1H), 3.41 (s, 3H), 0.92 (s, 9H); ¹³C NMR (101 MHz, CDCl₃) δ = 140.78, 128.88, 127.58, 127.04, 74.30, 62.07, 33.96, 27.48. Chiral HPLC: Chiralpak IC column, 4.6 × 250 mm; nHex:iPrOH 99.9:0.1, flow = 1.0 mL/min; T = 25° C.; λ = 220 nm, $t_{RA}$ = 5.1 min (major enantiomer, 92%), $t_{RB}$ = 5.4 min (minor enantiomer 8%). |
| (R)-(II-31) | | Synthesized according to General Procedure 6 in MeOH, 1.0 eq. of MsOH, 50 bar or 1 atm of H₂ (g), >95% yield, 89:11 er. Product enantio-enriched to 97:3 er (80% yield) by crystallization of the 4-nitrobenzenesulfonic acid salt in THF as the racemate. Colourless oil; ¹H NMR (400 MHz, CDCl₃) δ = 7.24-7.11 (m, 3H), 7.06-6.97 (m, 1H), 5.35 (br. s, 1H), 4.88 (s, 2H), 3.76 (d, J = 5.7 Hz, 1H), 2.01-1.86 (m, 1H), 1.86-1.58 (m, 5H), 1.35-1.07 (m, 5H); ¹³C NMR (101 MHz, CDCl₃) δ = 135.15, 133.84, 127.11, 126.47, 126.12, 124.52, 70.16, 62.64, 42.01, 31.06, 28.90, 26.88, 26.74, 26.54. Chiral HPLC: Chiralpak IC column, 4.6 × 250 mm; nHex:iPrOH 98:2, flow = 1.0 mL/min; T = 25° C.; λ = 220 nm, $t_{RA}$ = 10.1 min (minor enantiomer, 3%), $t_{RB}$ = 14.5 min (major enantiomer 97%). |

| Cpd. No. | Structure | Structure & Characterization Data |
|---|---|---|
| (R)-(II-33) | | Synthesized according to General Procedure 6 using 2 mol % of (III-3-ent), MeOH, 1.5 eq. of TfOH, >95% yield.<br>Colourless solid; $^1$H NMR (400 MHz, CDCl$_3$) δ = 7.81 (dd, J = 5.5, 3.1 Hz, 2H), 7.70 (dd, J = 5.5, 3.1 Hz, 2H), 7.47 (d, J = 8.0 Hz, 2H), 7.37 (d, J = 8.0 Hz, 2H), 6.14 (br. s, 1H), 4.01-3.89 (m, 2H), 3.81 (dt, J = 14.3, 4.3 Hz, 1H), 3.69 (dd, J = 5.6, 4.3 Hz, 2H), 3.29 (d, J = 6.9 Hz, 5H), 1.72 (ddt, J = 13.4, 11.2, 5.7 Hz, 1H), 1.63-1.45 (m, 3H), 1.38-1.12 (m, 2H); $^{13}$C NMR (101 MHz, CDCl$_3$) δ = 168.61, 146.54, 134.07, 132.22, 129.98, 129.66, 129.34, 129.02, 127.87, 127.59, 125.66, 125.33, 125.29, 125.25, 125.21, 123.34, 122.96, 120.25, 72.55, 71.64, 65.24, 58.66, 36.88, 33.76, 29.68, 22.79. $^{19}$F NMR (376 MHz, CDCl$_3$) δ -62.36. Chiral HPLC: Chiralpak IF column, 4.6 × 250 mm; nHex:iPrOH 90:10 flow = 1.0 mL/min; T = 25° C.; λ = 210 nm, $t_{RA}$ = 18 min (minor enantiomer, 40%), $t_{RB}$ = 21 min (major enantiomer 60%). |
| (II-34) | | Synthesized according to General Procedure 6, MeOH, 1.5 eq. of MsOH, >95% yield, 98:2 trans:cis.<br>Colourless oil; $^1$H NMR (400 MHz, CDCl$_3$) (peaks correspond to the trans-isomer unless otherwise stated) δ = 7.43 (d, J = 7.1 Hz, 1H), 7.32-7.20 (m, 3H), 6.16 (d, J = 6.2 Hz, 1H), 5.98 (d, J = 5.4 Hz, 0.02H, cis-isomer), 4.85 (t, J = 6.2 Hz, 0.02H, cis-isomer), 4.72 (t, J = 6.6 Hz, 1H), 3.77 (d, J = 0.8 Hz, 3H), 3.52-3.36 (m, 2H), 3.31 (s, 3H), 3.07 (dd, J = 14.6, 7.3 Hz, 1H). Chiral HPLC: Chiralpak IC column, 4.6 × 250 mm; nHex:iPrOH 98:2, flow = 1.0 mL/min; T = 25° C.; λ = 210 nm, $t_{RA}$ = 11.4 min (minor enantiomer, 40%), $t_{RB}$ = 13.7 min (major enantiomer 60%). |
| (R,R)-(II-35) | | Synthesized from oxime (R)-(I-35) according to General Procedure 6, iPrOH 1.5 eq. of MsOH, >95% yield, 97:3 cis:trans.<br>Analytical data are in accordance with *J. Org. Chem.* 2010, 914, Colourless oil; $^1$H NMR (400 MHz, CDCl$_3$) (peaks correspond to the cis-isomer unless otherwise stated) δ = 7.39 (dd, J = 7.3, 1.3 Hz, 1H), 7.23-7.16 (m, 3H), 5.78 (br. s, 1H), 4.42 (d, J = 6.3 Hz, 1H), 4.12 (d, J = 5.5 Hz, 0.03H, trans), 3.57 (s, 0.09H, trans), 3.45 (s, 3H), 3.00-2.93 (m, 1H), 2.71-2.62 (m, 2H), 1.12 (d, J = 6.7 Hz, 3H). |
| (II-36) | | Synthesized according to General Procedure 6 using 2 mol % of (III-3-ent), EtOH, 1.0 eq. of MsOH, >95% yield.<br>Colourless oil; $^1$H NMR (400 MHz, CDCl$_3$) δ = 5.93 (d, J = 11.1 Hz, 1H), 4.23-4.08 (m, 2H), 3.43 (s, 3H), 3.34 (dd, J = 11.1, 6.8 Hz, 1H), 1.86-1.69 (m, J = 6.8 Hz, 1H), 1.22 (t, J = 7.1 Hz, 3H), 0.90 (dd, J = 8.1, 6.8 Hz, 6H); $^{13}$C NMR (101 MHz, CDCl$_3$) δ = 174.09, 69.18, 61.53, 60.86, 29.21, 19.46, 19.38, 14.42.<br>The product (II-36) was converted to the N-benzoyl derivative (II-36-Bz) according to the General Procedure 5 (with 0.1 eq. of DMAP, DIPEA instead of Et$_3$N, 16 h), for chiral HPLC analysis: |

(II-36-Bz)

Colourless oil; $[α]_D^{25}$ = 19.51 (c = 2.0, CHCl$_3$); $^1$H NMR (400 MHz, CDCl$_3$) δ = 7.72-7.63 (m, 2H), 7.49-7.37 (m, 3H), 4.51 (d, J = 8.8 Hz, 1H), 4.25 (q, J = 7.1 Hz, 2H), 3.62 (s, 3H), 2.53 (dhept, J = 9.5, 6.7 Hz, 1H), 1.32 (t, J = 7.1 Hz, 3H), 1.05 (dd, J = 16.9, 6.7 Hz, 6H); $^{13}$C NMR (101 MHz, CDCl$_3$) δ = 170.85, 169.97, 134.22, 130.89, 128.32, 128.30, 67.36, 63.62, 61.36, 28.23, 19.89, 19.77, 14.32
Chiral HPLC: Chiralpak IG column 4.6 × 250 mm; nHex:iPrOH 90:10, flow = 1.0 mL/min; T = 25° C.; λ = 254 nm. $t_{RA}$ = 13.9 min (major enantiomer, 90%), $t_{RB}$ = 16.0 min (minor enantiomer, 10%).

| Cpd. No. | Structure | Structure & Characterization Data |
|---|---|---|
| (II-37) | (Phenyl-CH(OH)-CH(CH₃)-NH-OCH₃ structure) | Synthesized according to General Procedure 6 using 2 mol % of (III-3-ent), EtOH, 1.0 eq. of MsOH, 45% yield, 96:4 dr (absolute configuration not determined). Colourless oil; $^1$H NMR (400 MHz, CDCl$_3$) δ = 7.39-7.31 (m, 4H), 7.30-7.21 (m, 1H), 5.62 (br. s, 1H), 5.02 (d, J = 3.2 Hz, 1H), 3.61 (s, 3H), 3.30 (qd, J = 6.8, 3.2 Hz, 1H), 2.97 (br. s, 1H), 0.83 (d, J = 6.7 Hz, 3H); $^{13}$C NMR (101 MHz, CDCl$_3$) δ = 141.25, 128.34, 127.31, 126.10, 72.95, 62.74, 61.13, 10.81. Chiral HPLC: Chiralpak IG column, 4.6 × 250 mm; nHex:iPrOH 95:5, flow = 1.0 mL/min; T = 25° C.; λ = 210 nm, t$_{RA}$ = 14.1 min (minor enantiomer, 40%), t$_{RB}$ = 16.3 min (major enantiomer, 60%). |

Comparative Example 1: Table 8

Screening of 96 diverse homogeneous catalysts—metal precursors (Rh, Ir, Pt, Ru, neutral/cationic)/ligand classes (monodentate/bidentate, phosphine, phosphite, etc.) in two solvents (THF/TFA and MeOH) at T=60° C. and pressure H$_2$=50 bar, at a catalyst loading of 2%. The conversion towards the desired product (II-1, labeled 'Product' in the table below) was determined by GC and is based on area percentages.

| | Metal Precursor, Ligand | Solvent | Product (II-1) |
|---|---|---|---|
| A1 | Rh(COD)$_2$BF$_4$, (R)-Monophos | THF/TFA | 0% |
| B1 | Rh(COD)$_2$BF$_4$, (S)-Tol-Binap | THF/TFA | 0% |
| C1 | Rh(COD)$_2$BF$_4$, (R)-DM-Segphos | THF/TFA | 0% |
| D1 | Rh(COD)$_2$BF$_4$, (S)-MeO-Biphep | THF/TFA | 0% |
| E1 | Rh(COD)$_2$BF$_4$, (S,S,R,R)-Tangphos | THF/TFA | 0% |
| F1 | Rh(COD)$_2$BF$_4$, (R,S)-Binaphos | THF/TFA | 0% |
| G1 | Rh(COD)$_2$BF$_4$, (R,R)-Kelliphite | THF/TFA | 0% |
| H1 | Rh(COD)$_2$BF$_4$, (R)-(+)-2-[2-diphenylphosphino)-phenyl]-4-isopropyl-oxazoline | THF/TFA | 0% |
| A2 | [Rh(COD)Cl]$_2$, (R)-Monophos | THF/TFA | 0% |
| B2 | [Rh(COD)Cl]$_2$, (S)-Tol-Binap | THF/TFA | 0% |
| C2 | [Rh(COD)Cl]$_2$, (R)-DM-Segphos | THF/TFA | 0% |
| D2 | [Rh(COD)Cl]$_2$, (S)-MeO-Biphep | THF/TFA | 0% |
| E2 | [Rh(COD)Cl]$_2$, (S,S,R,R)-Tangphos | THF/TFA | 0% |
| F2 | [Rh(COD)Cl]$_2$, (R,S)-Binaphos | THF/TFA | 0% |
| G2 | [Rh(COD)Cl]$_2$, (R,R)-Kelliphite | THF/TFA | 0% |
| H2 | [Rh(COD)Cl]$_2$, (R)-(+)-2-[2-diphenylphosphino)-phenyl]-4-isopropyl-oxazoline | THF/TFA | 0% |
| A3 | Ir(COD)$_2$BF$_4$, (R)-Monophos | THF/TFA | 0.09% |
| B3 | Ir(COD)$_2$BF$_4$, (S)-Tol-Binap | THF/TFA | 0% |
| C3 | Ir(COD)$_2$BF$_4$, (R)-DM-Segphos | THF/TFA | 0% |
| D3 | Ir(COD)$_2$BF$_4$, (S)-MeO-Biphep | THF/TFA | 0% |
| E3 | Ir(COD)$_2$BF$_4$, (S,S,R,R)-Tangphos | THF/TFA | 0% |
| F3 | Ir(COD)$_2$BF$_4$, (R,S)-Binaphos | THF/TFA | 0% |
| G3 | Ir(COD)$_2$BF$_4$, (R,R)-Kelliphite | THF/TFA | 0% |
| H3 | Ir(COD)$_2$BF$_4$, (R)-(+)-2-[2-diphenylphosphino)-phenyl]-4-isopropyl-oxazoline | THF/TFA | 0% |
| A4 | [Ir(COD)Cl]$_2$, (R)-Monophos | THF/TFA | 0.02% |
| B4 | [Ir(COD)Cl]$_2$, (S)-Tol-Binap | THF/TFA | 0% |
| C4 | [Ir(COD)Cl]$_2$, (R)-DM-Segphos | THF/TFA | 0.02% |
| D4 | [Ir(COD)Cl]$_2$, (S)-MeO-Biphep | THF/TFA | 0.03% |
| E4 | [Ir(COD)Cl]$_2$, (S,S,R,R)-Tangphos | THF/TFA | 0% |
| F4 | [Ir(COD)Cl]$_2$, (R,S)-Binaphos | THF/TFA | 0% |
| G4 | [Ir(COD)Cl]$_2$, (R,R)-Kelliphite | THF/TFA | 0% |
| H4 | [Ir(COD)Cl]$_2$, (R)-(+)-2-[2-diphenylphosphino)-phenyl]-4-isopropyl-oxazoline | THF/TFA | 0% |
| A5 | Pt(COD)Cl$_2$, (R)-Monophos | THF/TFA | 0% |
| B5 | Pt(COD)Cl$_2$, (S)-Tol-Binap | THF/TFA | 0% |
| C5 | Pt(COD)Cl$_2$, (R)-DM-Segphos | THF/TFA | 0% |
| D5 | Pt(COD)Cl$_2$, (S)-MeO-Biphep | THF/TFA | 0% |
| E5 | Pt(COD)Cl$_2$, (S,S,R,R)-Tangphos | THF/TFA | 0% |
| F5 | Pt(COD)Cl$_2$, (R,S)-Binaphos | THF/TFA | 0% |
| G5 | Pt(COD)Cl$_2$, (R,R)-Kelliphite | THF/TFA | 0.02% |
| H5 | Pt(COD)Cl$_2$, (R)-(+)-2-[2-diphenylphosphino)-phenyl]-4-isopropyl-oxazoline | THF/TFA | 0% |
| A6 | [Ru(cymene)Cl]$_2$, (R)-Monophos | THF/TFA | 0.02% |
| B6 | [Ru(cymene)Cl]$_2$, (S)-Tol-Binap | THF/TFA | 0% |
| C6 | [Ru(cymene)Cl]$_2$, (R)-DM-Segphos | THF/TFA | 0% |
| D6 | [Ru(cymene)Cl]$_2$, (S)-MeO-Biphep | THF/TFA | 0% |
| E6 | [Ru(cymene)Cl]$_2$, (S,S,R,R)-Tangphos | THF/TFA | 0% |
| F6 | [Ru(cymene)Cl]$_2$, (R,S)-Binaphos | THF/TFA | 0% |
| G6 | [Ru(cymene)Cl]$_2$, (R,R)-Kelliphite | THF/TFA | 0% |
| H6 | [Ru(cymene)Cl]$_2$, (R)-(+)-2-[2-diphenylphosphino)-phenyl]-4-isopropyl-oxazoline | THF/TFA | 0% |
| A7 | Rh(COD)$_2$BF$_4$, (R)-Monophos | MeOH | 0% |
| B7 | Rh(COD)$_2$BF$_4$, (S)-Tol-Binap | MeOH | 0% |
| C7 | Rh(COD)$_2$BF$_4$, (R)-DM-Segphos | MeOH | 0% |
| D7 | Rh(COD)$_2$BF$_4$, (S)-MeO-Biphep | MeOH | 0% |
| E7 | Rh(COD)$_2$BF$_4$, (S,S,R,R)-Tangphos | MeOH | 0% |
| F7 | Rh(COD)$_2$BF$_4$, (R,S)-Binaphos | MeOH | 0% |
| G7 | Rh(COD)$_2$BF$_4$, (R,R)-Kelliphite | MeOH | 0% |
| H7 | Rh(COD)$_2$BF$_4$, (R)-(+)-2-[2-diphenylphosphino)-phenyl]-4-isopropyl-oxazoline | MeOH | 0% |
| A8 | [Rh(COD)Cl]$_2$, (R)-Monophos | MeOH | 0% |
| B8 | [Rh(COD)Cl]$_2$, (S)-Tol-Binap | MeOH | 0% |
| C8 | [Rh(COD)Cl]$_2$, (R)-DM-Segphos | MeOH | 0% |
| D8 | [Rh(COD)Cl]$_2$, (S)-MeO-Biphep | MeOH | 0% |
| E8 | [Rh(COD)Cl]$_2$, (S,S,R,R)-Tangphos | MeOH | 0% |
| F8 | [Rh(COD)Cl]$_2$, (R,S)-Binaphos | MeOH | 0% |
| G8 | [Rh(COD)Cl]$_2$, (R,R)-Kelliphite | MeOH | 0% |
| H8 | [Rh(COD)Cl]$_2$, (R)-(+)-2-[2-diphenylphosphino)-phenyl]-4-isopropyl-oxazoline | MeOH | 0% |
| A9 | Ir(COD)$_2$BF$_4$, (R)-Monophos | MeOH | 0.02% |
| B9 | Ir(COD)$_2$BF$_4$, (S)-Tol-Binap | MeOH | 0% |
| C9 | Ir(COD)$_2$BF$_4$, (R)-DM-Segphos | MeOH | 0% |
| D9 | Ir(COD)$_2$BF$_4$, (S)-MeO-Biphep | MeOH | 0% |
| E9 | Ir(COD)$_2$BF$_4$, (S,S,R,R)-Tangphos | MeOH | 0% |
| F9 | Ir(COD)$_2$BF$_4$, (R,S)-Binaphos | MeOH | 0% |
| G9 | Ir(COD)$_2$BF$_4$, (R,R)-Kelliphite | MeOH | 0% |
| H9 | Ir(COD)$_2$BF$_4$, (R)-(+)-2-[2-diphenylphosphino)-phenyl]-4-isopropyl-oxazoline | MeOH | 0% |
| A10 | [Ir(COD)Cl]$_2$, (R)-Monophos | MeOH | 0.75% |
| B10 | [Ir(COD)Cl]$_2$, (S)-Tol-Binap | MeOH | 0% |
| C10 | [Ir(COD)Cl]$_2$, (R)-DM-Segphos | MeOH | 0% |
| D10 | [Ir(COD)Cl]$_2$, (S)-MeO-Biphep | MeOH | 0% |
| E10 | [Ir(COD)Cl]$_2$, (S,S,R,R)-Tangphos | MeOH | 0% |
| F10 | [Ir(COD)Cl]$_2$, (R,S)-Binaphos | MeOH | 0.05% |
| G10 | [Ir(COD)Cl]$_2$, (R,R)-Kelliphite | MeOH | 0.02% |
| H10 | [Ir(COD)Cl]$_2$, (R)-(+)-2-[2-diphenylphosphino)-phenyl]-4-isopropyl-oxazoline | MeOH | |

|   | Metal Precursor, Ligand | Solvent | Product (II-1) |
|---|---|---|---|
| A11 | Pt(COD)Cl$_2$, (R)-Monophos | MeOH | 0.02% |
| B11 | Pt(COD)Cl$_2$, (S)-Tol-Binap | MeOH | 0.04% |
| C11 | Pt(COD)Cl$_2$, (R)-DM-Segphos | MeOH | 0% |
| D11 | Pt(COD)Cl$_2$, (S)-MeO-Biphep | MeOH | 0% |
| E11 | Pt(COD)Cl$_2$, (S,S,R,R)-Tangphos | MeOH | 0% |
| F11 | Pt(COD)Cl$_2$, (R,S)-Binaphos | MeOH | 0% |
| G11 | Pt(COD)Cl$_2$, (R,R)-Kelliphite | MeOH | 0.73% |
| H11 | Pt(COD)Cl$_2$, (R)-(+)-2-[2-diphenylphosphino)-phenyl]-4-isopropyl-oxazoline | MeOH | 0% |
| A12 | [Ru(cymene)Cl$_2$]$_2$, (R)-Monophos | MeOH | 0% |
| B12 | [Ru(cymene)Cl$_2$]$_2$, (S)-Tol-Binap | MeOH | 0% |
| C12 | [Ru(cymene)Cl$_2$]$_2$, (R)-DM-Segphos | MeOH | 0% |
| D12 | [Ru(cymene)Cl$_2$]$_2$, (S)-MeO-Biphep | MeOH | 0% |
| E12 | [Ru(cymene)Cl$_2$]$_2$, (S,S,R,R)-Tangphos | MeOH | 0% |
| F12 | [Ru(cymene)Cl$_2$]$_2$, (R,S)-Binaphos | MeOH | 0.04% |
| G12 | [Ru(cymene)Cl$_2$]$_2$, (R,R)-Kelliphite | MeOH | 0% |
| H12 | [Ru(cymene)Cl$_2$]$_2$, (R)-(+)-2-[2-diphenylphosphino)-phenyl]-4-isopropyl-oxazoline | MeOH | 0% |

These experiments demonstrate that combinations of commonly used metal precursors and ligands doesn't allow homogeneous hydrogenation of oxime substrates such as (I-1) as in all cases, the amount of product (II-1) formed was <1%.

Comparative Example 2: Table 9:

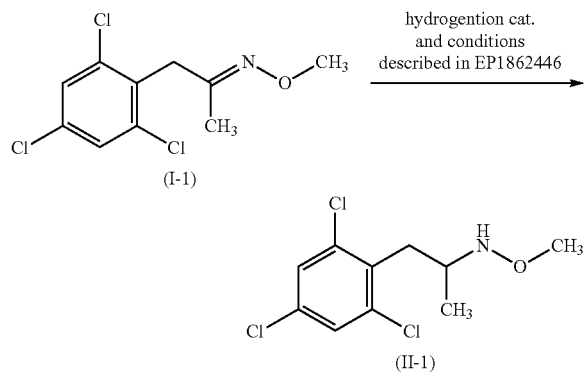

Hydrogenation conditions: Temperature=60° C. and pressure H$_2$=60 bar, Time=20 h. Reaction conditions as described in EP1862446. The conversion towards the desired product ((II-1), labeled 'Product' in the table below) was determined by GC and is based on area percentages.

| Conditions | Product (11-1)% |
|---|---|
| Rh(COD)$_2$BF$_4$ (1.2 mol %), SL-J002-1* (2 mol %), HBF$_4$•Et$_2$O (4eq), THF | 0% |
| Rh(COD)$_2$BF$_4$ (0.12 mol %), SL-J002-1* (0.2 mol %), HBF$_4$•Et$_2$O (4eq), THF | 0% |
| Rh(COD)$_2$BF$_4$ (1.2 mol %), SL-J002-1* (2 mol %), CF$_3$COOH (4eq), CF$_3$CH$_2$OH | 0% |
| Rh(COD)$_2$BF$_4$ (0.12 mol %), SL-J002-1* (0.2 mol %), CF$_3$COOH (4eq), CF$_3$CH$_2$OH | 0% |
| Ir(COD)$_2$BF$_4$ (1.2 mol %), SL-J002-1* (2 mol %), HBF$_4$•Et$_2$O (4eq), THF | <10% |
| Ir(COD)$_2$BF$_4$ (0.12 mol %), SL-J002-1* (0.2 mol %), HBF$_4$•Et$_2$O (4eq), THF | Trace (<1%) |
| Ir(COD)$_2$BF$_4$ (1.2 mol %), SL-J002-1* (2 mol %), CF$_3$COOH (4eq), CF$_3$CH$_2$OH | 0% |
| Ir(COD)$_2$BF$_4$ (0.12 mol %), SL-J002-1* (0.2 mol %), CF$_3$COOH (4eq), CF$_3$CH$_2$OH | 0% |

*SL-J002-1 = (R)-1-[(SP)-2-(Diphenylphosphino)ferrocenyl]ethyldi-tert-butylphosphine In all cases, low selectivity and no or very low yield of the desired product (II-1, labeled 'Product' in the table above) was observed. These experiments demonstrate that the catalysts and conditions described in EP1862446 do not allow efficient hydrogenation of oxime substrates such as (II-1).

The invention claimed is:

1. A process for hydrogenation of oximes of formula (I) in the presence of an iridium catalyst and an acid to produce a hydroxylamine of formula (II):

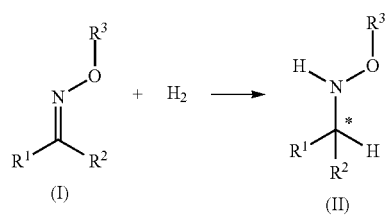

wherein the position labelled with the asterisk is an asymmetric center and one stereoisomer of hydroxylamine of formula (II) is produced in excess;

$R^1$ and $R^2$ are each independently $C_1$-$C_8$alkyl, $C_1$-$C_8$hydroxyalkyl, $C_1$-$C_8$cyanoalkyl, $C_1$-$C_6$alkoxy$C_1$-$C_8$alkyl, $C_1$-$C_8$haloalkyl, $C_2$-$C_6$alkenyl, $C_3$-$C_8$cycloalkyl, phenyl, phenyl$C_1$-$C_3$alkyl, phenylsulfonyl$C_1$-$C_3$alkyl, $C_1$-$C_6$alkoxycarbonyl, a bridged carbocyclyl, heterocyclyl or heteroaryl, wherein the cycloalkyl, phenyl, heterocyclyl and heteroaryl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, nitro, azido, and $C_2$-$C_6$alkenyl; or a single group selected from pinacolborane, phenylsulfonyl, phenyl$C_1$-$C_3$alkyl, or phenyl$C_1$-$C_3$alkoxy;

$R^3$ is hydrogen, $C_1$-$C_8$alkyl, $C_1$-$C_8$hydroxyalkyl, $C_1$-$C_8$cyanoalkyl, $C_1$-$C_6$alkoxy$C_1$-$C_8$alkyl, $C_1$-$C_8$haloalkyl, $C_2$-$C_6$alkenyl, $C_3$-$C_8$cycloalkyl, phenyl$C_1$-$C_3$alkyl, heterocyclyl$C_1$-$C_3$alkyl or heterobicyclyl$C_1$-$C_3$alkyl, wherein the cycloalkyl and heterocyclyl moieties are each optionally substituted with 1 to 5 groups selected from hydroxyl, halogen, $C_1$-$C_6$alkyl, $C_3$-$C_8$cycloalkyl, $C_1$-$C_6$haloalkyl, $C_1$-$C_6$alkoxy, phenyl, heteroaryl, $C_1$-$C_6$alkoxycarbonyl, acylamino, amido, cyano, azido, nitro and $C_2$-$C_6$alkenyl;

and wherein $R^1$ and $R^2$ cannot be the same; or $R^1$ and $R^2$ together with the carbon atom to which they are attached may form a 4- to 9-membered saturated or partially saturated asymmetric cycloalkyl or asymmetric heterocyclyl ring, wherein the heterocyclic moiety is a non-aromatic monocyclic ring which comprises 1, 2 or 3 heteroatoms, wherein the heteroatoms are individually selected from N, O and S; or $R^1$ and $R^3$ together with the carbon and oxygen atoms to which they are respectively attached, may form a 5- to 8-membered non-aromatic heterocyclyl ring, or an 8- to 10-membered partially saturated heterobicyclyl;

wherein the iridium catalysts of formula (IIIa) and (IIIb) are:

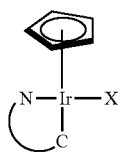
(IIIa)

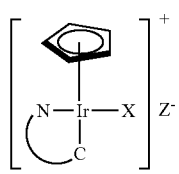
(IIIb)

Wherein

represents an optionally substituted cyclopentadienyl ligand;

represents a bidentate chelating ligand comprising at least one carbon atom which coordinates to iridium and at least one nitrogen atom which coordinates to iridium;

X represents an anionic group;

Y represents a neutral ligand; and

Z represents an anionic group.

2. The process according to claim 1, wherein the iridium catalyst is of the formula (IIIa-1) or (IIIb-1) or the corresponding enantiomeric formula (IIIa-1-ent) or (IIIb-1-ent):

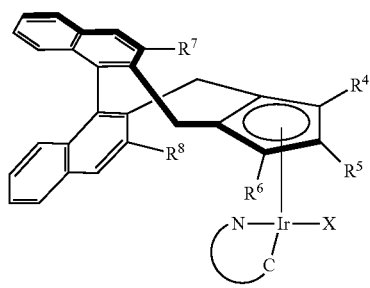
(IIIa-1)

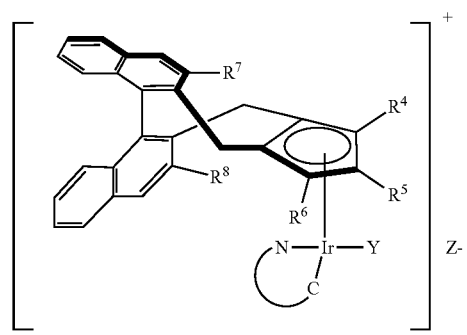
(IIIb-1)

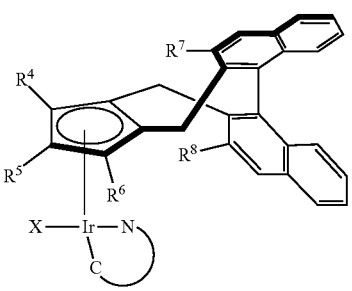
(IIIa-1-ent)

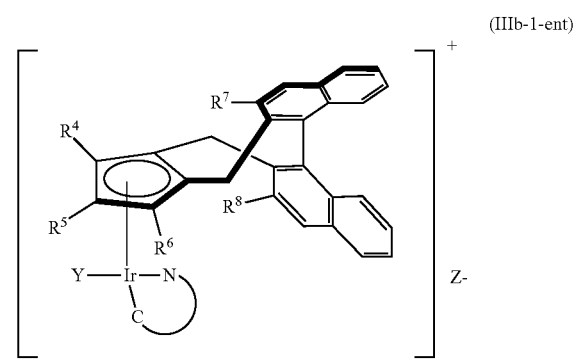
(IIIb-1-ent)

wherein $R^4$, $R^5$, and $R^6$ are each independently hydrogen or $C_1$-$C_3$alkyl;

$R^7$ and $R^8$ are each independently hydrogen, hydroxyl, $C_1$-$C_8$alkyl, $C_1$-$C_8$alkoxy, $C_3$-$C_8$cycloalkyl, phenyl, phenoxy, naphthyl, benzyl, or tert-butyldiphenylsilyloxy, wherein the aromatic ring of each phenyl, naphthyl, or benzyl moiety is optionally substituted with 1 to 5 groups selected from $C_1$-$C_6$alkyl, $C_1$-$C_6$haloalkyl and $C_1$-$C_6$alkoxy.

3. The process according to claim 1, wherein the iridium catalyst is of the formula (IIIa-2) or (IIIb-2) or the corresponding enantiomeric formula (IIIa-2-ent) or (IIIb-2-ent):

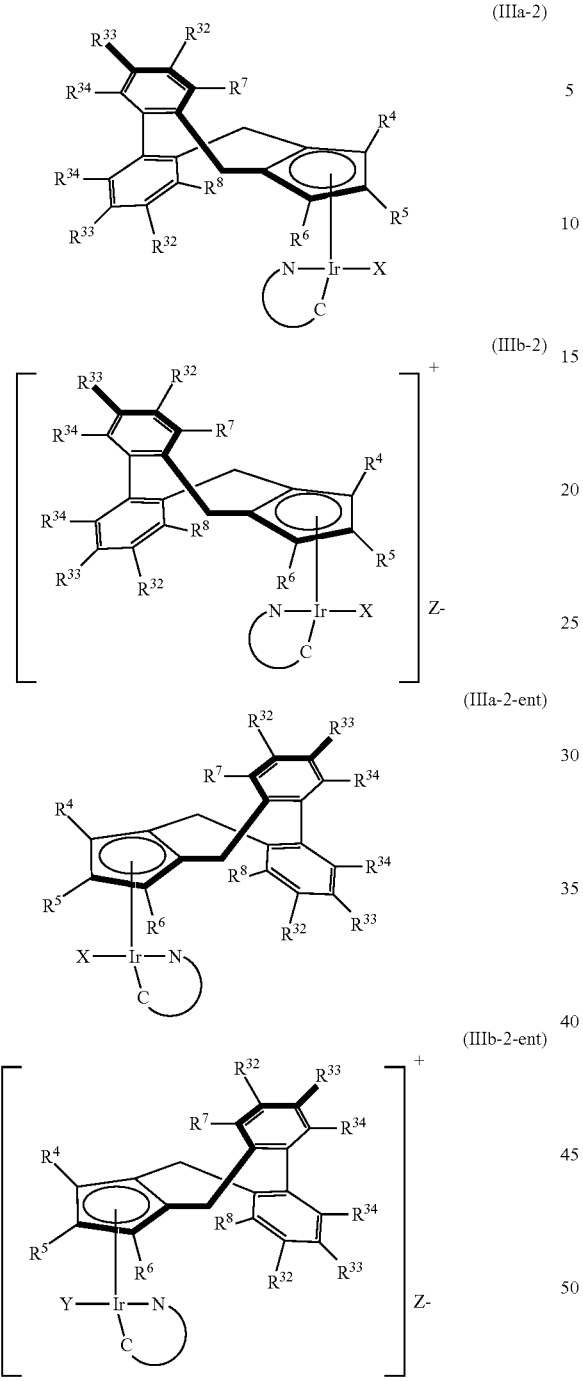

(IIIa-2)

(IIIb-2)

(IIIa-2-ent)

(IIIb-2-ent)

wherein $R^4$, $R^5$, and $R^6$ are each independently hydrogen or $C_1$-$C_3$alkyl;

$R^7$ and $R^8$ are each independently hydrogen, hydroxyl, $C_1$-$C_8$alkyl, $C_1$-$C_8$alkoxy, $C_3$-$C_8$cycloalkyl, phenyl, phenoxy, naphthyl, benzyl, or tert-butyldiphenylsilyloxy, wherein the aromatic ring of each phenyl, naphthyl, or benzyl moiety is optionally substituted with 1 to 5 groups selected from $C_1$-$C_6$alkyl, $C_1$-$C_6$haloalkyl and $C_1$-$C_6$alkoxy;

$R^{32}$ and $R^{33}$ are each independently hydrogen, halogen, $C_1$-$C_3$alkyl, or $C_1$-$C_3$alkoxy;

$R^{34}$ is halogen, $C_1$-$C_3$alkyl, or $C_1$-$C_3$alkoxy; or $R^{32}$ and $R^{33}$, or $R^{33}$ and $R^{34}$, or $R^{32}$ and $R^{34}$ together with the carbon atoms to which they are attached may form a 5- to 10-membered carbocyclyl or heterocyclyl ring, wherein the heterocyclic moiety is a monocyclic ring which comprises 1, 2 or 3 heteroatoms, wherein the heteroatoms are individually selected from N, O and S.

4. The process according to claim 1, wherein the bidentate chelating ligand is a ligand of structure (IVc):

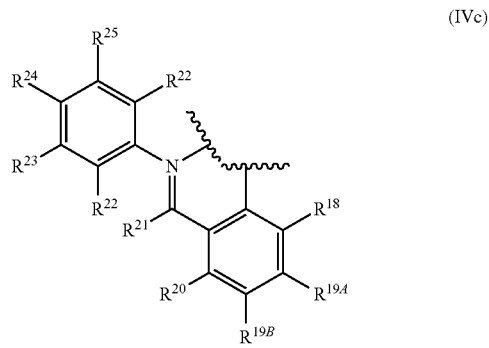

(IVc)

wherein $R^{18}$, $R^{19A}$, $R^{19B}$, $R^{20}$, $R^{22}$, $R^{23}$, $R^{24}$ and $R^{25}$ are each independently hydrogen, halogen, $C_1$-$C_8$alkyl, $C_1$-$C_8$alkoxy, $C_1$-$C_8$haloalkyl, $C_1$-$C_8$haloalkoxy, or $C_1$-$C_8$alkoxycarbonyl, wherein each $C_1$-$C_8$alkoxy moiety is optionally substituted by 1 or 2 groups selected from hydroxy, $C_1$-$C_8$alkoxy, $C_1$-$C_8$alkyl, $C_1$-$C_8$alkoxycarbonyl and phenyl;

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy; or $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S.

5. The process according to claim 1, wherein the bidentate chelating ligand is a ligand of structure (IVe):

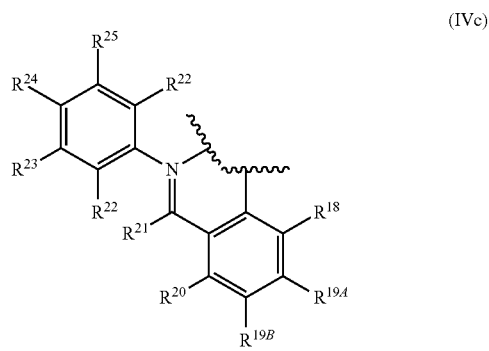

(IVc)

wherein, $R^{19A}$, $R^{19B}$, $R^{20}$, $R^{23}$, $R^{24}$ and $R^{15}$ are each independently hydrogen, $C_1$-$C_8$alkyl, or $C_1$-$C_8$alkoxy;

$R^{21}$ is hydrogen, $C_1$-$C_8$alkyl or phenyl, wherein each phenyl moiety is optionally substituted by 1 to 5 groups selected from $C_1$-$C_8$alkyl and $C_1$-$C_8$alkoxy; or $R^{20}$ and $R^{21}$ together with the carbon atoms to which they are attached may form a 6- to 8-membered partially saturated cycloalkyl or heterocyclyl ring, wherein the heterocyclic moiety is a non-aromatic ring which comprises 1 or 2 heteroatoms, and wherein the heteroatoms are individually selected from N, O and S;

$R^{26}$ is a derivative of the following structure:

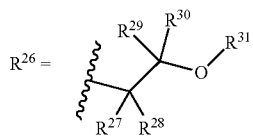

wherein $R^{27}$, $R^{28}$, $R^{29}$, $R^{30}$, and $R^{31}$ are each independently selected from hydrogen, $C_1$-$C_8$alkyl, $C_3$-$C_6$cycloalkyl, and phenyl, wherein each phenyl moiety is optionally substituted by 1 to 5 groups selected from $C_1$-$C_3$alkyl, halogen and $C_1$-$C_3$alkoxy, and wherein either, $R^{27}$ and $R^{28}$ may not be the same, or $R^{29}$ and $R^{30}$ may not be the same; or $R^{29}$ and $R^{30}$ together with the carbon to which they are attached form and oxo (=O) group.

6. The process according to claim 1, wherein X represents an anionic group of the formula $R^{14}$—$SO_2O$— or $R^{15}$—C(O)O—, wherein $R^{14}$ is halogen, hydroxy, $C_1$-$C_6$alkyl, $C_1$-$C_6$alkoxy, $C_1$-$C_6$haloalkyl, or phenyl, wherein the phenyl moieties are optionally substituted by 1, 2, 3 or 4 substituents, which may be the same or different, selected from $R^{16}$;

$R^{16}$ is $C_1$-$C_4$alkyl, $C_1$-$C_4$haloalkyl, nitro, or halogen;

$R^{15}$ is $C_1$-$C_6$haloalkyl or phenyl, wherein the phenyl moieties are optionally substituted by 1, 2, 3 or 4 substituents, which may be the same or different, selected from $R^{17}$; and $R^{17}$ is $C_1$-$C_4$alkyl, $C_1$-$C_4$haloalkyl, nitro or halogen.

7. The process according to claim 1, wherein Z is $R^{14}$—$SO_2O^-$, mesylate, sulfate, hydrogensulfate, tetrafluoroborate, hexafluorophosphate, tetraphenylborate, or tetrakis(3,5-bis(trifluoromethyl)phenyl)borate.

8. The process according to claim 1, wherein the acid is methanesulfonic acid, p-toluenesulfonic acid, camphorsulfonic acid, sulfuric acid, trifluoroacetic acid or triflic acid.

9. The process according to claim 1, wherein Y is $H_2O$ or MeCN.

10. The process according to claim 1, wherein the oxime of formula (I) is N-methoxy-1-(2,4,6-trichlorophenyl)propan-2-imine(I-1).

11. The process according to claim 1, wherein the iridium catalyst is a compound of formula (III-1), (III-2), (III-3), (III-4), (III-15), (III-16), or (III-24):

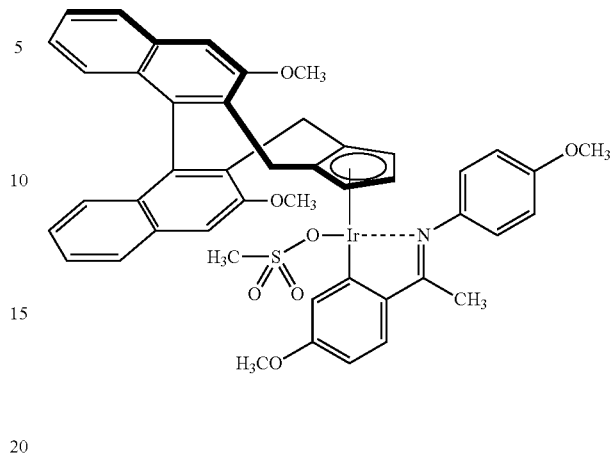

(III-1)

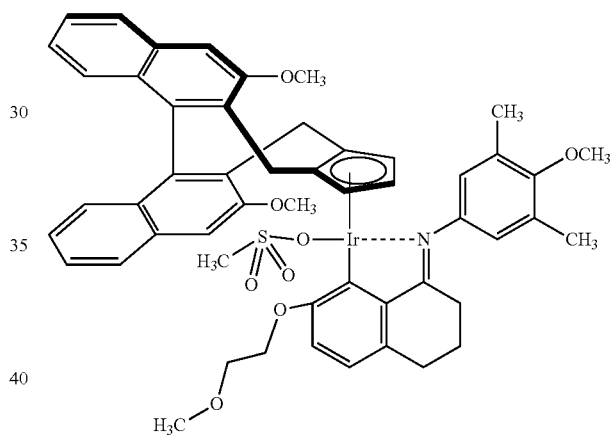

(III-2)

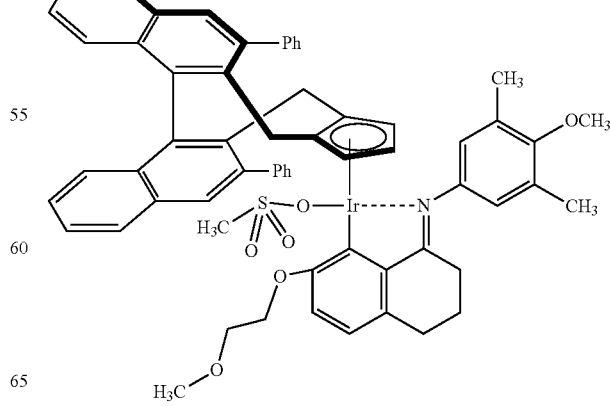

(III-3)

121
-continued (III-4)

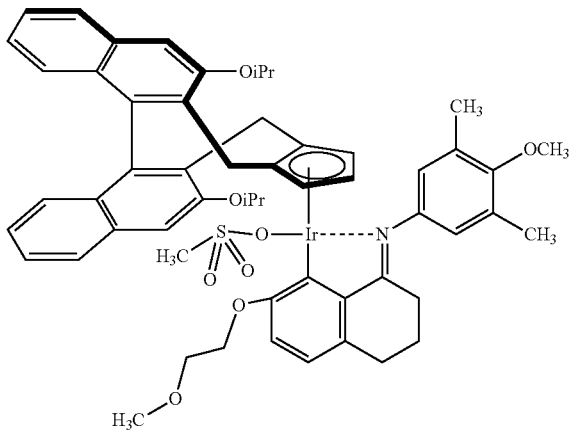

(III-15)

(III-16)

122
-continued (III-24)

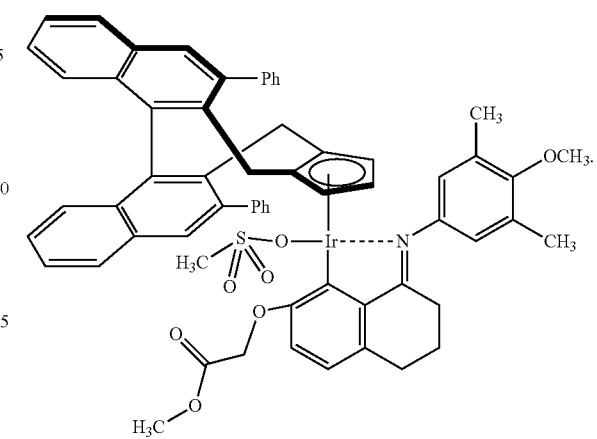

12. The process according to claim 1, wherein the hydroxylamine of formula (II) is (2R)-N-methoxy-1-(2,4,6-trichlorophenyl)propan-2-amine (II-1).

13. The process according to claim 12, in which the (2R)-N-methoxy-1-(2,4,6-trichlorophenyl)propan-2-amine (II-1) is further reacted with 3-(difluoromethyl)-1-methyl-pyrazole-4-carbonyl chloride (XII) to provide 3-(difluoromethyl)-N-methoxy-1-methyl-N-[(1R)-1-methyl-2-(2,4,6-trichlorophenyl)ethyl]pyrazole-4-carboxamide (XIII-1):

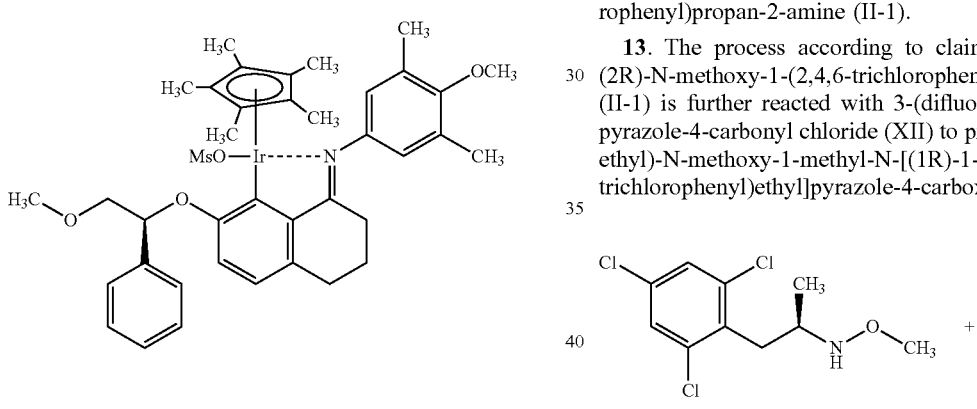

14. The process according to claim 1, wherein the iridium catalyst is a compound of formula (III-1-ent), (III-2-ent), (III-3-ent), (III-4-ent), (III-15-ent), (III-16-ent), or (III-24-ent):

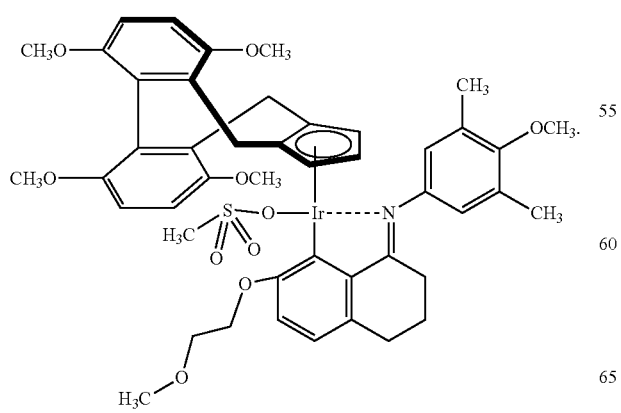

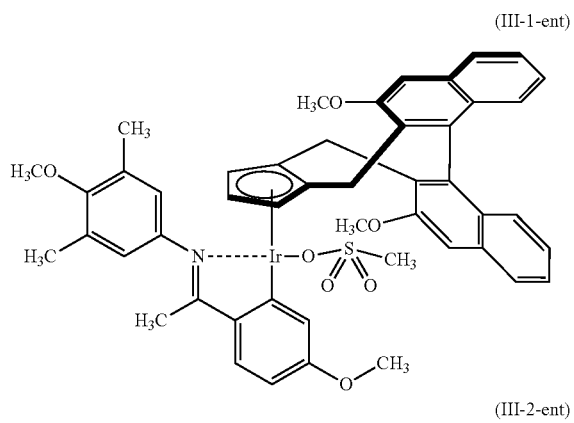
(III-1-ent)

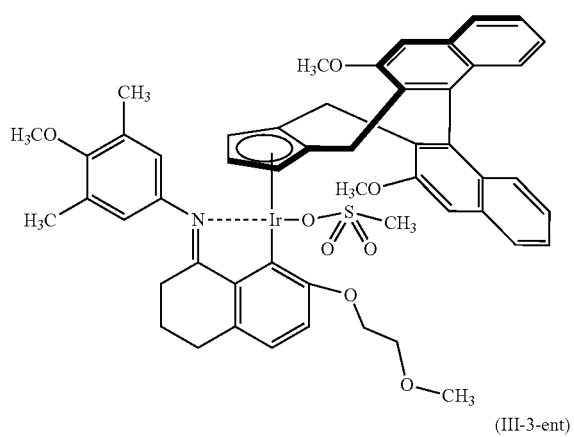
(III-2-ent)

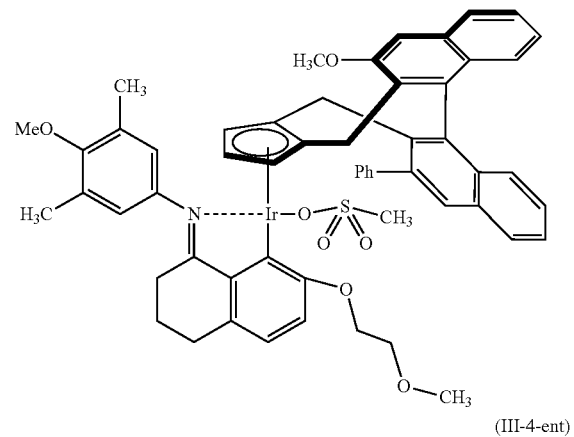
(III-3-ent)

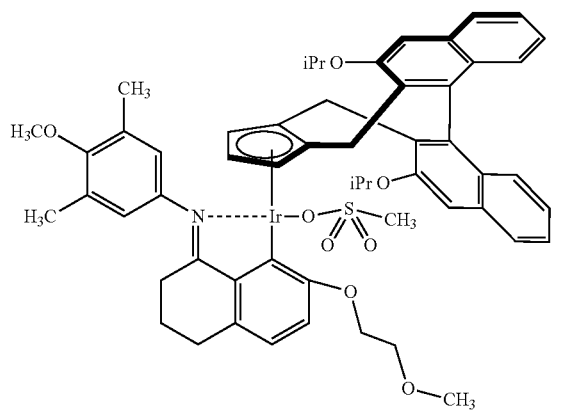
(III-4-ent)

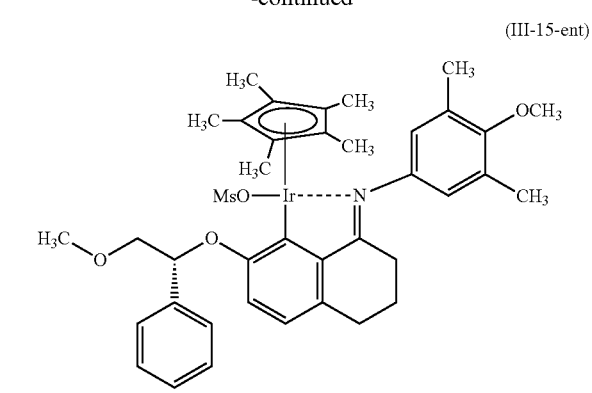
(III-15-ent)

(III-16-ent)

(III-24)

15. The process according to claim 1, wherein the hydroxylamine of formula (II) is (2S)-N-methoxy-1-(2,4,6-trichlorophenyl)propan-2-amine (II-1-ent).

16. The process according to claim 15, in which the (2S)-N-methoxy-1-(2,4,6-trichlorophenyl)propan-2-amine (II-1-ent) is further reacted with 3-(difluoromethyl)-1-methyl-pyrazole-4-carbonyl chloride (XII) to provide 3-(difluoromethyl)-N-methoxy-1-methyl-N-[(1S)-1-methyl-2-(2,4,6-trichlorophenyl)ethyl]pyrazole-4-carboxamide (XIII-1-ent):

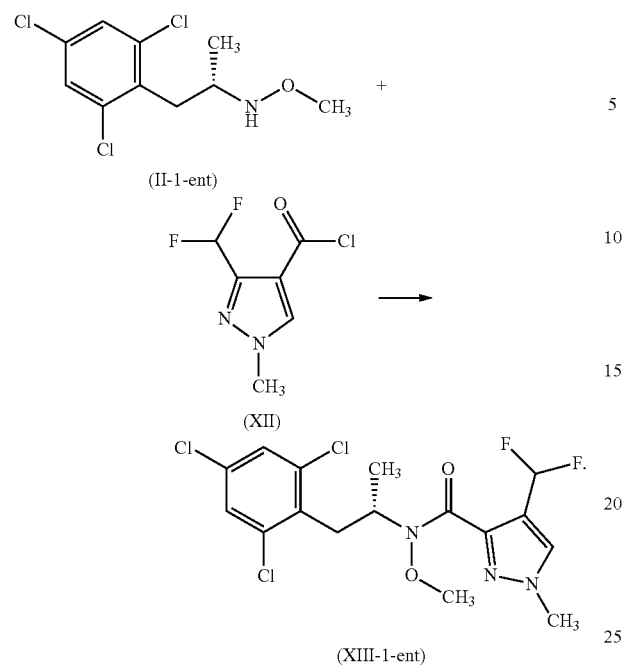
* * * * *